(12) United States Patent
Tuan et al.

(10) Patent No.: US 8,906,817 B2
(45) Date of Patent: Dec. 9, 2014

(54) SINTERED CALCIUM SULFATE CERAMIC MATERIAL AND SINTERABLE CALCIUM SULFATE CERAMIC MATERIAL

(75) Inventors: Wei-Hsing Tuan, Taipei (TW); Shu-Ting Kuo, Taipei (TW); Hao-Wei Wu, Tainan (TW)

(73) Assignee: National Taiwan University, Taipei (TW)

( * ) Notice: Subject to any disclaimer, the term of this patent is extended or adjusted under 35 U.S.C. 154(b) by 182 days.

(21) Appl. No.: 13/473,329

(22) Filed: May 16, 2012

(65) Prior Publication Data

US 2012/0225769 A1 Sep. 6, 2012

Related U.S. Application Data

(63) Continuation-in-part of application No. 12/624,222, filed on Nov. 23, 2009, now Pat. No. 8,263,513.

(30) Foreign Application Priority Data

Jan. 12, 2009 (TW) ................. 98100973 A
Jul. 28, 2009 (TW) ................. 98125273 A

(51) Int. Cl.
*C04B 35/03* (2006.01)
*C04B 35/057* (2006.01)
*C04B 35/22* (2006.01)

(52) U.S. Cl.
CPC .............. *C04B 35/057* (2013.01); *C04B 35/22* (2013.01); *C04B 2235/3201* (2013.01); *C04B 2235/3208* (2013.01); *C04B 2235/3217* (2013.01); *C04B 2235/3244* (2013.01); *C04B 2235/3418* (2013.01); *C04B 2235/36* (2013.01); *C04B 2235/447* (2013.01); *C04B 2235/448* (2013.01); *C04B 2235/656* (2013.01); *C04B 2235/77* (2013.01); *C04B 2235/96* (2013.01)
USPC ......................................... 501/123; 501/125

(58) Field of Classification Search
CPC .... C04B 35/14; C04B 35/057; C04B 35/195; C04B 35/44; C04B 28/04; C04B 28/14
USPC ................. 106/680, 701, 715, 722, 735, 772; 501/123, 125; 264/638, 652, 603, 125
See application file for complete search history.

(56) References Cited

U.S. PATENT DOCUMENTS 4,174,230 A 11/1979 Hashimoto et al.
5,614,206 A 3/1997 Randolph et al.
(Continued)

FOREIGN PATENT DOCUMENTS

TW 362011 6/1999
TW 408023 10/2000
(Continued)

OTHER PUBLICATIONS

Zhong, "The Advance of Bioceramics for Bone Tissue Engineering Scaffold Material", Chinese Medical Equipment Journal, 2005, pp. 26-28, vol. 26 No. 4.

(Continued)

*Primary Examiner* — Noah Wiese
(74) *Attorney, Agent, or Firm* — Muncy, Geissler, Olds & Lowe, P.C.

(57) ABSTRACT

A sintered calcium sulfate ceramic material includes a plurality of major grains of calcium sulfate solid solutions, and a plurality of reaction grains located at boundaries of the major grains. Each of the reaction grains may be selected from the group consisting of calcium silicate and calcium phosphate. A sinterable calcium sulfate ceramic material consisting of calcium sulfate and a sintering additive is also provided. The sintering additive comprises silica ($SiO_2$).

19 Claims, 35 Drawing Sheets

(56) References Cited

U.S. PATENT DOCUMENTS

| | | | |
|---|---|---|---|
| 5,691,397 | A | 11/1997 | Glimcher et al. |
| 6,312,467 | B1 | 11/2001 | McGee |
| 6,419,708 | B1 | 7/2002 | Hall et al. |
| 6,586,752 | B1* | 7/2003 | Jin et al. .................. 250/484.3 |
| 2005/0251149 | A1* | 11/2005 | Wenz ............................ 606/94 |
| 2006/0188541 | A1* | 8/2006 | Richelsoph et al. .......... 424/422 |
| 2011/0074068 | A1* | 3/2011 | Lin ............................... 264/638 |

FOREIGN PATENT DOCUMENTS

| | | |
|---|---|---|
| TW | 550245 | 9/2003 |
| TW | 200518725 | 6/2005 |

OTHER PUBLICATIONS

Cai, "Progress in Research and Development of Bioglass Materials", Materials Review, Dec. 2012, pp. 40-42, vol. 16, No. 12.

Wu, "Effects of additives on the sintering and biodegradation behavior of calcium sulfate", National Taiwan University Master Thesis, Jun. 27, 2011, pp. 1-114.

Wu, et al., "Effect of $SiO_2$ on sintering behavior and biodegradability of calcium sulfate", Department of Materials Science and Engineering, National Taiwan University, Nov. 14, 2010, 1 page.

Wu, et al., Department of Materials Science and Engineering, National Taiwan University, Abstract, May 28, 2011, 5 pages.

Stewart, et al., "Hot Corrosion of B-1900 Superalloy by Simulated Fluidized Bed Coal Combustor Deposits", Oxidation of Metals, vol. 18, Nos. 3-4, Aug. 1982, pp. 163-185.

Garcia, et al., "Synthesis and Characterization of ZrO2-CaSO4 Materials Prepared by the Sol-Gel Method", Journal of Sol-Gel Science and Technology 32, 333-337,2004.

Akosman, et al., "Effective Diffusivities and Convective Coefficients for CaO-CaSO4 and CaO-CaC12 Pellets", Chem. Eng. Technol. 2004, 27, 1. pp. 50-55.

* cited by examiner

SINTERED CALCIUM SULFATE CERAMIC MATERIAL AND SINTERABLE CALCIUM SULFATE CERAMIC MATERIAL

This application is a Continuation-in-Part of co-pending application Ser. No. 12/624,222, filed on Nov. 23, 2009, and for which priority is claimed under 35 U.S.C. §120, the entire contents of which are hereby incorporated by reference.

BACKGROUND OF THE INVENTION

1. Field of the Invention

The present invention relates to calcium sulfate based biomaterials or bioceramic materials. These materials can be used as bone substitutes. In particular, the strength of the calcium sulfate added with sintering additives after firing is satisfactory. In addition, these materials show good biocompatibility.

2. Related Art

The volume and weight of the bones occupy the most parts of human's body. The main function of bones is to assist our bodies to take action and to support the body structure. As the flaw or damage is formed in bones, the clinical treatment is often required. The reasons causing such serious damages on bones are bone fractures, or bone tumor, or osteomyelitis, or collapses of vertebra, or the flawed hip bone, or the failed artificial joint. In order to resolve these damages, to replace the damaged bone with bone graft is still a common treatment in the clinics.

Nowadays, the bone graft comes from autograft and allograft. Autograft means the transplantation of organs, tissues or even proteins from one part of the body to another part in the same individual. This is a rather safe treatment. It may induce a good recovery. However, the source of autograft is limited. In addition, the elders, children or people who are not healthy are not suitable for such autograft treatment. Allograft means the transplantation of cells, tissues, or organs, sourced from the same species of a genetically non-identical human body. The bone graft in allograft may come from the bone bank. However, the quality of bones is questionable. For example, the disease, such as AIDS or hepatitis etc., may come with the surgery. In order to avoid the limitation and risk of autograft and allograft, using the artificial bone substitutes is becoming a popular alternative. Many medical companies in the world have therefore put their attention on developing bone substitutes.

The first bone graft was generated from Netherlands, by JobVan Meekren in 1668. In the $19^{th}$ century, many doctors cured the fractures and damages of bones by using autograft. The results of surgeries were very successful. Till now, the technology of autograft is not changed too much, compared with that developed one hundred years ago.

Polymeric bone cement has been used as filler in orthopedics for quite a while. Since 1960, polymethylmethacrylate acid has been used to fill into the cavity between the artificial joint and bone tissue. It can fix the artificial joint in the bone tissue. Such bone cement has good fixing effect in the early stage; however, after implanting for a long time, the implanted component becomes loose because of stress shielding and foreign body reaction. In addition, one more operation is often needed to perform on 70% of the patient after implanting for 10 years. This circumstance results in wasting of money and inconvenience for doctors and patients. Although the bone cement can avoid the soft tissue to grow into defects and holes of bones, it still cannot be absorbed by human's body. The bone cement also can not be transferred into bone tissue. Furthermore, the high temperature and residual monomer generated during mixing bone cement will cause the death and toxic pollution of surrounding tissue. Therefore, many medical teams intend to use the absorbable bone substitutes, such as natural coral, hydroxyapatite, calcium phosphate, hemihydrate calcium sulfate or its mixture, to replace the traditional bone cement.

Calcium sulfate is massively used as the shaping molds in ceramic industry. The porous calcium sulfate can absorb water, but its strength is low. Therefore, the service lifespan of calcium sulfate molds is limited. If the strength of calcium sulfate can be improved, the service time will be extended. In addition, the calcium sulfate can be used as bulks and films in orthopedics because it has good biocompatibility and biodegradability. However, the application of calcium sulfate is limited because it cannot be sintered and its strength is thus low.

Nowadays, the calcium sulfate products are made at room temperature (without sintering/heat treatment). This is the reason why the strength of calcium sulfate is poor. This is also the reason why the amount of calcium sulfate products is used less than that of calcium phosphate products used in the medical area.

SUMMARY OF THE INVENTION

Hereby, the present invention discloses a sintered calcium sulfate ceramic material and sinterable calcium sulfate ceramic material, which are bioceramic materials. Some sintering additives are added into calcium sulfate to improve its sintering ability. The presence of these sintering additives should not affect the biocompatibility of calcium sulfate. The materials thus have appropriate strength and biocompatibility after heat treatment, which can be used as biomaterials.

This method is prepared by pre-mixing +1 and/or +2 and/or +3 and/or +4 and/or +5 valence elements and/or their chemical compounds into calcium sulfate as sintering additives. The chemical compounds include oxide compounds, non-oxide compounds, intermetallic compounds, amphoteric compound, metal-like compounds, stoichiometric compound, non-stoichiometric compounds, mixed-valence-state compounds, glass, glass-ceramics etc. During firing samples at or above the temperature of 600° C., these sintering additives assist the densification of calcium sulfate. The strength and biocompatibility of specimens are satisfactory. Thereby, these calcium sulfate-based ceramics can be used as bone substitutes.

In the present invention, the sintering additives can be +1 and/or +2 and/or +3 and/or +4 and/or +5 valence elements and/or their compounds, which can also form glass or glass-ceramic materials during sintering. The mixtures comprise calcium sulfate and 0.1 to 50 wt % sintering additives. The mixtures are shaped in the mold. During sintering at elevated temperatures, the sintering additives can form glass or glass-ceramic or compound to assist the densification of calcium sulfate. The calcium sulfate ceramics after sintering have the maximum compressive strength of 183 MPa. These materials can be used as bone substitutes.

The invention further provides a sintered calcium sulfate ceramic material, which is a bioceramic material and comprises a plurality of major grains of calcium sulfate solid solutions; and a plurality of reaction grains located at boundaries of the major grains, wherein each of the reaction grains may be selected from the group consisting of calcium silicate and calcium phosphate.

The traditional procedure of manufacturing glass is complex. For example: the glass starting materials (e.g. $SiO_2$, $CaO$, $Na_2O$ etc.) are first heated up at the high temperature, and then quenched, ground and sieved. After that, the ceramic powder and glass are mixed together, shaped and fired. The glass or glass-ceramic specimens eventually can be obtained. However, the ceramics and glass starting materials are directly mixed together in the present invention. The mixture is then shaped and fired. The specimens containing glass can also be made without using the above-mentioned complex pre-treatments. The sintering additives disclosed in the present invention can form glass or glass-ceramic by firing with calcium sulfate at elevated temperatures. Compared with the traditional method, it is much easier to prepare the glass or glass-ceramic specimens by using the method used in the present invention.

The scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION OF THE INVENTION

The present invention will be apparent from the following detailed description, which proceeds with reference to the accompanying drawings, wherein the same references relate to the same elements.

Hereinafter, the present invention will be described more clearly as follows.

Figure 1:
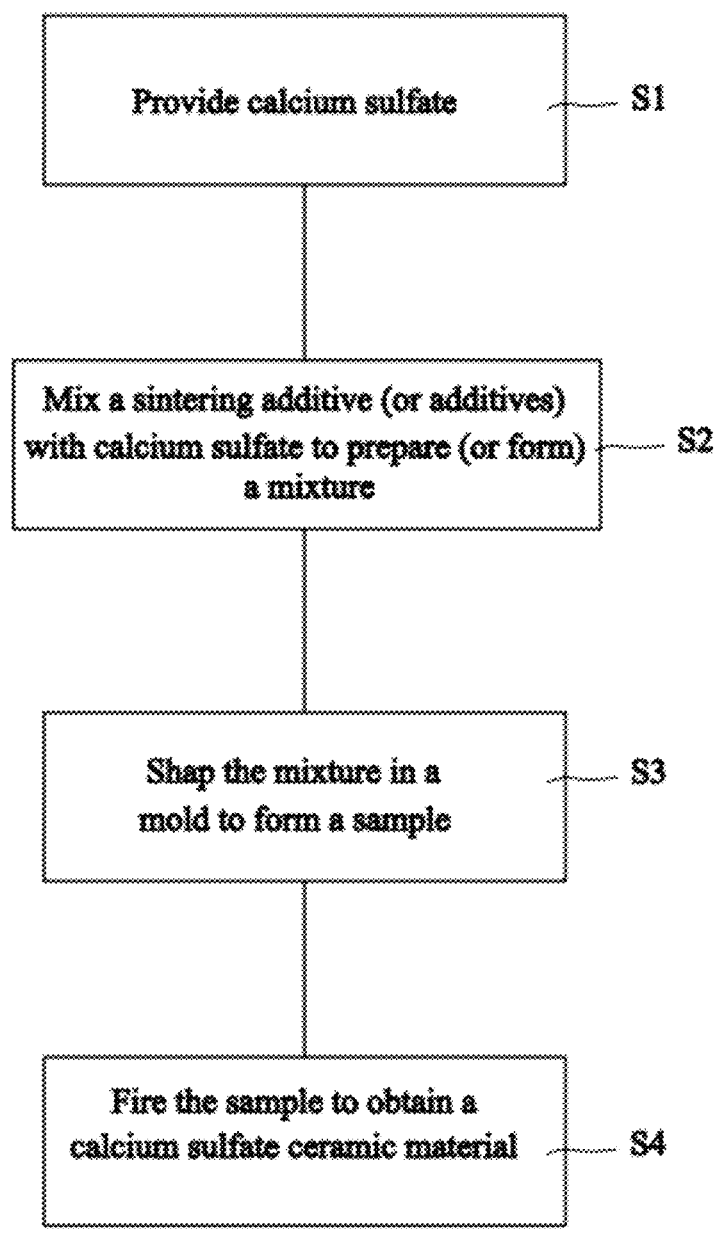
FIG. 1 depicts the flowchart of the present invention.
Figure 2A:
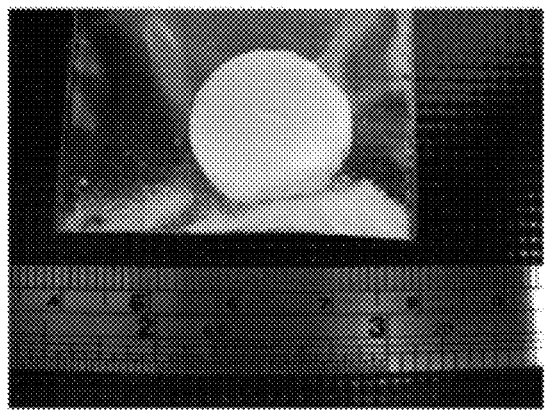
FIGS. 2(a) to 2(d) respectively depict the photographs of (a) calcium sulfate, (b) calcium sulfate+1 wt % silica, (c) calcium sulfate+10 wt % silica and (d) calcium sulfate+50 wt % silica specimens after firing at 900° C.
Figure 2B:
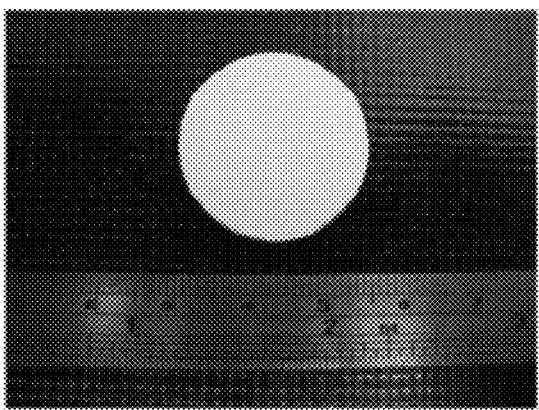
Figure 2C:
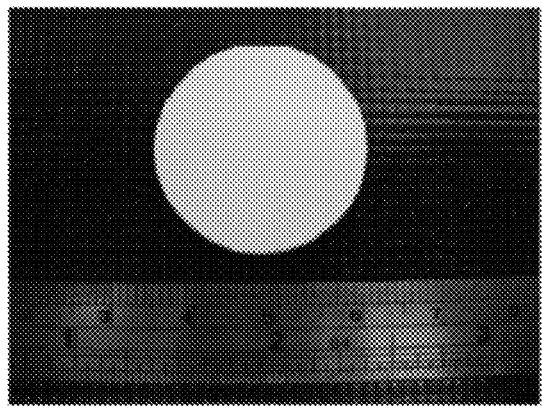
Figure 2D:
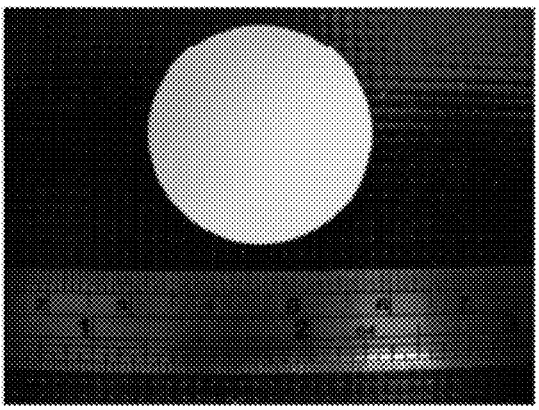
Figure 3A:
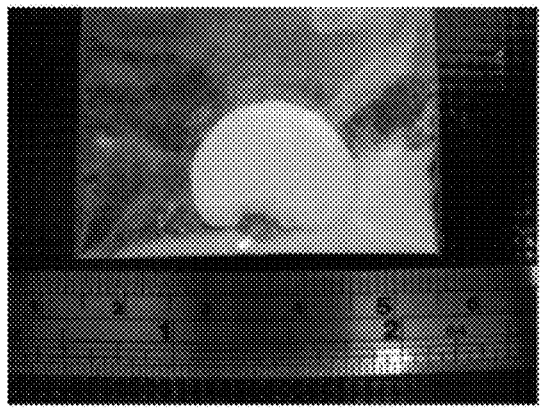
FIGS. 3(a) to 3(d) respectively depict the photographs of (a) calcium sulfate, (b) calcium sulfate+1 wt % silica, (c) calcium sulfate+10 wt % silica and (d) calcium sulfate+50 wt % silica specimens after firing at 1000° C.
Figure 3B:
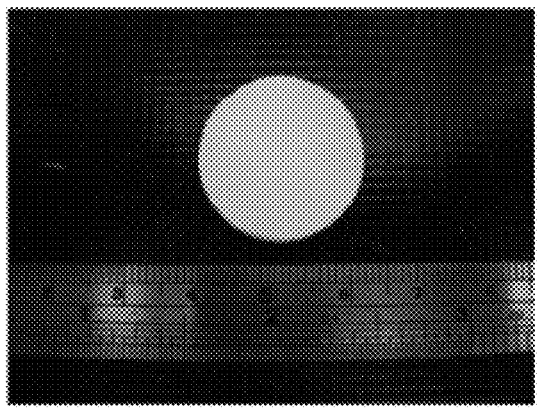
Figure 3C:
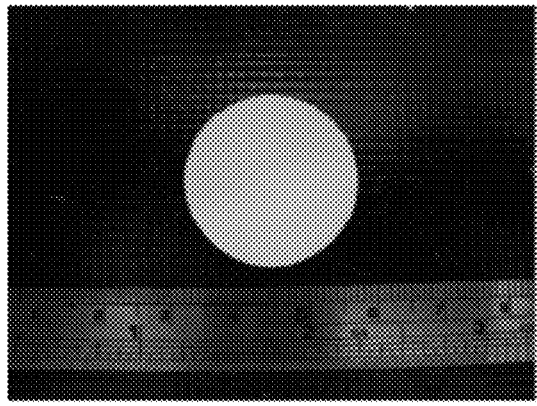
Figure 3D:
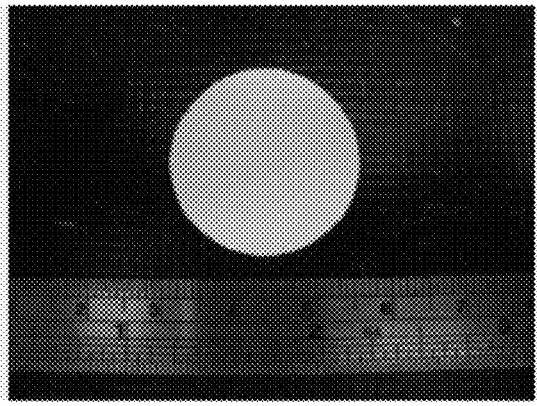
Figure 4A:
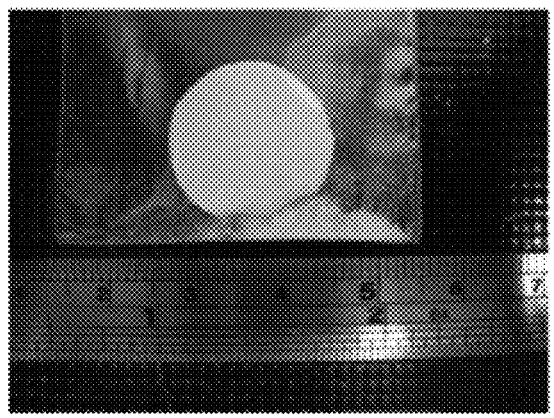
FIGS. 4(a) to 4(d) respectively depict the photographs of (a) calcium sulfate, (b) calcium sulfate+1 wt % silica, (c) calcium sulfate+10 wt % silica and calcium sulfate+50 wt % silica specimens after firing at 1100° C.
Figure 4B:
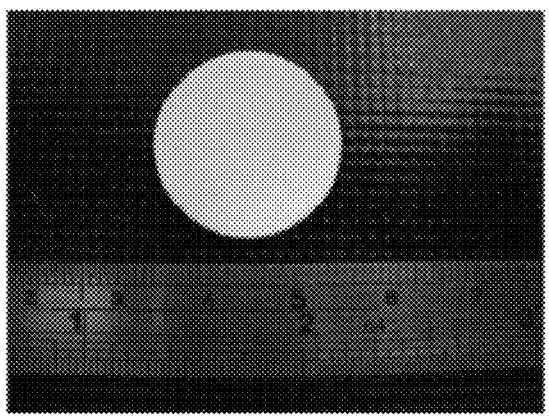
Figure 4C:
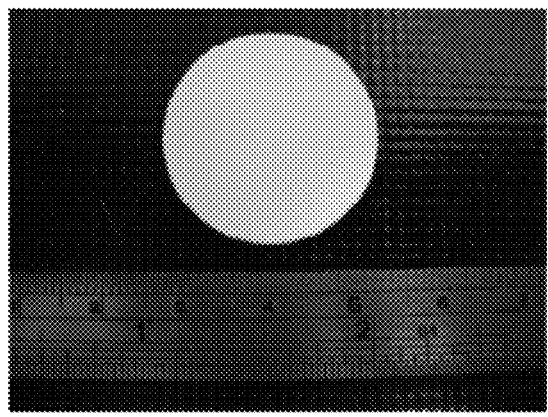
Figure 4D:
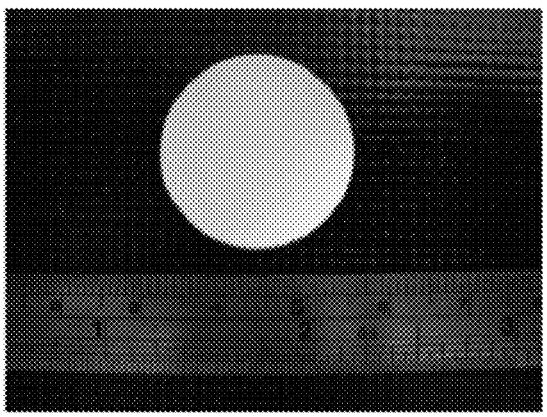
Figure 5A:
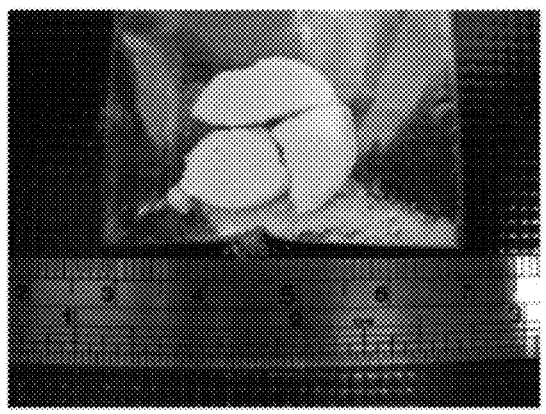
FIGS. 5(a) to 5(d) respectively depict the photographs of (a) calcium sulfate, (b) calcium sulfate+1 wt % silica, (c) calcium sulfate+10 wt % silica and (d) calcium sulfate+50 wt % silica specimens after firing at 1200° C.
Figure 5B:
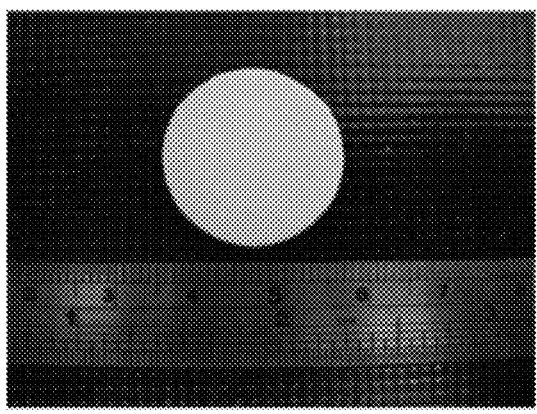
Figure 5C:
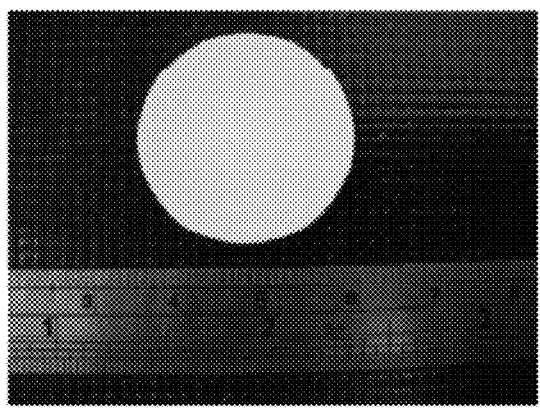
Figure 5D:
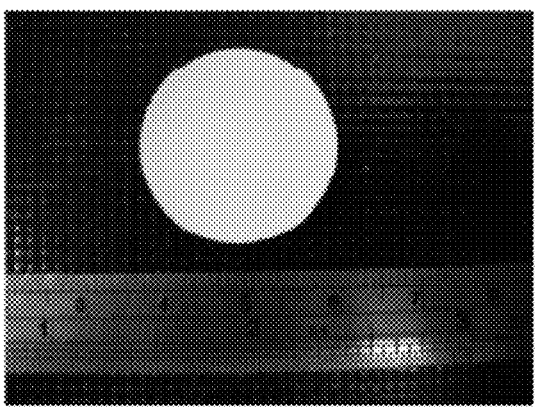

The flowchart of preparation of sinterable bioceramics in the present invention is present in FIG. 1, and the method of manufacturing the sinterable calcium sulfate ceramic material includes the steps S1 to S4.

In the step S1, calcium sulfate is provided.

In the step S2, a sintering additive is mixed with the calcium sulfate to prepare a mixture.

In the step S3, the mixture is shaped in a mold to form a sample (or product).

In the step S4, the sample (or product) is fired at the temperature ranging from 600° C. to 1400° C. to obtain the calcium sulfate ceramic material. Hence, the sintered calcium sulfate ceramic material includes or consists of the calcium sulfate and the sintering additive. The sintering temperature is above 600° C. The optimum sintering temperature is 800° C., 1000° C., 1200° C. or 1400° C.

The sintering additive used in the present invention is selected from the group consisting of a +1 valence element and its compound, a +2 valence element and its compound, a +3 valence element and its compound, a +4 valence element and its compound and a +5 valence element and its compound. That is, the sintering additive is selected from the +1 and/or +2 and/or +3 and/or +4 and/or +5 valence elements and/or their chemical compounds. The amount of the sintering additive in the mixture is in a range of 0.1 wt % to 50 wt %. The better amount of sintering additive is in a range of 0.5 wt % to 50 wt %; and the optimum amount of sintering additive is in a range of 0.5 wt % to 15 wt %. After sintering, the calcium sulfate ceramic material has the optimum flexural strength of about 90 MPa and compressive strength of about 183 MPa.

Hereinafter, a method of the present invention that can improve the sintering ability of calcium sulfate by adding +1 and/or +2 and/or +3 and/or +4 and/or +5 valence elements and/or their chemical compounds is disclosed according to the following examples.

EXAMPLES 1 TO 6

The materials used in these EXAMPLES were calcium sulfate ($CaSO_4$) powder and +4 valence chemical compounds (e.g. silica, $SiO_2$). First, the calcium sulfate and silica powders were mixed together uniformly. The amounts of silica were 1 wt %, 10 wt % and 50 wt %. The mixed powders were consolidated into discs of 25.4 mm diameter and 3 mm thickness. These disc samples were sintered at 900° C. to 1300° C.

for 3 hours. The densities of samples were recorded after sintering, as shown in the Table 1.

TABLE 1

|  |  | CaSO$_4$ | CaSO$_4$ + 1 wt % SiO$_2$ | CaSO$_4$ + 10 wt % SiO$_2$ | CaSO$_4$ + 50 wt % SiO$_2$ |
| --- | --- | --- | --- | --- | --- |
| EXAMPLE 1 | 25° C. density (g/cm$^3$) | 2.1 | 1.5 | 1.7 | 1.5 |
| EXAMPLE 2 | 900° C. density (g/cm$^3$) | / | 1.6 | 1.5 | 1.4 |
| EXAMPLE 3 | 1000° C. density (g/cm$^3$) | / | 2.0 | 1.6 | 1.5 |
| EXAMPLE 4 | 1100° C. density (g/cm$^3$) | / | 2.7 | 1.6 | 1.9 |
| EXAMPLE 5 | 1200° C. density (g/cm$^3$) | / | 2.6 | 1.5 | 1.5 |
| EXAMPLE 6 | 1300° C. density (g/cm$^3$) | / | 2.2 | / | 1.5 |

/: The density of samples cannot be measured due to collapse of the samples.

Hereinbefore, the EXAMPLES show that the density of calcium sulfate (CaSO$_4$) increases after the suitable heat treatment. It indicates that the sintering ability of calcium sulfate can be improved by adding various amounts (1 wt %, 10 wt % and 50 wt %) of +4 valence chemical compounds (e.g. silica, SiO$_2$).

EXAMPLE 7

The samples for this EXAMPLE of the present invention were prepared using the same method as in EXAMPLE 2. The samples were fired at 900° C. for 3 hours. The photographs of samples are shown in FIGS. 2(a) to 2(d).

Hereinbefore, the EXAMPLE shows that the calcium sulfate samples added with the +4 valence compounds (e.g. SiO$_2$) exhibit better sintering ability during the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 2(a)). It indicates that the sintering ability of calcium sulfate can be improved by adding various amounts (1 wt %, 10 wt % and 50 wt %) of +4 valence chemical compounds (e.g. silica, SiO$_2$).

EXAMPLE 8

The samples for this EXAMPLE of the present invention were prepared using the same method as in EXAMPLE 3. The samples were fired at 1000° C. for 3 hours. The photographs of samples are shown in FIGS. 3(a) to 3(d).

Hereinbefore, the EXAMPLE shows that the calcium sulfate samples added with the +4 valence compounds (e.g. SiO$_2$) exhibit improved sintering ability during the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 3(a)). It indicates that the sintering ability of calcium sulfate can be improved by adding various amounts (1 wt %, 10 wt % and 50 wt %) of +4 valence chemical compounds (e.g. silica, SiO$_2$).

EXAMPLE 9

The samples for this EXAMPLE of the present invention were prepared using the same method as in EXAMPLE 4. The samples were fired at 1100° C. for 3 hours. The photographs of samples are shown in FIGS. 4(a) to 4(d).

Hereinbefore, the example shows that the sintering ability of calcium sulfate samples is improved after adding the +4 valence compounds (e.g. SiO$_2$) and after the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 4(a)). It indicates that the sintering ability of calcium sulfate can be improved by adding various amounts (1 wt %, 10 wt % and 50 wt %) of +4 valence chemical compounds (e.g. silica, SiO$_2$).

EXAMPLE 10

The samples for this EXAMPLE of the present invention were prepared using the same method as in EXAMPLE 5. The samples were fired at 1200° C. for 3 hours. The photographs of samples are shown in FIGS. 5(a) to 5(d).

Hereinbefore, the example shows that the sintering ability of calcium sulfate samples is improved after adding the +4 valence compounds (e.g. SiO$_2$) and the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 5(a)). It indicates that the sintering ability of calcium sulfate can be improved by adding various amounts (1 wt %, 10 wt % and 50 wt %) of +4 valence chemical compounds (e.g. silica, SiO$_2$).

EXAMPLE 11

Figure 6A:
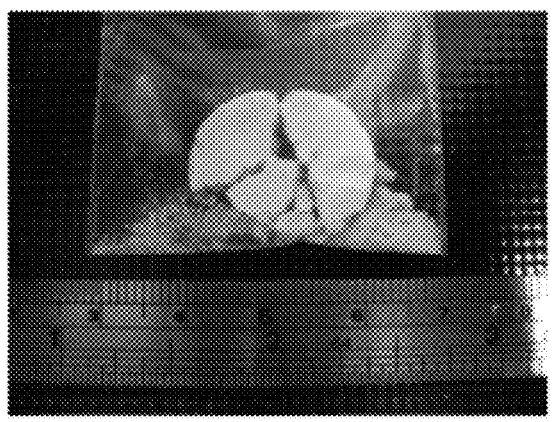
FIGS. 6(a) to 6(c) respectively depict the photographs of (a) calcium sulfate, (b) calcium sulfate+1 wt % silica and (c) calcium sulfate+50 wt % silica specimens after firing at 1300° C.
Figure 6B:
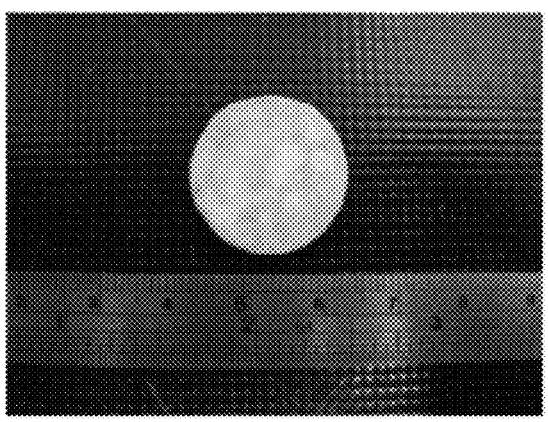
Figure 6C:
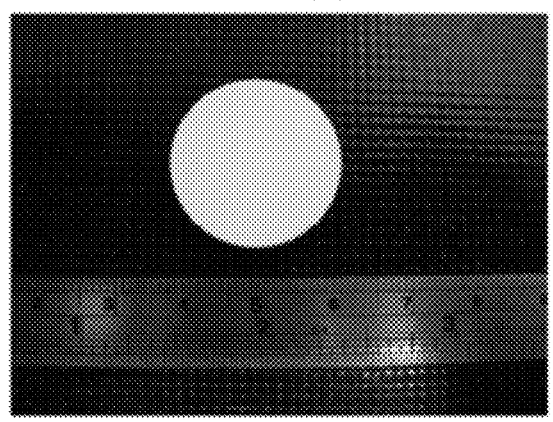
Figure 7A:
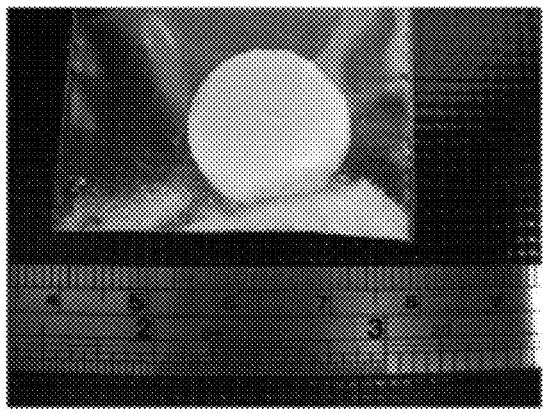
FIGS. 7(a) to 7(e) respectively depict the photographs of (a) calcium sulfate, (b) calcium sulfate+5 wt % silica+9.5 wt % sodium hydrogen carbonate, (c) calcium sulfate+5 wt % silica+9.5 wt % calcium oxide, (d) calcium sulfate+5 wt % silica+9.5 wt % aluminum oxide and (e) calcium sulfate+5 wt % silica+9.5 wt % zirconium dioxide specimens after firing at 900° C.
Figure 7B:
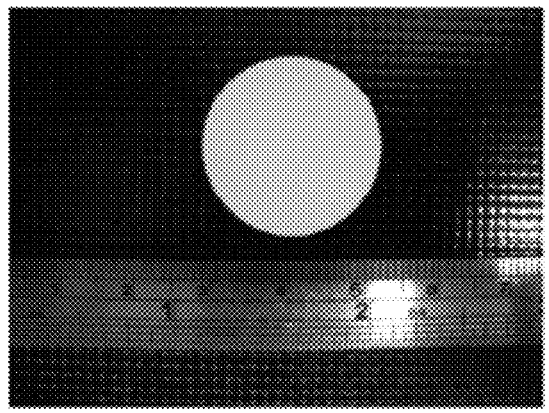
Figure 7C:
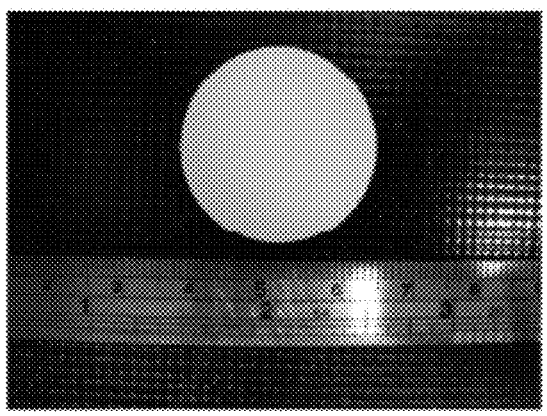
Figure 7D:
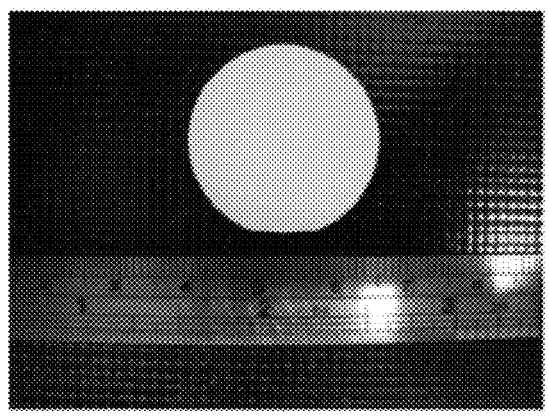
Figure 7E:
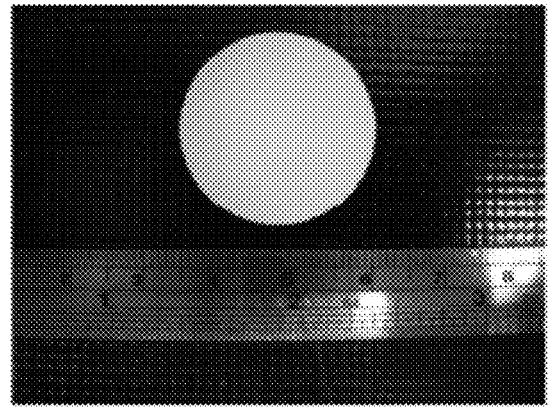
Figure 8A:
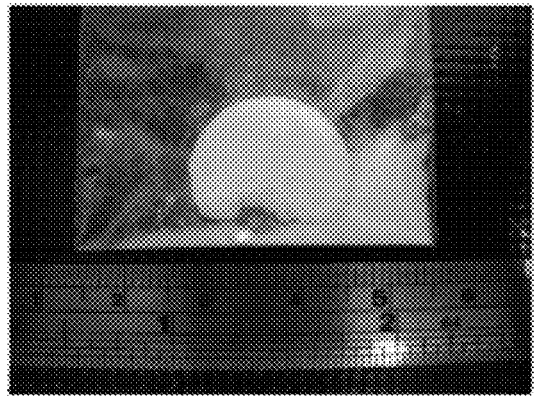
FIGS. 8(a) to 8(e) respectively depict the photographs of (a) calcium sulfate, (b) calcium sulfate+5 wt % silica+9.5 wt % sodium hydrogen carbonate, (c) calcium sulfate+5 wt % silica+9.5 wt % calcium oxide, (d) calcium sulfate+5 wt % silica+9.5 wt % aluminum oxide and (e) calcium sulfate+5 wt % silica+9.5 wt % zirconium dioxide specimens after firing at 1000° C.
Figure 8B:
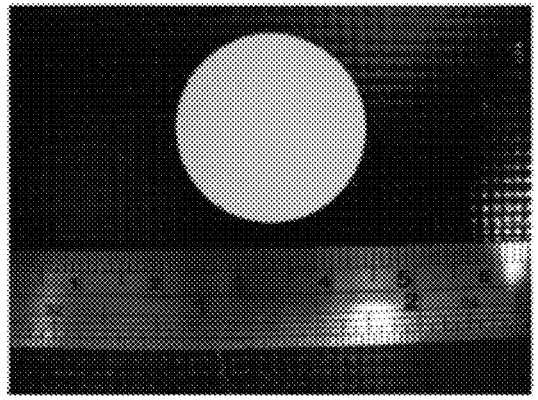
Figure 8C:
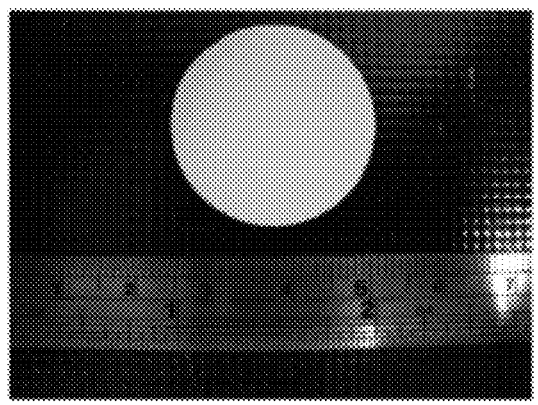
Figure 8D:
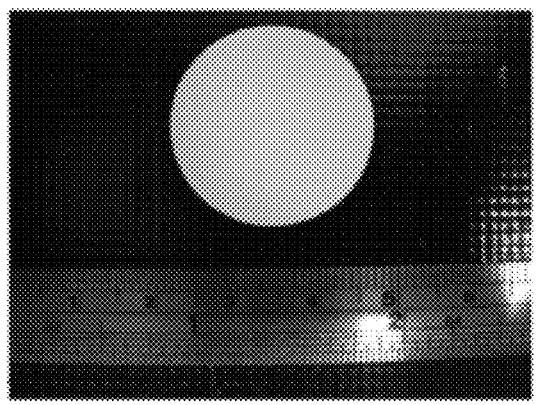
Figure 8E:
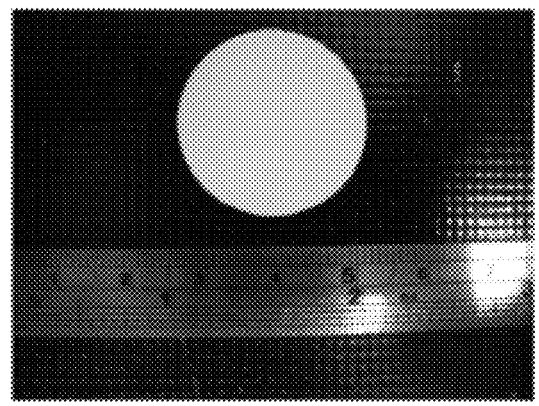
Figure 9A:
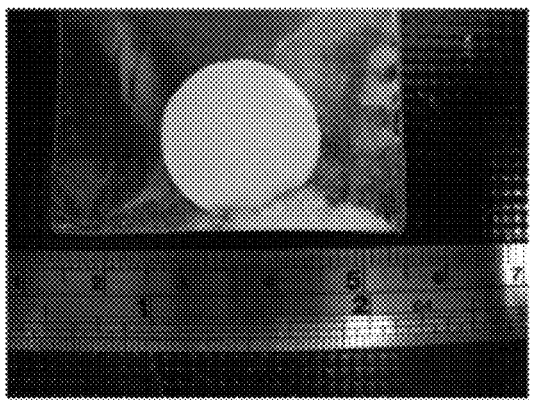
FIGS. 9(a) to 9(e) respectively depict the photographs of (a) calcium sulfate, (b) calcium sulfate+5 wt % silica+9.5 wt % sodium hydrogen carbonate, (c) calcium sulfate+5 wt % silica+9.5 wt % calcium oxide, (d) calcium sulfate+5 wt % silica+9.5 wt % aluminum oxide and (e) calcium sulfate+5 wt % silica+9.5 wt % zirconium dioxide specimens after firing at 1100° C.
Figure 9B:
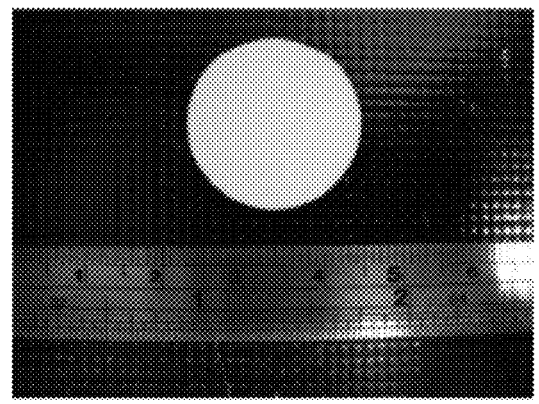
Figure 9C:
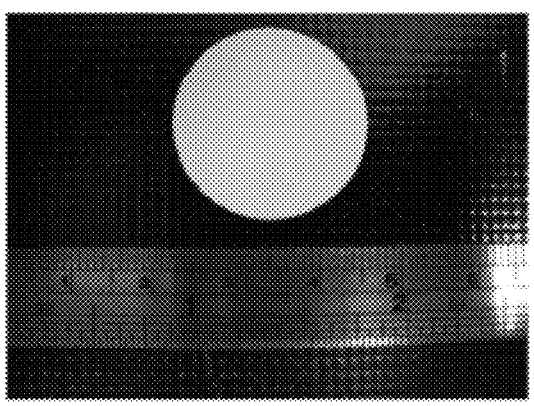
Figure 9D:
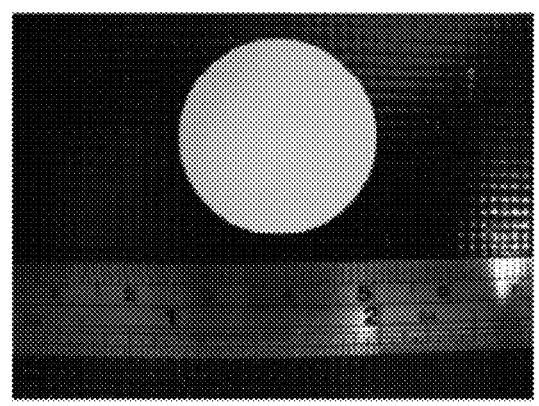
Figure 9E:
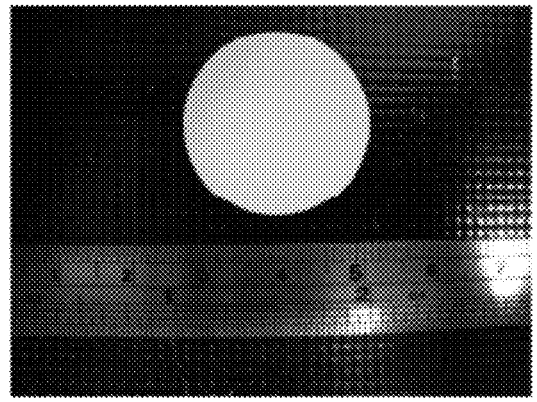
Figure 10A:
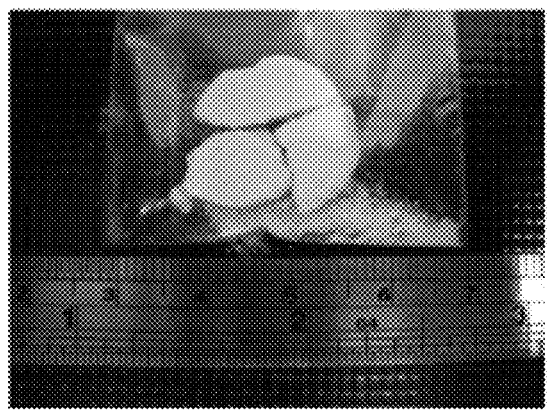
FIGS. 10(a) to 10(d) respectively depict the photographs of (a) calcium sulfate, (b) calcium sulfate+5 wt % silica+9.5 wt % calcium oxide, (c) calcium sulfate+5 wt % silica+9.5 wt % aluminum oxide and (d) calcium sulfate+5 wt % silica+9.5 wt % zirconium dioxide specimens after firing at 1200° C.
Figure 10B:
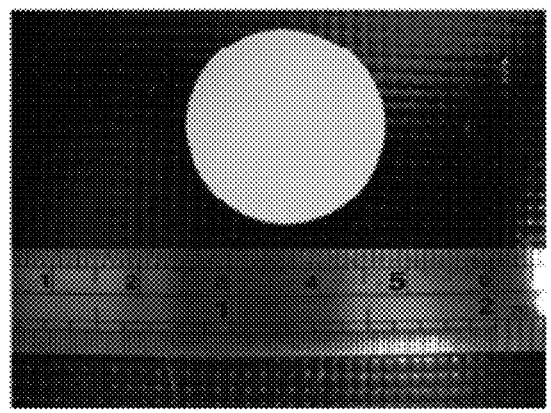
Figure 10C:
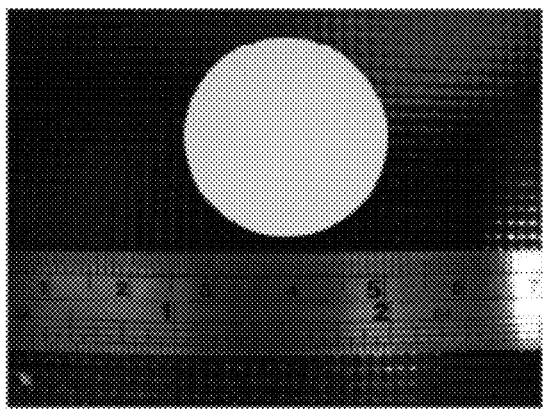
Figure 10D:
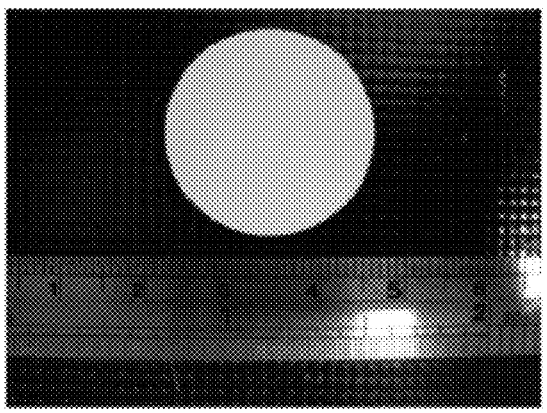
Figure 11A:
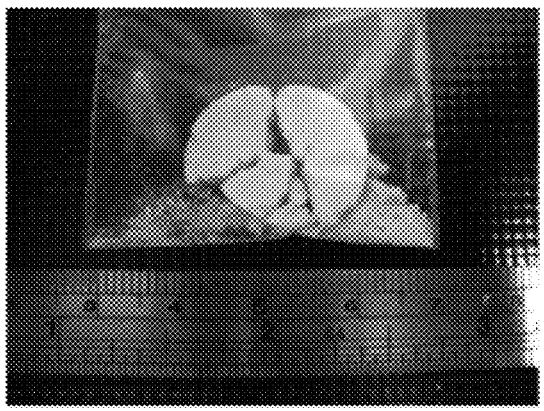
FIGS. 11(a) to 11(d) respectively depict the photographs of (a) calcium sulfate, (b) calcium sulfate+5 wt % silica+9.5 wt % calcium oxide, (c) calcium sulfate+5 wt % silica+9.5 wt % aluminum oxide and (d) calcium sulfate+5 wt % silica+9.5 wt % zirconium dioxide specimens after firing at 1300° C.
Figure 11B:
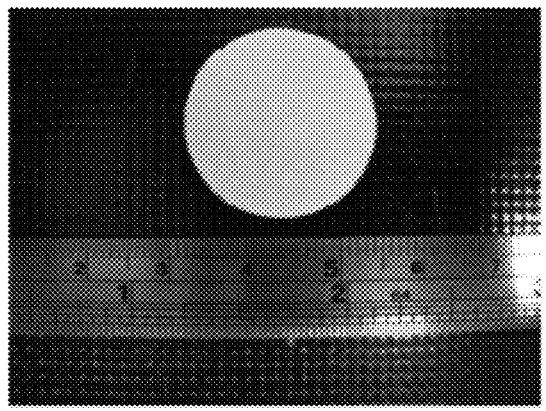
Figure 11C:
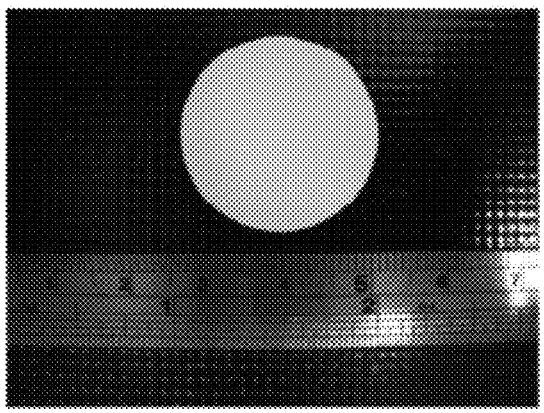
Figure 11D:
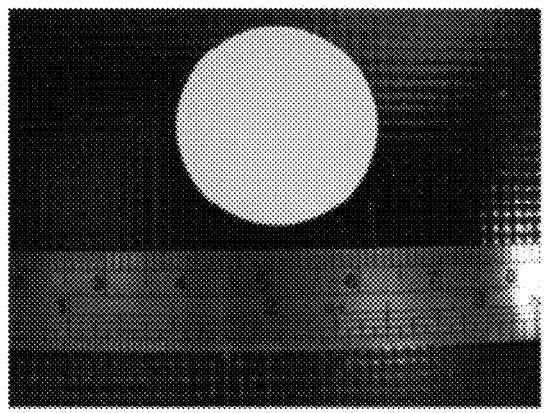

The samples for this EXAMPLE of the present invention were prepared using the same method as in EXAMPLE 6. The samples were fired at 1300° C. for 3 hours. The photographs of samples are shown in FIGS. 6(a) to 6(c).

Hereinbefore, the example shows that the sintering ability of calcium sulfate samples is improved after adding the +4 valence compounds (e.g. SiO$_2$) and the heat treatment. The amounts of +4 valence compounds are 1 wt % and 50 wt %. After the heat treatment, the calcium sulfate samples added with the +4 valence compound still hold their shapes. However, the calcium sulfate without the additives collapses after the heat treatment (see FIG. 6(a)). It indicates that the sintering ability of calcium sulfate can be improved by adding various amounts (1 wt % and 50 wt %) of +4 valence chemical compounds (e.g. silica, SiO$_2$).

EXAMPLES 12 TO 16

The disc samples for these EXAMPLES of the present invention were prepared using the same methods as in EXAMPLES 2 to 6. The samples were fired at 900° C. to 1300° C. for 3 hours. The samples were then ground to obtain flat surfaces. The flexural strength of disc samples was measured by using the biaxial 4-ball bending test (instrument: MTS810, MTS Co., USA) at the room temperature. The displacement rate was 0.48 min/min. The flexural strength of samples is presented in the Table 2.

TABLE 2

|  |  | $CaSO_4$ | $CaSO_4$ + 1 wt % $SiO_2$ | $CaSO_4$ + 10 wt % $SiO_2$ | $CaSO_4$ + 50 wt % $SiO_2$ |
|---|---|---|---|---|---|
| EXAMPLE 12 | 900° C./flexural strength (MPa) | / | 3.1 | 2.8 | 8.9 |
| EXAMPLE 13 | 1000° C./flexural strength (MPa) | / | 17.0 | 7.5 | 26.0 |
| EXAMPLE 14 | 1100° C./flexural strength (MPa) | / | 41.0 | 12.9 | 39.1 |
| EXAMPLE 15 | 1200° C./flexural strength (MPa) | / | 26.1 | 22.2 | 90.4 |
| EXAMPLE 16 | 1300° C./flexural strength (MPa) | / | 17.0 | / | 81.1 |

/: The flexural strength of samples cannot be measured due to the collapse of the samples.

Hereinbefore, the EXAMPLES show that the flexural strength of pure calcium sulfate ($CaSO_4$) cannot be measured owing to the collapse of samples. It indicates that the pure calcium sulfate cannot be sintered by using only the heat treatment. However, the flexural strength of the $CaSO_4$ samples added with the +4 valence compound (e.g. $SiO_2$) increases after the heat treatment. The amounts of +4 valence compounds are 1 wt %, 10 wt % and 50 wt %. For certain condition, the flexural strength of samples is about 90 MPa. It indicates that the sintering ability of calcium sulfate can be improved by adding various amounts (1 wt %, 10 wt % and 50 wt %) of +4 valence chemical compounds (e.g. silica, $SiO_2$).

Hereinbefore, the EXAMPLES present that only one element or its compound is added into the calcium sulfate. Hereinafter, the EXAMPLES show that two kinds of sintering additives also can be added into calcium sulfate to improve the sintering ability of calcium sulfate. All the materials used in the following EXAMPLES of the present invention are calcium sulfate ($CaSO_4$) powder, +1 valence compound (e.g. sodium hydrogen carbonate, $NaHCO_3$), +2 valence compound (e.g. calcium oxide, CaO), +3 valence compound (e.g. aluminum oxide, $Al_2O_3$) and +4 valence compound (e.g. zirconium oxide, $ZrO_2$ and silica, $SiO_2$). The two kinds of sintering additives are chosen from any +1 and/or +2 and/or +3 and/or +4 chemical compounds. The chemical compounds mentioned hereinbefore can be prepared by heating up the elements in air.

EXAMPLES 17 TO 22

The preparation steps for samples in EXAMPLE 17 to 22 are shown below. Firstly, calcium sulfate ($CaSO_4$) was mixed uniformly with 5 wt % $SiO_2$ and +1 valence chemical compound (e.g. $NaHCO_3$) or +2 valence chemical compound (e.g. CaO) or +3 valence chemical compound (e.g. $Al_2O_3$) or +4 valence chemical compound (e.g. $ZrO_2$) respectively. The mixed powders were consolidated into discs of 25.4 mm diameter and 3 mm thickness. These disc samples were sintered at 900° C. to 1300° C. for 3 hours. The densities of samples were recorded after sintering, as shown in the Table 3.

TABLE 3

|  |  | $CaSO_4$ | $CaSO_4$ + 5 wt % $SiO_2$ and 9.5 wt % $NaHCO_3$ | $CaSO_4$ + 5 wt % $SiO_2$ and 9.5 wt % CaO | $CaSO_4$ + 5 wt % $SiO_2$ and 9.5 wt % $Al_2O_3$ | $CaSO_4$ + 5 wt % $SiO_2$ and 9.5 wt % $ZrO_2$ |
|---|---|---|---|---|---|---|
| EXAMPLE 17 | 25° C. density (g/cm³) | 2.1 | 1.5 | 1.5 | 1.7 | 1.7 |
| EXAMPLE 18 | 900° C. density (g/cm³) | / | 2.0 | 1.2 | 1.5 | 1.6 |
| EXAMPLE 19 | 1000° C. density (g/cm³) | / | 2.0 | 1.3 | 1.7 | 1.7 |
| EXAMPLE 20 | 1100° C. density (g/cm³) | / | 2.5 | 1.8 | 1.7 | 1.8 |
| EXAMPLE 21 | 1200° C. density (g/cm³) | / | / | 2.2 | 1.7 | 1.9 |
| EXAMPLE 22 | 1300° C. density (g/cm³) | / | / | 2.0 | 1.5 | 1.6 |

/: The density of samples cannot be measured due to the collapse of the samples.

Hereinbefore, the EXAMPLES show that the density of calcium sulfate ($CaSO_4$) increases after the suitable heat treatment. It indicates that after the heat treatment, the sintering ability of calcium sulfate can be improved by adding any two kinds of sintering additives selected from +1 and/or +2 and/or +3 and/or +4 valence compounds.

EXAMPLE 23

The samples for this EXAMPLE of the present invention were prepared using the same method as in EXAMPLE 18. The samples were $CaSO_4$ added 5 wt % $SiO_2$ and 9.5 wt % $NaHCO_3$, $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 900° C. for 3 hours. The photographs of samples are shown in FIGS. 7(a) to 7(e).

Hereinbefore, the EXAMPLE shows that the calcium sulfate samples added with any two kinds of sintering additives exhibit improved sintering ability during the heat treatment. These two kinds of additives are selected form +1 valence compounds (e.g. $NaHCO_3$) or +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with the sintering additives still hold their shapes. However, the calcium sulfate without the additives collapses after the heat treatment (see FIG. 7(a)). It indicates that the sintering ability of calcium sulfate can be improved by adding any two different kinds of additives selected from +1 and/or +2 and/or +3 and/or +4 valence compounds.

EXAMPLE 24

The samples for this EXAMPLE of the present invention were prepared using the same method as in EXAMPLE 19. The samples were $CaSO_4$ added 5 wt % $SiO_2$ and 9.5 wt % $NaHCO_3$, $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 1000° C. for 3 hours. The photographs of samples are shown in FIGS. 8(a) to 8(e).

Hereinbefore, the EXAMPLE shows that the calcium sulfate samples added with any two kinds of sintering additives exhibit improved sintering ability during the heat treatment. These two kinds of additives are selected form +1 valence compounds (e.g. $NaHCO_3$) or +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with the sintering additives still hold their shapes. However, the calcium sulfate without the additives collapses after the heat treatment (see FIG. 8(a)). It indicates that the sintering ability of calcium sulfate can be improved by adding any two different kinds of additives selected from +1 and/or +2 and/or +3 and/or +4 valence compounds.

EXAMPLE 25

The samples for this EXAMPLE of the present invention were prepared using the same method as in EXAMPLE 20. The samples were $CaSO_4$ added 5 wt % $SiO_2$ and 9.5 wt % $NaHCO_3$, $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 1100° C. for 3 hours. The photographs of samples are shown in FIGS. 9(a) to 9(e).

Hereinbefore, the EXAMPLE shows that the calcium sulfate samples added with any two kinds of sintering additives exhibit improved sintering ability during the heat treatment. These two kinds of additives are selected form +1 valence compounds (e.g. $NaHCO_3$) or +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with the sintering additives still hold their shapes. However, the calcium sulfate without the additives collapses after the heat treatment (see FIG. 9(a)). It indicates that the sintering ability of calcium sulfate can be improved by adding any two different kinds of additives selected from +1 and/or +2 and/or +3 and/or +4 valence compounds.

EXAMPLE 26

The samples for this EXAMPLE of the present invention were prepared using the same method as in EXAMPLE 21. The samples were $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 1200° C. for 3 hours. The photographs of samples are shown in FIGS. 10(a) to 10(d).

Hereinbefore, the EXAMPLE shows that the calcium sulfate samples added with any two kinds of sintering additives exhibit improved sintering ability during the heat treatment. These two kinds of additives are selected form +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with sintering additives still hold their shapes. However, the calcium sulfate without the additives collapses after the heat treatment (see FIG. 10(a)). It indicates that the sintering ability of calcium sulfate can be improved by adding any two different kinds of additives selected from +1 and/or +2 and/or +3 and/or +4 valence compounds.

EXAMPLE 27

The samples for this EXAMPLE of the present invention were prepared using the same method as in EXAMPLE 22. The samples were $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 1300° C. for 3 hours. The photographs of samples are shown in FIGS. 11(a) to 11(d).

Hereinbefore, the EXAMPLE shows that the calcium sulfate samples added with any two kinds of sintering additives exhibit improved sintering ability during the heat treatment. These two kinds of additives are selected form +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with the sintering additives still hold their shapes. However, the calcium sulfate without the additives collapses after the heat treatment (see FIG. 11(a)). It indicates that the sintering ability of calcium sulfate can be improved by adding any two different kinds of additives selected from +1 and/or +2 and/or +3 and/or +4 valence compounds.

EXAMPLES 28 TO 32

The disc samples for these EXAMPLES of the present invention were prepared using the same methods as in EXAMPLES 18 to 22. The samples were fired at 900° C. to 1300° C. for 3 hours. The samples were then ground to obtain flat surfaces. The flexural strength of disc samples was measured by using the biaxial 4-ball bending test (instrument: MTS810, MTS Co., USA) at the room temperature. The displacement rate was 0.48 mm/min. The flexural strength of samples is presented in the Table 4.

TABLE 4

| | | CaSO$_4$ | CaSO$_4$ + 5 wt % SiO$_2$ + 9.5 wt % NaHCO$_3$ | CaSO$_4$ + 5 wt % SiO$_2$ + 9.5 wt % CaO | CaSO$_4$ + 5 wt % SiO$_2$ + 9.5 wt % Al$_2$O$_3$ | CaSO$_4$ + 5 wt % SiO$_2$ + 9.5 wt % ZrO$_2$ |
|---|---|---|---|---|---|---|
| EXAMPLE 28 | 900° C./flexural strength (MPa) | / | 44.7 | / | 2.8 | 2.9 |
| EXAMPLE 29 | 1000° C./flexural strength (MPa) | / | 66.5 | 1.7 | 9.7 | 5.1 |
| EXAMPLE 30 | 1100° C./flexural strength (MPa) | / | 80 | 15.9 | 19.6 | 15.5 |
| EXAMPLE 31 | 1200° C./flexural strength (MPa) | / | / | 32 | 16.5 | 25.0 |
| EXAMPLE 32 | 1300° C./flexural strength (MPa) | / | / | 13.6 | 15.1 | 17.0 |

/: The flexural strength of samples cannot be measured due to the collapse of the samples.

Hereinbefore, the EXAMPLES show that the flexural strength of pure calcium sulfate (CaSO$_4$) cannot be measured owing to the collapse of samples. It indicates that the pure calcium sulfate cannot be sintered by using the heat treatment. However, the flexural strength of CaSO$_4$ added with two different kinds of additives increases after firing at a temperature above 900° C. These two kinds of additives are selected form +1 valence compounds (e.g. NaHCO$_3$) or +2 valence compounds (e.g. CaO) or +3 valence compounds (e.g. Al$_2$O$_3$) or +4 valence compounds (e.g. SiO$_2$, ZrO$_2$). It also indicates that the sintering ability of calcium sulfate can be improved by adding two kinds of compounds selected from +1 and/or +2 and/or +3 and/or +4 valence compounds.

Hereinafter, EXAMPLES reveal that the sintering ability of calcium sulfate can be improved by adding three kinds of additives. The combinations of three kinds of additives are selected from any +1 and/or +2 and/or +3 and/or +4 and/or +5 valence compounds. All the materials used for the EXAMPLES are the calcium sulfate mixed with the composite additives. The three kinds of sintering additives are chosen from +1 valence compound (NaHCO$_3$), +2 valence compound (CaO), +3 valence compound (Al$_2$O$_3$), +4 valence compound (SiO$_2$) and +5 valence compound (P$_2$O$_5$).

EXAMPLE 33

First, calcium sulfate (CaSO$_4$) was mixed uniformly with 1 wt % of +1 valence chemical compound (NaHCO$_3$), 5 wt % of +4 valence chemical compound (SiO$_2$) and 9.4 wt % of +2 valence chemical compound (CaO). The mixed powders were formed into discs of 20 mm diameter and 5 mm thickness via gelcasting. These disc samples were sintered at 1100° C. for 3 hours. The densities of samples were recorded after sintering, as shown in the Table 5.

TABLE 5

| | | CaSO$_4$ | CaSO$_4$ + 1 wt % NaHCO$_3$ + 5 wt % SiO$_2$ + 9.4 wt % CaO |
|---|---|---|---|
| EXAMPLE 33 | 1100° C. density (g/cm$^3$) | / | 1.7 |

/: The density of samples cannot be measured due to the collapse of the samples.

Hereinbefore, the EXAMPLE shows that the density of CaSO$_4$ added with sintering additives is increased after the addition of the sintering additives. It indicates that after the heat treatment, the sintering ability of calcium sulfate can be improved by adding NaHCO$_3$, SiO$_2$ and CaO. It also means that after the heat treatment, the sintering ability of calcium sulfate can be improved by adding any three kinds of sintering additives selected from +1 and/or +2 and/or +3 and/or +4 and/or +5 valence compounds.

EXAMPLE 34

Figure 12A:
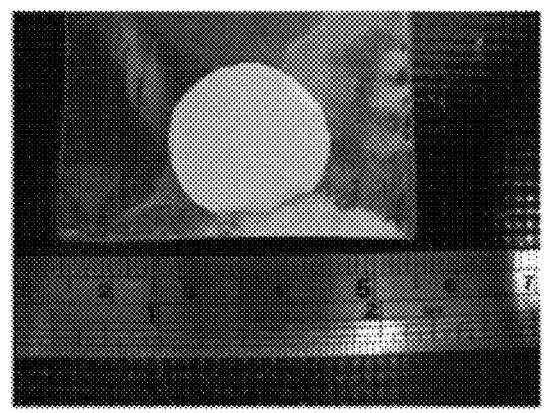
FIGS. 12(a) and 12(b) respectively depict the photographs of (a) calcium sulfate and (b) calcium sulfate+1 wt % sodium hydrogen carbonate+5 wt % silica+9.4 wt % calcium oxide specimens after firing at 1100° C.
Figure 12B:
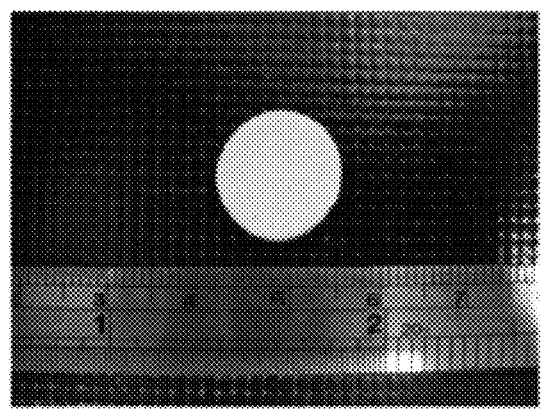

The sample for this EXAMPLE of the present invention was prepared using the same method as in EXAMPLE 33. The compositions of samples were CaSO$_4$ added 1 wt % NaHCO$_3$, 5 wt % SiO$_2$ and 9.4 wt % CaO. These samples were fired at 1100° C. for 3 hours. The photographs of samples are shown in FIGS. 12(a) and 12(b).

Hereinbefore, the EXAMPLE shows that the calcium sulfate samples with the added NaHCO$_3$, SiO$_2$ and CaO additives exhibit improved sintering ability during the heat treatment. The sample added with the sintering additives still holds its shape after the heat treatment. However, the calcium sulfate without the additives collapses after the heat treatment (see FIG. 12(a)). It indicates that the sintering ability of calcium sulfate can be improved by adding any three different kinds of additives selected from +1 and/or +2 and/or +3 and/or +4 and/or +5 valence compounds.

EXAMPLE 35

The disc samples for these examples of the present invention were prepared using the same methods as in EXAMPLE 33. The samples were fired at 1100° C. for 3 hours. The samples were then ground to obtain flat surfaces. The flexural strength of the disc samples was measured by using the biaxial 4-ball bending test (instrument: MTS810, MTS Co., USA) at the room temperature. The displacement rate was 0.48 mm/min. The flexural strength of the samples is presented in the Table 6.

TABLE 6

|  |  | $CaSO_4$ | $CaSO_4$ + 1 wt % $NaHCO_3$ + 5 wt % $SiO_2$ + 9.4 wt % CaO |
|---|---|---|---|
| EXAMPLE 35 | 1100° C./ flexural strength (MPa) | / | 24.0 |

/: The flexural strength of samples cannot be measured due to the collapse of the samples.

Hereinbefore, the EXAMPLE shows that the flexural strength of pure calcium sulfate ($CaSO_4$) cannot be measured owing to the collapse of samples. It indicates that the calcium sulfate cannot be sintered by using the heat treatment. However, the flexural strength of $CaSO_4$ based samples is increased via adding three different kinds of additives. These three kinds of additives are $NaHCO_3$, CaO and $SiO_2$. It also indicates that the sintering ability of calcium sulfate can be improved by adding any three kinds of additives selected from +1 and/or +2 and/or +3 and/or +4 and/or +5 valence chemical compounds.

EXAMPLE 36

Figure 13:
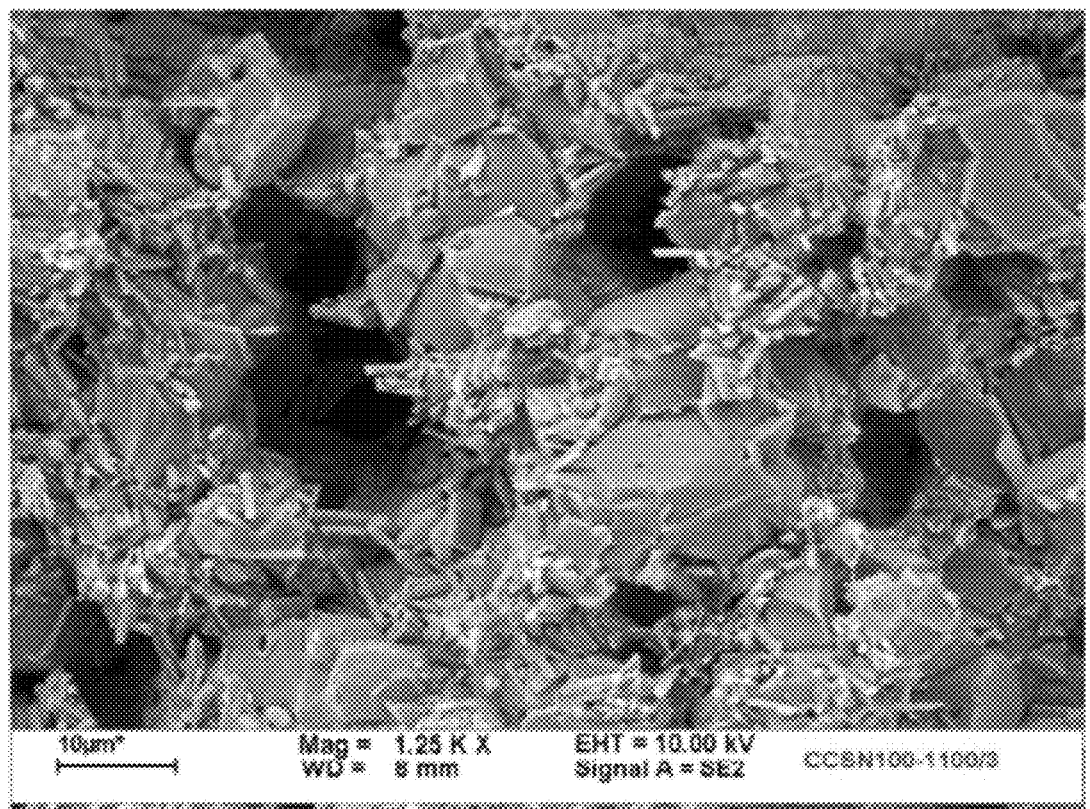
FIG. 13 depicts the SEM micrograph of the specimen after firing at 1100° C., wherein the specimen comprises calcium sulfate+1 wt % sodium hydrogen carbonate+5 wt % silica+9.4 wt % calcium oxide.

The sample for this EXAMPLE of the present invention was prepared using the same method as in EXAMPLE 33. The compositions of samples were $CaSO_4$ added with 1 wt % $NaHCO_3$, 5 wt % $SiO_2$ and 9.4 wt % CaO. These samples were fired at 1100° C. for 3 hours. The SEM micrograph of sample is shown in FIG. 13.

Hereinbefore, the EXAMPLE shows that the calcium sulfate samples added with the $NaHCO_3$, $SiO_2$ and CaO additives exhibit the sintering ability after the heat treatment. It indicates that the sintering ability of calcium sulfate can be improved by adding three different kinds of additives selected from +1 and/or +2 and/or +3 and/or +4 and/or +5 valence compounds.

EXAMPLE 37

This EXAMPLE reveals that the sintering ability of calcium sulfate also can be improved by adding three kinds of additives. The combinations of three kinds of additives were selected from any +1 and/or +2 and/or +3 and/or +4 and/or +5 valence compounds. All the materials used for the EXAMPLE were the calcium sulfate, +2 valence compound (CaO), +4 valence compound ($SiO_2$) and +5 valence compound ($P_2O_5$). Firstly, the calcium sulfate was uniformly mixed with 0.59 wt % $SiO_2$, 0.15 wt % $P_2O_5$ and 0.26 wt % CaO. The mixed powders were consolidated into cylinder samples of 10 mm diameter and 10 mm height. These cylinder samples were sintered at 1100° C. for 1 hour. The densities of samples were recorded after sintering, as shown in the Table 7.

TABLE 7

|  |  | $CaSO_4$ | $CaSO_4$ + 0.15 wt % $P_2O_5$ + 0.26 wt % CaO + 0.59 wt % $SiO_2$ |
|---|---|---|---|
| EXAMPLE 37 | 1100° C. density (g/cm³) | / | 2.8 |

/: The density of samples cannot be measured due to the collapse of the samples.

Hereinbefore, the EXAMPLE reveals that after the heat treatment, the density of calcium sulfate is increased by adding $SiO_2$, $P_2O_5$ and CaO. It means that calcium sulfate exhibits the sintering ability by adding $SiO_2$, $P_2O_5$ and CaO. It also indicates that the addition of three sintering additives, such as $SiO_2$, $P_2O_5$ and CaO, can assist the densification of calcium sulfate.

EXAMPLE 38

Figure 14A:
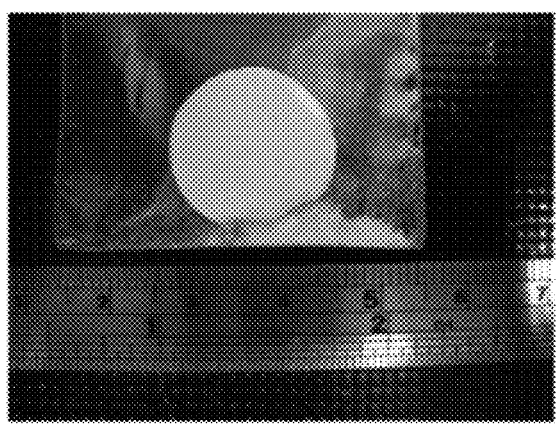
FIGS. 14(a) and 14(b) respectively depict the photographs of (a) calcium sulfate, (b) calcium sulfate+0.15 wt % phosphorus pentoxide+0.26 wt % calcium oxide+0.59 wt % silica specimens after firing at 1100° C.
Figure 14B:
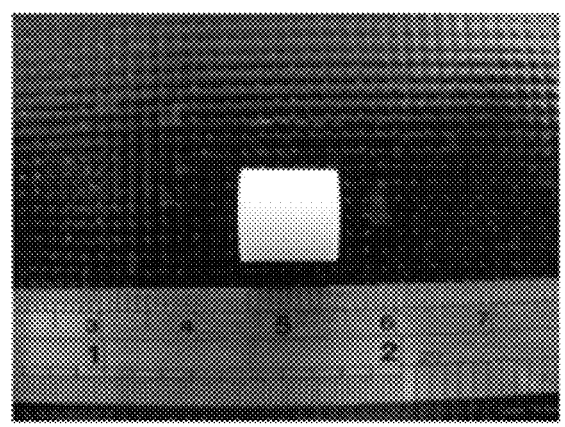
Figure 15A:
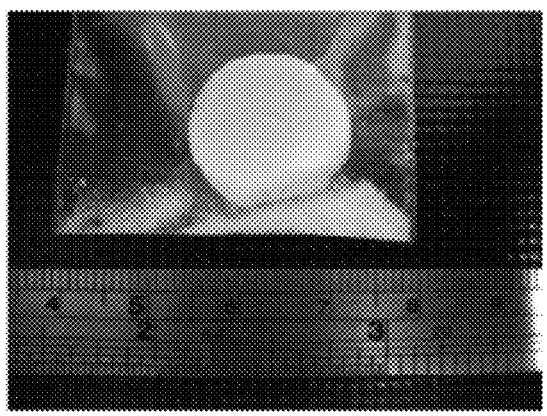
FIGS. 15(a) to 15(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 900° C., wherein SPCN is the combination of $SiO_2$, $P_2O_5$, CaO and $NaHCO_3$.
Figure 15B:
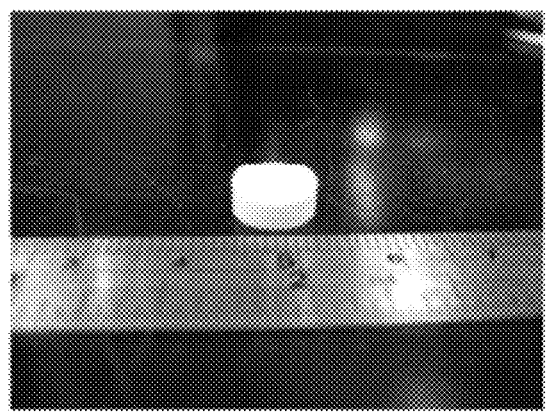
Figure 15C:
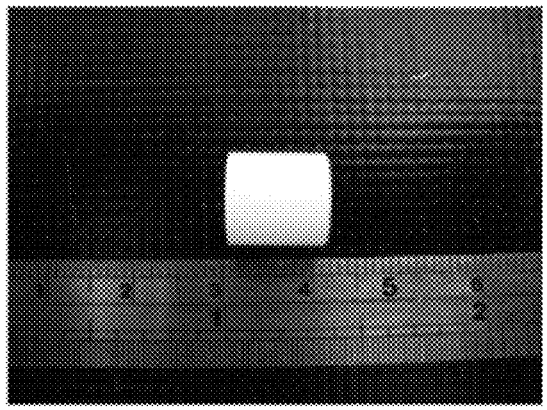
Figure 15D:
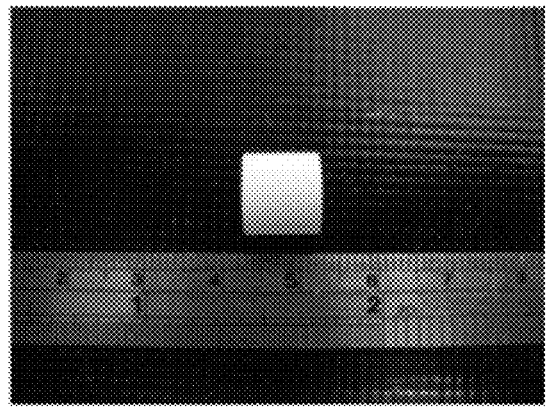
Figure 16A:
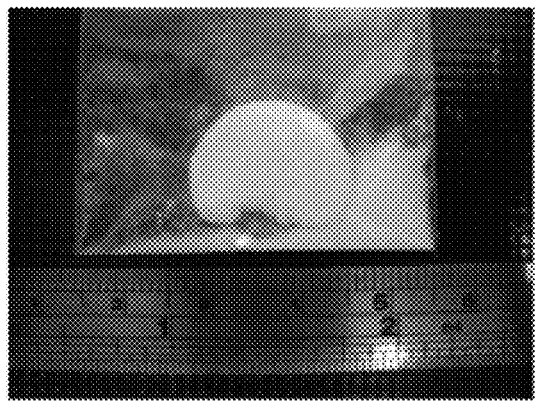
FIGS. 16(a) to 16(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 1000° C.
Figure 16B:
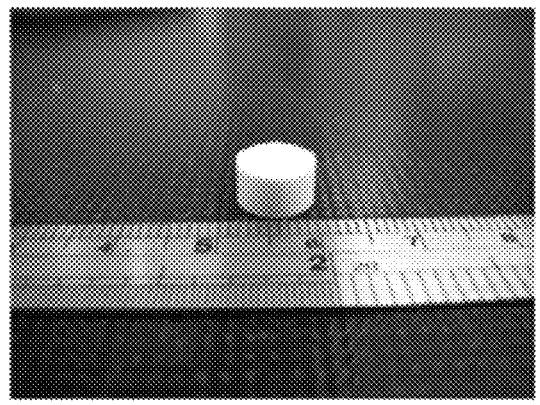
Figure 16C:
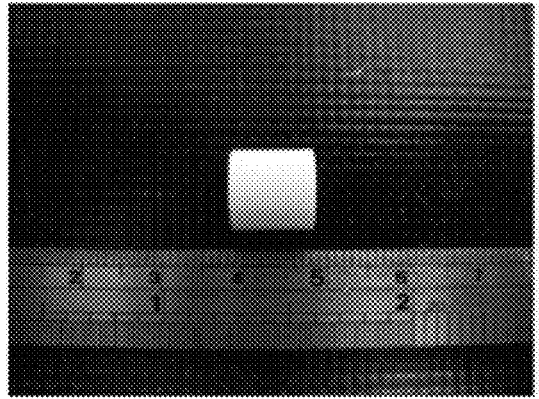
Figure 16D:
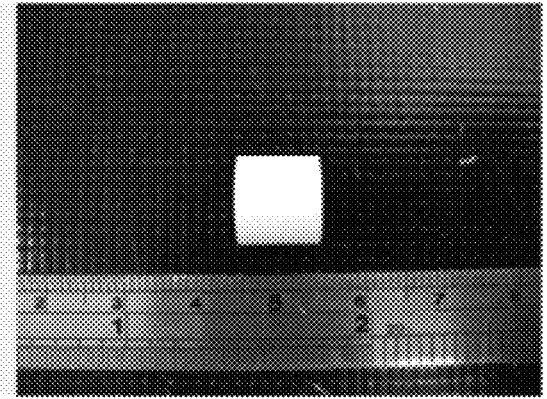
Figure 17A:
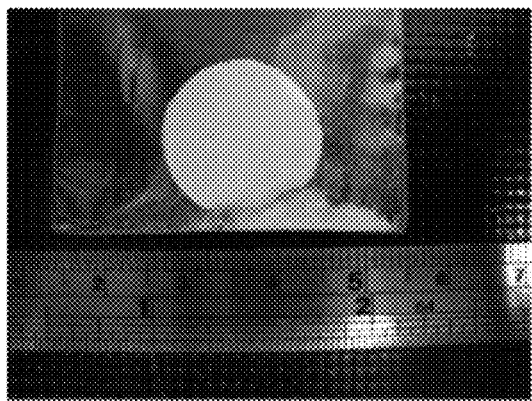
FIGS. 17(a) to 17(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 1100° C.
Figure 17B:
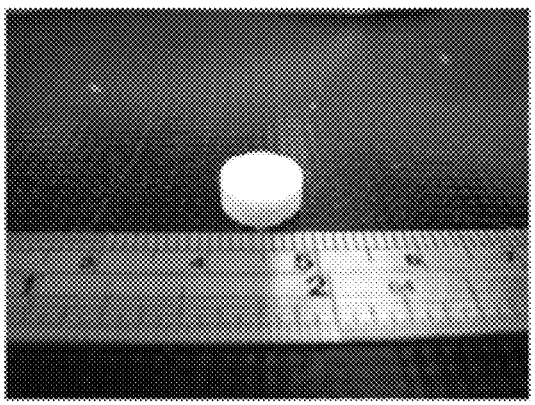
Figure 17C:
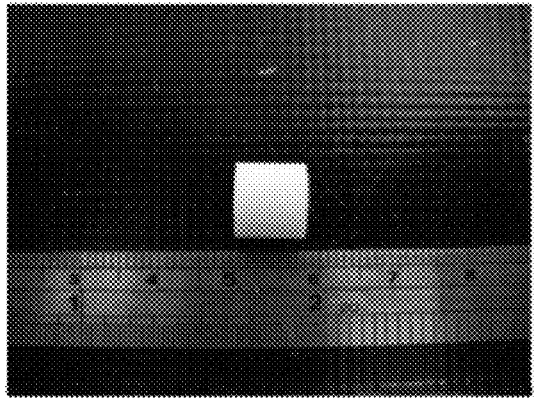
Figure 17D:
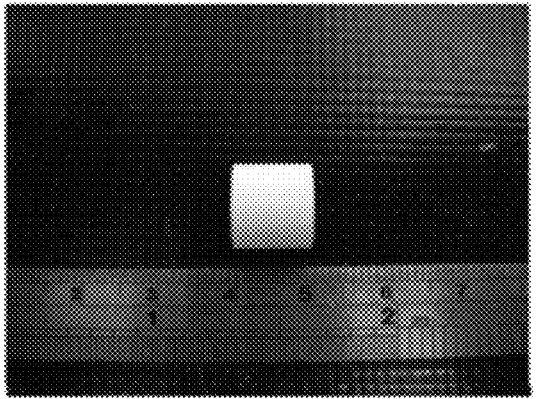
Figure 18A:
FIGS. 18(a) to 18(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 1200° C.
Figure 18B:
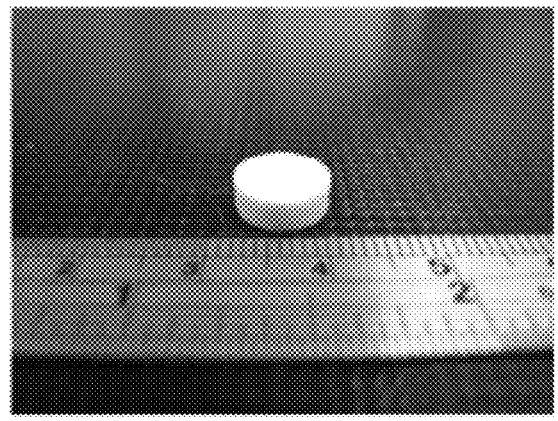
Figure 18C:
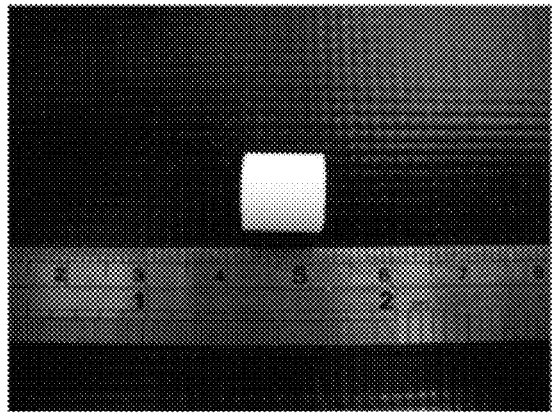
Figure 18D:
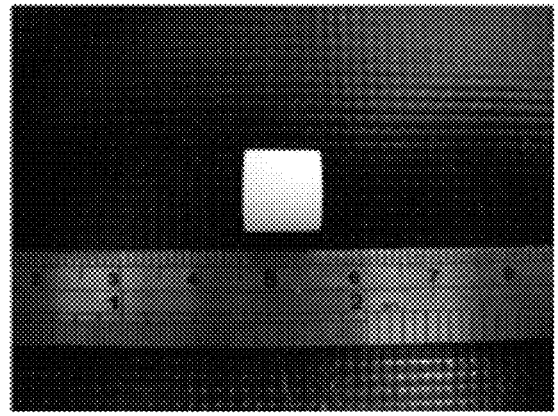
Figure 19A:
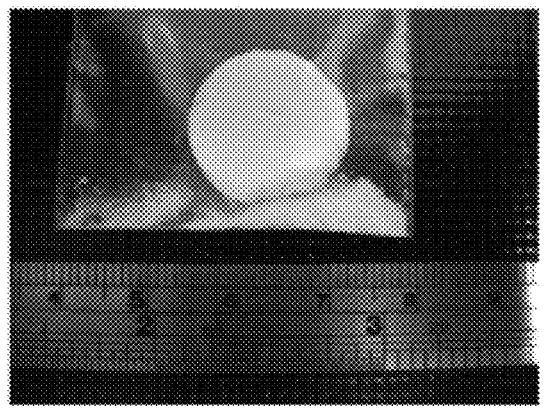
FIGS. 19(a) to 19(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 900° C., wherein SP is the combination of $SiO_2$ and $P_2O_5$; SPN is the combination of $SiO_2$, $P_2O_5$ and $NaHCO_3$; SPC is the combination of $SiO_2$, $P_2O_5$ and CaO; and SPCN is the combination of $SiO_2$, $P_2O_5$, CaO and $NaHCO_3$.
Figure 19B:
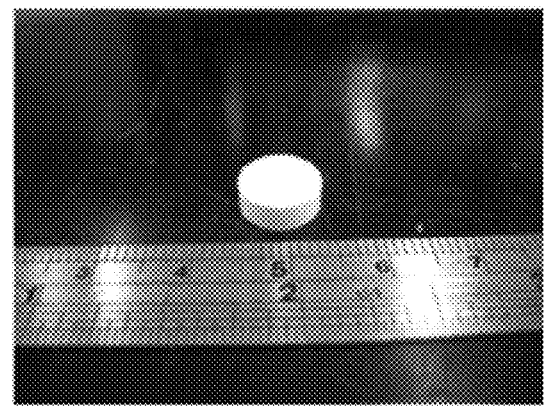
Figure 19C:
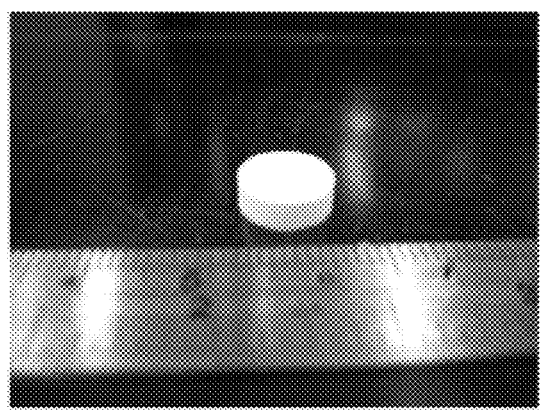
Figure 19D:
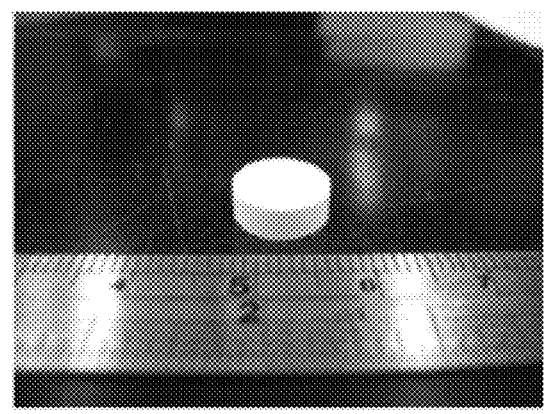
Figure 19E:
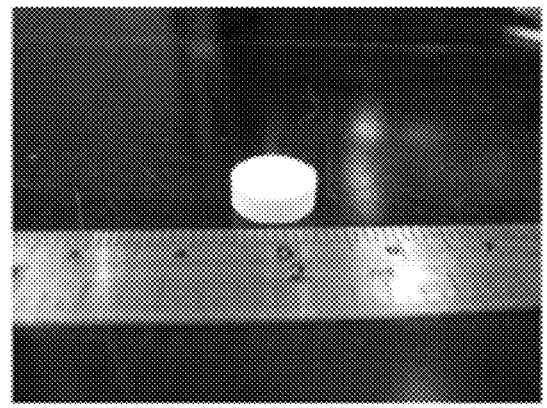
Figure 20A:
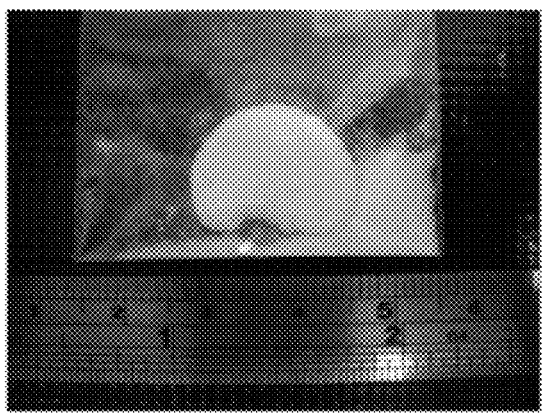
FIGS. 20(a) to 20(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 1000° C.
Figure 20B:
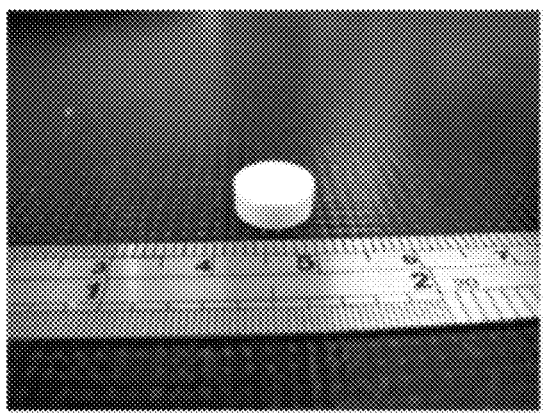
Figure 20C:
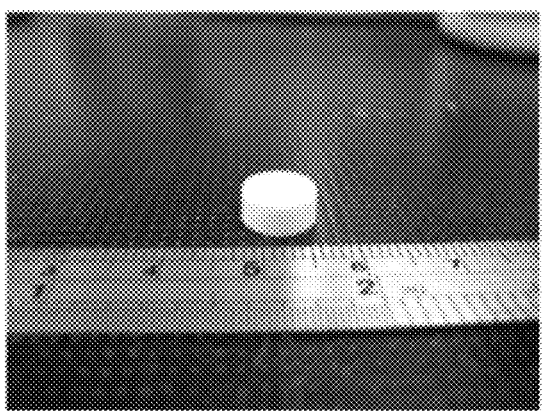
Figure 20D:
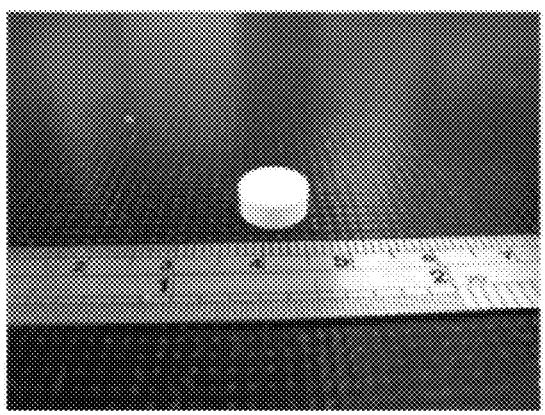
Figure 20E:
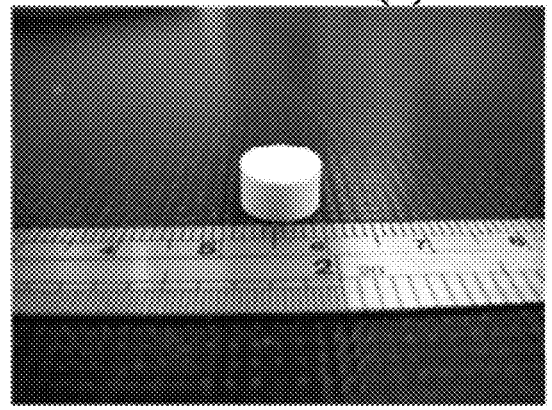
Figure 21A:
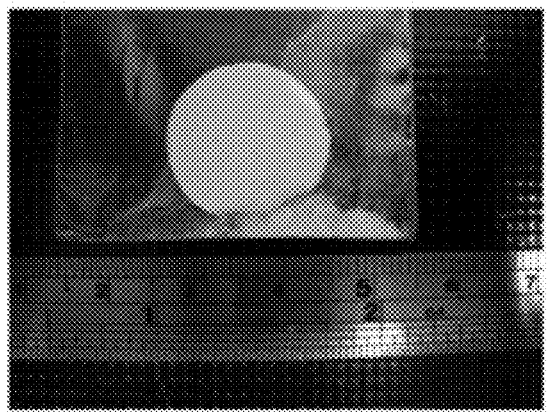
FIGS. 21(a) to 21(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 1100° C.
Figure 21B:
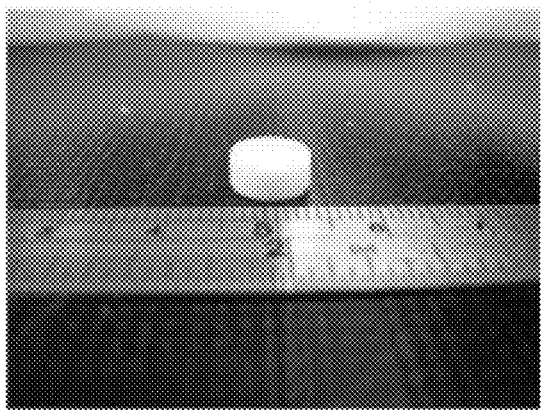
Figure 21C:
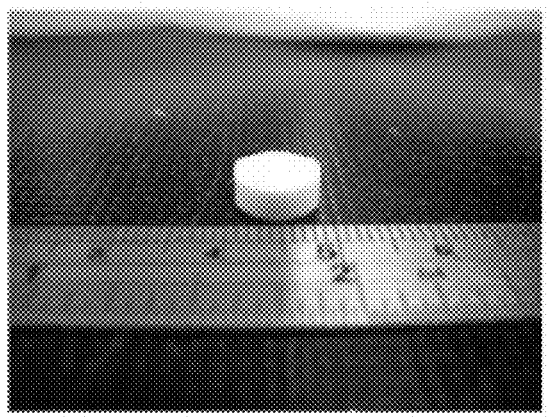
Figure 21D:
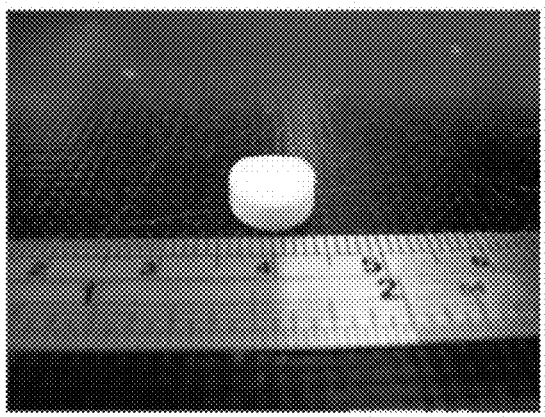
Figure 21E:
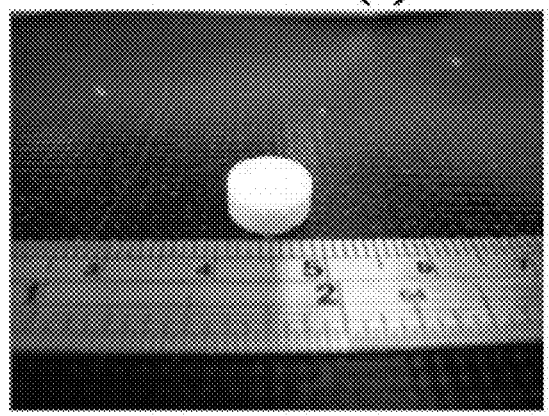
Figure 22A:
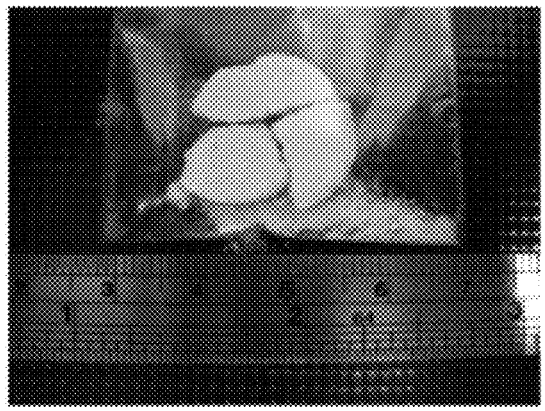
FIGS. 22(a) to 22(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 1200° C.
Figure 22B:
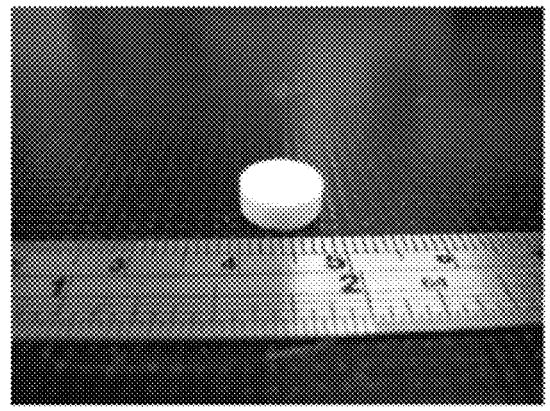
Figure 22C:
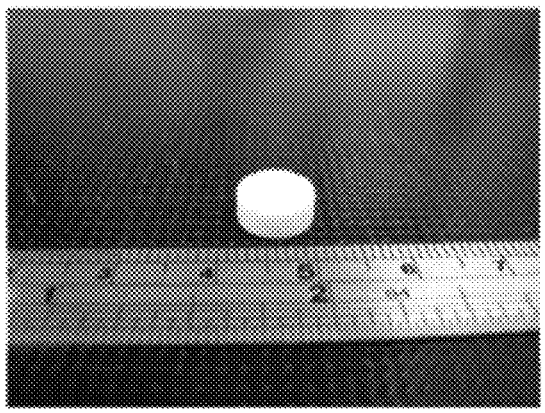
Figure 22D:
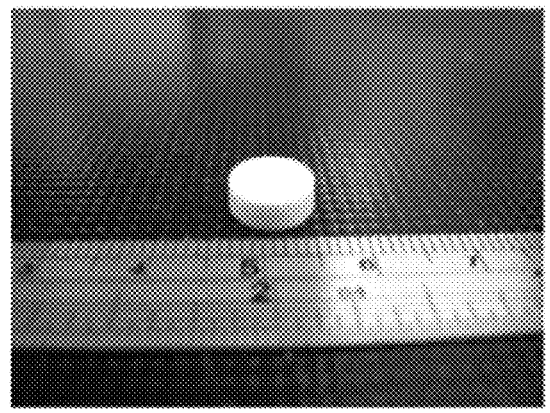
Figure 22E:
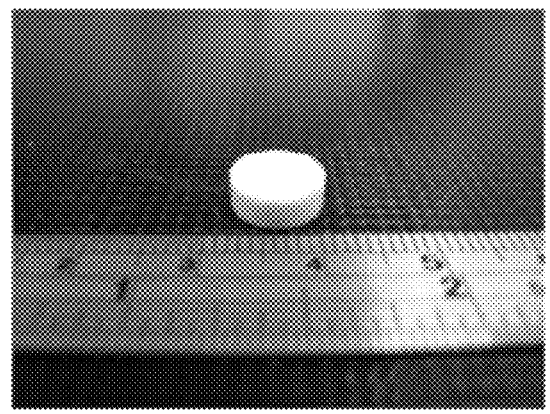

The sample for this EXAMPLE of the present invention was prepared using the same method as in EXAMPLE 37. The compositions of sample were $CaSO_4$ added with 0.15 wt % $P_2O_5$, 0.26 wt % CaO and 0.59 wt % $SiO_2$. The sample was fired at 1100° C. for 1 hour. The photographs of samples are shown in FIGS. 14(a) and 14(b).

Hereinbefore, the EXAMPLE shows that the calcium sulfate samples added with $P_2O_5$, CaO and $SiO_2$ additives exhibit the sintering ability after the heat treatment. The sample added with the sintering additives still holds its shape after the heat treatment. However, the calcium sulfate without the additives collapsed after the heat treatment (see FIG. 14(a)). It indicates that the sintering ability of calcium sulfate can be improved by adding any three different kinds of additives selected from +1 and/or +2 and/or +3 and/or +4 and/or +5 valence compounds.

EXAMPLE 39

The cylinder sample for this EXAMPLE of the present invention was prepared using the same method as in EXAMPLE 37. The compositions of sample were $CaSO_4$ added with 0.15 wt % $P_2O_5$, 0.26 wt % CaO and 0.59 wt % $SiO_2$. The sample was made into cylinder of 10 mm diameter and 10 mm height. The sample was fired at 1100° C. for 1 hour. The sample was first ground to obtain a flat surface, and then the compressive strength of cylinder samples was measured at room temperature by using the universal testing instrument (MTS810, MTS, USA). The displacement rate was 0.96 mm/min during testing. The ratio of diameter to height is 1 to 1. The compressive strength of samples is listed in the Table 8.

TABLE 8

|  |  | $CaSO_4$ | $CaSO_4$ + 0.15 wt % $P_2O_5$ + 0.26 wt % CaO + 0.59 wt % $SiO_2$ |
|---|---|---|---|
| EXAMPLE 39 | 1100° C./ compressive strength (MPa) | / | 151.9 |

/: The compressive strength of samples cannot be measured due to the collapse of the samples.

Hereinbefore, the example shows that the compressive strength of pure calcium sulfate ($CaSO_4$) cannot be measured owing to the collapse of samples. It indicates that the pure calcium sulfate cannot be sintered by using the heat treatment. However, the compressive strength of $CaSO_4$-based samples is increased via adding three different kinds of additives. These three kinds of additives are $P_2O_3$, CaO and $SiO_2$. It also indicates that the sintering ability of calcium sulfate can be improved by adding any three kinds of sintering additives selected from +1 and/or +2 and/or +3 and/or +4 and/or +5 valence chemical compounds.

In addition, the sintering additives used for the present invention are also selected from +1 and/or +2 and/or +3 and/or +4 and/or +5 valence groups, which can form glass materials after the heat treatment. The glass materials mean that the materials are amorphous in structure. Such materials can flow at elevated temperature. The amount of sintering additives in the mixtures is in the range of 0.1 wt % to 50 wt %. The mixtures are shaped in the molds. After the heat treatment, the compressive strength of $CaSO_4$-based ceramic materials is about 152 MPa.

Hereinafter, EXAMPLES reveals that the sintering ability of calcium sulfate can be improved by adding +1 and/or +2 and/or +3 and/or +4 and/or +5 valence sintering additives. These additives form glass during firing at elevated temperature.

EXAMPLES 40 to 44

All the materials used for these EXAMPLES of the present invention were calcium sulfate ($CaSO_4$), +1 valence glass starting materials (e.g. sodium hydrogen carbonate, $NaHCO_3$), +2 valence glass starting materials (e.g. calcium oxide, CaO), +4 valence glass starting materials (e.g. silica, $SiO_2$) and +5 valence glass starting materials (e.g. phosphorus pentoxide, $P_2O_5$). First, $CaSO_4$ and glass starting materials were mixed together. The amounts of glass starting materials were 1 wt %, 10 wt % and 50 wt %. The mixed powders were consolidated into cylinders of 10 mm diameter and 10 mm height. The glass starting materials are selected from +1 valence glass starting materials (e.g. sodium hydrogen carbonate, $NaHCO_3$), +2 valence glass starting materials (e.g. calcium oxide, CaO), +4 valence glass starting materials (e.g. silica, $SiO_2$) and +5 valence glass starting materials (e.g. phosphorus pentoxide, $P_2O_5$). The compositions of 1 wt %, 10 wt % and 50 wt % glass starting materials are listed in the Table 9.

TABLE 9

| | Compositions |
|---|---|
| 1 wt % glass starting materials, labeled as 1 wt % SPCN | 0.56 wt % $SiO_2$ + 0.11 wt % $P_2O_5$ + 0.21 wt % CaO + 0.12 wt % $NaHCO_3$ |
| 10 wt % glass starting materials, labeled as 10 wt % SPCN | 5.61 wt % $SiO_2$ + 1.04 wt % $P_2O_5$ + 2.13 wt % CaO + 1.23 wt % $NaHCO_3$ |
| 50 wt % glass starting materials, labeled as 50 wt % SPCN | 28.06 wt % $SiO_2$ + 5.18 wt % $P_2O_5$ + 10.64 wt % CaO + 6.13 wt % $NaHCO_3$ |

The samples were fired at 900° C. to 1200° C. for 1 hour. The densities of samples were recorded after firing, as shown in the Table 10.

TABLE 10

| | | $CaSO_4$ | $CaSO_4$ + 1 wt % glass starting materials (1 wt % SPCN) | $CaSO_4$ + 10 wt % glass starting materials (10 wt % SPCN) | $CaSO_4$ + 50 wt % glass starting materials (50 wt % SPCN) |
|---|---|---|---|---|---|
| EXAMPLE 40 | 25° C. density (g/cm³) | 2.1 | 1.9 | 1.9 | 1.7 |
| EXAMPLE 41 | 900° C. density (g/cm³) | / | 2.2 | 1.9 | 1.5 |
| EXAMPLE 42 | 1000° C. density (g/cm³) | / | 2.7 | 2.3 | 1.6 |
| EXAMPLE 43 | 1100° C. density (g/cm³) | / | 2.8 | 2.7 | 1.5 |
| EXAMPLE 44 | 1200° C. density (g/cm³) | / | 2.5 | 2.6 | 1.6 |

/: The density of samples cannot be measured due to the collapse of the samples.

Hereinbefore, the EXAMPLES show that the density of calcium sulfate ($CaSO_4$) is increased after the suitable heat treatment. It indicates that after the heat treatment, the sintering ability of calcium sulfate can be improved by adding various amounts of glass starting materials (SPCN). The amounts of glass starting materials are 1 wt %, 10 wt % and 50 wt %. It indicates that the addition of various amounts of glass starting materials can assist the densification of calcium sulfate.

EXAMPLE 45

The samples for this EXAMPLE of the present invention were prepared using the same method as in EXAMPLE 41. The sample was fired at 900° C. for 1 hour. The photographs of samples are shown in FIGS. 15(a) to 15(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 15(a)). It indicates that the sintering ability of calcium sulfate can be improved by adding various amounts (1 wt %, 10 wt % and 50 wt %) of glass starting materials (SPCN). The glass starting materials are selected from +1 and/or +2 and/or +3 and/or +4 and/or +5 valence compounds.

EXAMPLE 46

The samples for this EXAMPLE of the present invention were prepared using the same method as in EXAMPLE 42. The samples were fired at 1000° C. for 1 hour. The photographs of samples are shown in FIGS. 16(a) to 16(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 16(a)). It indicates that the sintering ability of calcium sulfate can be improved by adding various amounts (1 wt %, 10 wt % and 50 wt %) of glass starting materials (SPCN). The glass starting materials are selected from +1 and/or +2 and/or +3 and/or +4 and/or +5 valence compounds.

EXAMPLE 47

The samples for this EXAMPLE of the present invention were prepared using the same method as in EXAMPLE 43. The samples were fired at 1100° C. for 1 hour. The photographs of samples are shown in FIGS. 17(a) to 17(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 17(a)). It indicates that the sintering ability of calcium sulfate can be improved by adding various amounts (1 wt %, 10 wt % and 50 wt %) of glass starting materials. The glass starting materials are selected from +1 and/or +2 and/or +3 and/or +4 and/or +5 valence compounds.

EXAMPLE 48

The samples for this EXAMPLE of the present invention were prepared using the same method as in EXAMPLE 44. The samples were fired at 1200° C. for 1 hour. The photographs of samples are shown in FIGS. 18(a) to 18(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 18(a)). It indicates that the sintering ability of calcium sulfate can be improved by adding various amounts (1 wt %, 10 wt % and 50 wt %) of glass starting materials. The glass starting materials are selected from +1 and/or +2 and/or +3 and/or +4 and/or +5 valence compounds.

EXAMPLES 49 to 52

The cylinder samples for these examples of the present invention were prepared using the same methods as in EXAMPLES 41 to 44. The samples were made into cylinder of 10 mm diameter and 10 mm height. The samples were fired at 900° C. to 1200° C. for 1 hour. After firing, the samples were then ground to obtain flat surfaces. The compressive strength of cylinder samples was measured by using the instrument (MTS810, MTS, USA) at the room temperature. The displacement rate was 0.96 mm/min. The compressive strength of samples is presented in the Table 11.

TABLE 11

| | | $CaSO_4$ | $CaSO_4$ + 1 wt % glass starting materials (1 wt % SPCN) | $CaSO_4$ + 10 wt % glass starting materials (10 wt % SPCN) | $CaSO_4$ + 50 wt % glass starting materials (50 wt % SPCN) |
|---|---|---|---|---|---|
| EXAMPLE 49 | 900° C./ compressive strength (MPa) | / | 80 ± 3 | 42 ± 1 | 49 ± 1 |
| EXAMPLE 50 | 1000° C./ compressive strength (MPa) | / | 171 ± 3 | 119 ± 10 | 26 ± 1 |
| EXAMPLE 51 | 1100° C./ compressive strength (MPa) | / | 126 ± 7 | 157 ± 21 | 12 ± 1 |
| EXAMPLE 52 | 1200° C./ compressive strength (MPa) | / | 42 ± 3 | 86 ± 10 | 7 ± 1 |

/: The compressive strength of samples cannot be measured due to the collapse of the samples.

Hereinbefore, the EXAMPLES show that the compressive strength of pure calcium sulfate ($CaSO_4$) cannot be measured owing to the collapse of samples. It indicates that the pure calcium sulfate cannot be sintered by using the heat treatment. However, the compressive strength of $CaSO_4$-based samples is increased via adding 1 wt %, 10 wt % and 50 wt % glass starting materials. The glass starting materials are selected from +1 and/or +2 and/or +3 and/or +4 and/or +5 valence compounds. By using the suitable sintering profile, the compressive strength of calcium sulfate added with the sintering additives is around 171 MPa. It suggests that the sintering ability of calcium sulfate can be improved by adding various amounts of glass starting materials as sintering additives.

Hereinbefore, the EXAMPLES reveal that the sintering ability of calcium sulfate can be improved by adding four kinds of additives. These additives may form glass during sintering, and are thus referred to as glass starting materials. Glass is a amorphous solid which its crystalline structure is lacking of long-range order. As several metallic compounds or metallic oxides are heated at the elevated temperature, the metallic ions may not have enough time to form the long-range order. Amorphous phase is then formed. As some fine crystals are formed and dispersed within the glassy matrix, the material is also termed as the glass-ceramics. The glass and glass-ceramic materials can flow at elevated temperature. The addition of suitable glass or glass-ceramic can assist the densification of ceramics. Hereinafter, the EXAMPLES reveal that the sintering ability of calcium sulfate can be improved by adding two or more than two kinds of glass starting materials. All the materials used for these EXAMPLES are calcium sulfate, +1 valence glass starting material (such as sodium hydrogen carbonate, $NaHCO_3$), +2 valence glass starting material (such as calcium oxide, CaO), +4 valence glass starting material (such as silica, $SiO_2$) and +5 valence glass starting material (such as phosphorous pentoxide, $P_2O_5$). These additives easily form a glass or a glass-ceramic during sintering

EXAMPLES 53 to 57

In these EXAMPLES of the present invention, $CaSO_4$ and glass starting materials were first mixed together. The amount of glass starting materials was 1 wt %. The mixed powders were consolidated into cylinders of 10 mm diameter and 10 mm height. The glass starting materials were selected from +1 valence glass starting materials (e.g. sodium hydrogen carbonate, $NaHCO_3$), +2 valence glass starting materials (e.g. calcium oxide, CaO), +4 valence glass starting materials (e.g. silica, $SiO_2$) and +5 valence glass starting materials (e.g. phosphorus pentoxide, $P_2O_5$). The compositions of glass starting materials are listed in the Table 12.

TABLE 12

| | Compositions |
|---|---|
| 1 wt % glass starting materials, labeled as 1 wt % SP | 0.8 wt % $SiO_2$ + 0.2 wt % $P_2O_5$ |
| 1 wt % glass starting materials, labeled as 1 wt % SPN | 0.71 wt % $SiO_2$ + 0.13 wt % $P_2O_5$ + 0.16 wt % $NaHCO_3$ |
| 1 wt % glass starting materials, labeled as 1 wt % SPC | 0.59 wt % $SiO_2$ + 0.15 wt % $P_2O_5$ + 0.26 wt % CaO |
| 1 wt % glass starting materials, labeled as 1 wt % SPCN | 0.56 wt % $SiO_2$ + 0.11 wt % $P_2O_5$ + 0.21 wt % CaO + 0.12 wt % $NaHCO_3$ |

The samples were fired at 900° C. to 1200° C. for 1 hour. The densities of samples were recorded after firing, as shown in the Table 13.

TABLE 13

| | | $CaSO_4$ | $CaSO_4$ + 1 wt % glass starting materials (SP) | $CaSO_4$ + 1 wt % glass starting materials (SPN) | $CaSO_4$ + 1 wt % glass starting materials (SPC) | $CaSO_4$ + 1 wt % glass starting materials (SPCN) |
|---|---|---|---|---|---|---|
| EXAMPLE 53 | 25° C. density (g/cm³) | 2.1 | 1.9 | 1.9 | 1.9 | 1.9 |
| EXAMPLE 54 | 900° C. density (g/cm³) | / | 2.0 | 2.4 | 1.9 | 2.2 |
| EXAMPLE 55 | 1000° C. density (g/cm³) | / | 2.4 | 2.8 | 2.3 | 2.7 |
| EXAMPLE 56 | 1100° C. density (g/cm³) | / | 2.8 | 2.7 | 2.8 | 2.8 |
| EXAMPLE 57 | 1200° C. density (g/cm³) | / | 2.7 | 2.6 | 2.7 | 2.5 |

/: The density of samples cannot be measured due to the collapse of the samples.

Hereinbefore, the examples show that the density of calcium sulfate ($CaSO_4$) added with two or more than two glass starting materials is increased after the heat treatment. It indicates that after the heat treatment, the sintering ability of calcium sulfate can be improved by adding two or more glass starting materials selected from +1 and/or +2 and/or +3 and/or +4 and/or +5 valence compounds. It also means that adding $SiO_2$ and/or $NaHCO_3$ and/or CaO and/or $P_2O_5$ can assist the densification of calcium sulfate.

EXAMPLE 58

The samples for this EXAMPLE of the present invention were prepared using the same method as in EXAMPLE 54. The samples were fired at 900° C. for 1 hour. The photographs of samples are shown in FIGS. 19(a) to 19(e).

Hereinbefore, the EXAMPLE shows that the calcium sulfate samples added with two or more than two kinds of glass starting materials exhibit improved sintering ability during the heat treatment. The combinations of glass starting materials are selected from $NaHCO_3$, CaO, $SiO_2$ and $P_2O_5$. The samples added with the glass starting materials still hold their shapes after the heat treatment. However, the calcium sulfate without the glass starting materials collapses after the heat treatment (see FIG. 19(a)). It indicates that the sintering ability of calcium sulfate can be improved by adding two or more than two kinds of glass starting materials selected from +1 and/or +2 and/or +3 and/or +4 and/or +5 valence compounds.

EXAMPLE 59

The samples for this EXAMPLE of the present invention were prepared using the same method as in EXAMPLE 55. The samples were fired at 1000° C. for 1 hour. The photographs of samples are shown in FIGS. 20(a) to 20(e).

Hereinbefore, the EXAMPLE shows that the calcium sulfate samples added with two or more than two kinds of glass starting materials exhibit improved sintering ability during the heat treatment. The combinations of glass starting materials are selected from $NaHCO_3$, CaO, $SiO_2$ and $P_2O_5$. The samples added with the glass starting materials still hold their shapes after the heat treatment. However, the calcium sulfate without the glass starting materials collapses after the heat treatment (see FIG. 20(a)). It indicates that the sintering ability of calcium sulfate can be improved by adding two or more than two kinds of glass starting materials selected from +1 and/or +2 and/or +3 and/or +4 and/or +5 valence compounds.

EXAMPLE 60

The samples for this EXAMPLE of the present invention were prepared using the same method as in EXAMPLE 56. The samples were fired at 1100° C. for 1 hour. The photographs of samples are shown in FIGS. 21(a) to 21(e).

Hereinbefore, the EXAMPLE shows that the calcium sulfate samples added with two or more than two kinds of glass starting materials exhibit improved sintering ability during the heat treatment. The combinations of glass starting materials are selected from $NaHCO_3$, CaO, $SiO_2$ and $P_2O_5$. The samples added with the glass starting materials still hold their shapes after the heat treatment. However, the calcium sulfate without the glass starting materials collapses after the heat treatment (see FIG. 21(a)). It indicates that the sintering ability of calcium sulfate can be improved by adding two or more than two kinds of glass starting materials selected from +1 and/or +2 and/or +3 and/or +4 and/or +5 valence compounds.

EXAMPLE 61

The samples for this EXAMPLE of the present invention were prepared using the same method as in EXAMPLE 57. The samples were fired at 1200° C. for 1 hour. The photographs of samples are shown in FIGS. 22(a) to 22(e).

Hereinbefore, the EXAMPLE shows that the calcium sulfate samples added with two or more than two kinds of glass starting materials exhibit improved sintering ability during the heat treatment. The combinations of glass starting materials are selected from $NaHCO_3$, CaO, $SiO_2$ and $P_2O_5$. The samples added with the glass starting materials still hold their shapes after the heat treatment. However, the calcium sulfate without the glass starting materials collapses after the heat treatment (see FIG. 22(a)). It indicates that the sintering ability of calcium sulfate can be improved by adding two or more than two kinds of glass starting materials selected from +1 and/or +2 and/or +3 and/or +4 and/or +5 valence compounds.

EXAMPLES 62 to 65

The cylinder samples for these examples of the present invention were prepared using the same methods as in EXAMPLES 54 to 57. The samples were made into cylinders of 9 mm diameter and 9 mm height. The samples were fired at 900° C. to 1200° C. for 1 hour. After firing, the samples were then ground to obtain flat surfaces. The compressive strength of cylinder samples was measured by using the universal testing instrument (MTS810, MTS, USA) at the room temperature. The displacement rate was 0.96 mm/min. The compressive strength of samples is presented in the Table 14.

TABLE 14

| | $CaSO_4$ | $CaSO_4$ + 1 wt % glass starting materials (SP) | $CaSO_4$ + 1 wt % glass starting materials (SPN) | $CaSO_4$ + 1 wt % glass starting materials (SPC) | $CaSO_4$ + 1 wt % glass starting materials (SPCN) |
|---|---|---|---|---|---|
| EXAMPLE 62 | 900° C./ compressive strength (MPa) | / | 10 ± 6 | 87 ± 5 | 11 ± 1 | 80 ± 3 |
| EXAMPLE 63 | 1000° C./ compressive strength (MPa) | / | 62 ± 7 | 184 ± 7 | 52 ± 10 | 171 ± 3 |
| EXAMPLE 64 | 1100° C./ compressive strength (MPa) | / | 128 ± 17 | 103 ± 8 | 155 ± 6 | 126 ± 7 |
| EXAMPLE 65 | 1200° C./ compressive strength (MPa) | / | 92 ± 9 | 61 ± 3 | 77 ± 4 | 42 ± 3 |

/: The compressive strength of samples cannot be measured due to the collapse of the samples.

Hereinbefore, the examples show that the compressive strength of pure calcium sulfate ($CaSO_4$) cannot be measured owing to the collapse of samples. It indicates that the pure calcium sulfate cannot be sintered by using the heat treatment. However, the compressive strength of $CaSO_4$-based samples is increased by adding two or more than two kinds of glass starting materials as sintering additives. In the appropriate condition, the compressive strength of calcium sulfate added with the sintering additives is around 184 MPa. It suggests that the sintering ability of calcium sulfate can be improved by adding two or more than two kinds of sintering additives (glass starting materials). The glass starting materials are selected from +1 and/or +2 and/or +3 and/or +4 and/or +5 and/or valence glass starting materials.

EXAMPLE 66

For the present EXAMPLE, firstly, $CaSO_4$ and glass starting materials were first mixed together. The amount of glass starting materials was 14.5 wt %. The mixed powders were consolidated into cylinders of 25.4 mm diameter and 3 mm height. The glass starting materials were selected from +3 valence glass starting materials (e.g. aluminum oxide, $Al_2O_3$) and +4 valence glass starting materials (e.g. silica, $SiO_2$). The compositions of glass starting materials are listed in the Table 15.

TABLE 15

| | Compositions |
|---|---|
| 14.5 wt % glass starting materials, labeled as SA | 5 wt % $SiO_2$ + 9.5 wt % $Al_2O_3$ |

The samples were fired at 1100° C. for 3 hours. The densities of samples were recorded after firing, as shown in the Table 16.

TABLE 16

| | | $CaSO_4$ | $CaSO_4$ + 14.5 wt % glass starting materials (SA) |
|---|---|---|---|
| EXAMPLE 66 | 1100° C. density (g/cm³) | / | 1.7 |

/: The densities of samples cannot be measured due to the collapse of the samples.

Hereinbefore, the example shows that the density of calcium sulfate ($CaSO_4$) added with two kinds of glass starting materials is increased after the suitable heat treatment. It indicates that after the heat treatment, the sintering ability of calcium sulfate can be improved by adding two kinds of glass starting materials selected from +1 and/or +2 and/or +3 and/or +4 and/or +5 valence compounds. It also suggests that adding $SiO_2$ and $Al_2O_3$ can assist the densification of calcium sulfate.

EXAMPLE 67

Figure 23A:
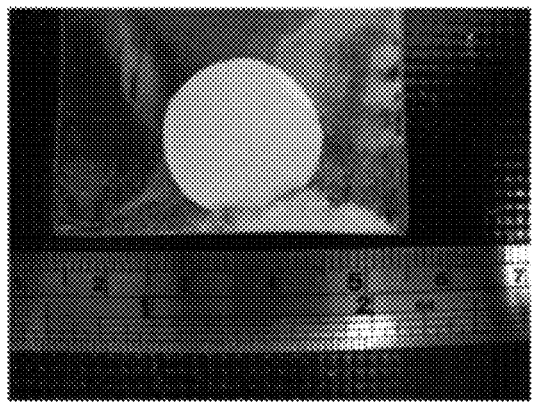
FIGS. 23(a) and 23(b) respectively depict the photographs of (a) calcium sulfate and (b) calcium sulfate+14.5 wt % starting materials of glass (SA) specimens after firing at 1100° C., wherein SA is the combination of $SiO_2$ and $Al_2O_3$.
Figure 23B:
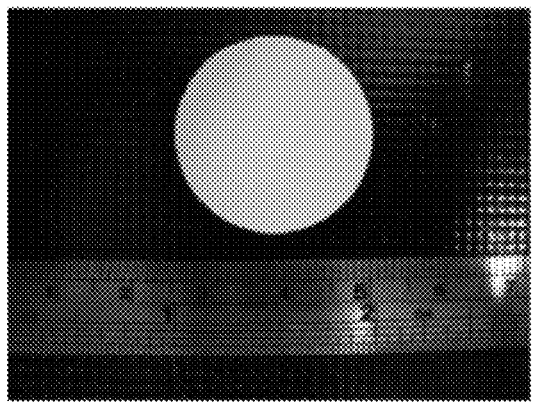
Figure 24A:
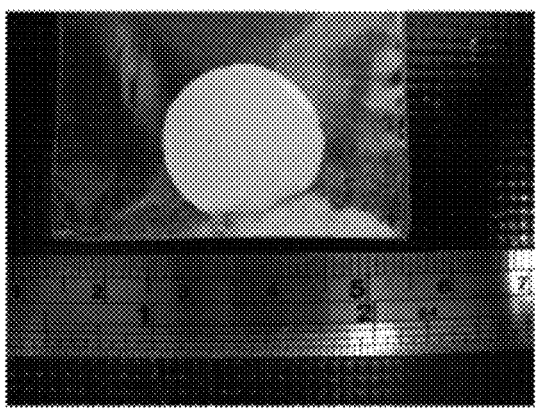
FIGS. 24(a) to 24(d) respectively depict the photographs of (a) calcium sulfate and (b) calcium sulfate+1 wt % silica, (c) calcium sulfate+10 wt % silica and (d) calcium sulfate+50 wt % silica specimens after firing at 1100° C.
Figure 24B:
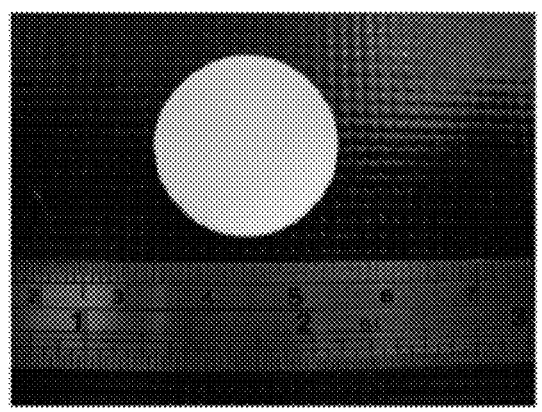
Figure 24C:
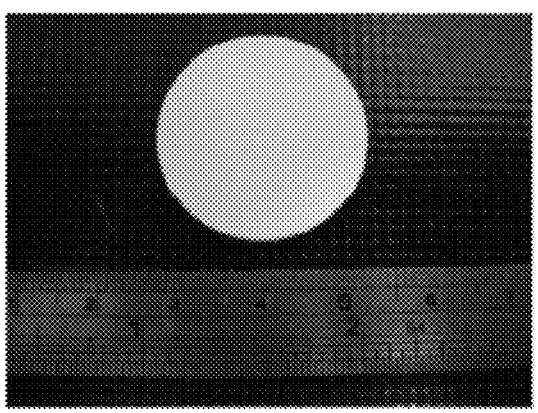
Figure 24D:
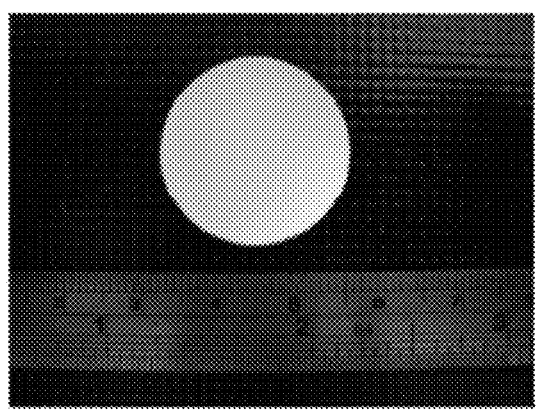

The samples for this EXAMPLE of the present invention were prepared using the same method as in EXAMPLE 66. The samples were fired at 1100° C. for 3 hours. The photographs of samples are shown in FIGS. 23(a) to 23(b).

Hereinbefore, the EXAMPLE shows that the calcium sulfate samples added with two kinds of glass starting materials exhibit improved sintering ability during the heat treatment. The samples added with the glass starting materials still hold their shapes after the heat treatment. However, the calcium sulfate without the glass starting materials collapses after the heat treatment (see FIG. 23(a)). It indicates that the sintering ability of calcium sulfate can be improved by adding two kinds of glass starting materials selected from +1 and/or +2 and/or +3 and/or +4 and/or +5 valence compounds. The glass starting materials are selected from +3 valence glass starting materials (e.g. $Al_2O_3$) and +4 valence glass starting materials (e.g. $SiO_2$)

EXAMPLE 68

The disc samples for these EXAMPLES of the present invention were prepared using the same methods as in EXAMPLE 66. The samples were fired at 1100° C. for 3 hours. The samples were then ground to obtain flat surfaces firstly. The flexural strength of disc samples were measured by using the biaxial 4-ball bending test (instrument: MTS810, MTS Co., USA) at the room temperature. The displacement rate was 0.48 mm/min. The flexural strength of samples is presented in the Table 17.

TABLE 17

| | $CaSO_4$ | $CaSO_4$ + 14.5 wt % glass starting materials (SA) |
|---|---|---|
| EXAMPLE 68 flexural strength (MPa) | / | 20 ± 1 |

/: The flexural strength of samples cannot be measured due to the collapse of the samples.

Hereinbefore, the example shows that the flexural strength of pure calcium sulfate ($CaSO_4$) cannot be measured owing to the collapse of samples. It indicates that the pure calcium sulfate cannot be sintered by using the heat treatment. However, the flexural strength of $CaSO_4$-based samples is increased by adding two kinds of glass starting materials as sintering additives. It suggests that the sintering ability of calcium sulfate can be improved by adding two kinds of sintering additives (or glass starting materials) selected from +1 and/or +2 and/or +3 and/or +4 and/or +5 valence compounds. The glass starting materials used for EXAMPLE 68 are $Al_2O_3$ and $SiO_2$.

Hereinbefore, the EXAMPLES reveal that the sintering ability of calcium sulfate can be improved by adding two or more than two kinds of glass starting materials as sintering additives. The glass starting materials used for the present invention are selected from +1 and/or +2 and/or +3 and/or +4 and/or +5 valence glass starting materials. Hereinafter, the EXAMPLES reveal that the sintering ability of calcium sulfate can also be improved by adding one glass starting material. The materials used in the following EXAMPLES are calcium sulfate powders and +4 valence glass starting material (silica, $SiO_2$). The +4 valence glass starting material is used as the sintering additive.

EXAMPLE 69

The materials used in the following EXAMPLES were calcium sulfate powder and +4 valence glass starting material (silica, $SiO_2$). Firstly, $CaSO_4$ and +4 valence glass starting materials ($SiO_2$) were first mixed together. The amounts of glass starting materials were 1 wt %, 10 wt % and 50 wt %. The mixed powders were consolidated into cylinders of 25.4 mm diameter and 3 mm height. The samples were fired at 1100° C. for 3 hours. The densities of samples were recorded after firing, as shown in the following Table 18.

TABLE 18

| | $CaSO_4$ | $CaSO_4$ + 1 wt % $SiO_2$ | $CaSO_4$ + 10 wt % $SiO_2$ | $CaSO_4$ + 50 wt % $SiO_2$ |
|---|---|---|---|---|
| 1100° C. density (g/cm³) | / | 2.7 | 1.6 | 1.9 |

/: The densities of samples cannot be measured due to the collapse of the samples.

Hereinbefore, the EXAMPLE shows that the density of calcium sulfate ($CaSO_4$) added with 1 wt %, 10 wt % and 50 wt % glass starting materials is increased after the suitable heat treatment. It indicates that after the heat treatment, the sintering ability of calcium sulfate can be improved by adding various amounts (1 wt %, 10 wt % and 50 wt %) of +4 valence glass starting materials (e.g. $SiO_2$). It also means that adding various amounts of +4 valence glass starting materials can assist the densification of calcium sulfate.

EXAMPLE 70

The samples for this EXAMPLE of the present invention were prepared using the same method as in EXAMPLE 69. The samples were fired at 1100° C. for 3 hours. The photographs of samples are shown in FIGS. 24(a) to 24(d).

Hereinbefore, the EXAMPLE shows that the calcium sulfate samples added with 1 wt %, 10 wt % and 50 wt %+4 valence glass starting materials ($SiO_2$) exhibit improved sintering ability during the heat treatment. The samples added with various amounts of glass starting materials still hold their shapes after the heat treatment. However, the calcium sulfate without the glass starting materials collapses after the heat treatment (see FIG. 24(a)). It indicates that the sintering ability of calcium sulfate can be improved by adding various amounts of +4 valence glass starting materials. Hereinbefore, the EXAMPLE reveals that the sintering ability of calcium sulfate can be improved by adding one kind of sintering additives selected from +1 or +2 or +3 or +4 or +5 valence compounds.

EXAMPLE 71

Figure 25:
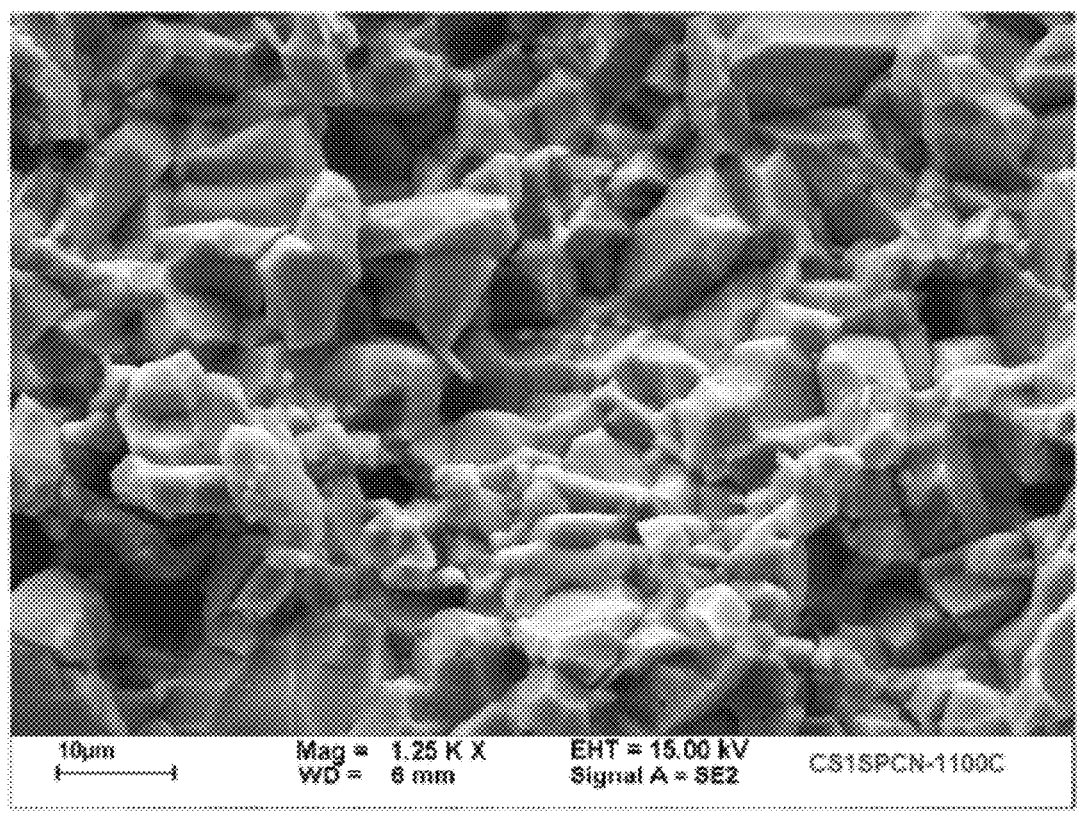
FIG. 25 depicts the SEM micrograph of the specimen after firing at 1100° C., wherein the specimen comprises calcium sulfate+1 wt % starting materials of glass (SPCN)

The samples for this EXAMPLE of the present invention were prepared using the same method as in EXAMPLE 43. The compositions of samples were calcium sulfate added with 1 wt % glass starting materials. The glass starting materials comprised 0.56 wt % $SiO_2$, 0.11 wt % $P_2O_5$, 0.21 wt % CaO and 0.12 wt % $NaHCO_3$. The samples were fired at 1100° C. for 1 hour. The SEM micrograph of sample is shown in FIG. 25. It can be found that the sample is dense after firing.

Hereinbefore, the EXAMPLE reveals that the calcium sulfate added four additives ($NaHCO_3$, CaO, $SiO_2$ and $P_2O_5$) exhibits improved sintering ability during firing. It indicates that the sintering ability of calcium sulfate can be improved by adding four kinds of glass starting materials selected from +1 and/or +2 and/or +3 and/or +4 and/or +5 valence compounds.

EXAMPLES 72 to 78

The samples for these EXAMPLES of the present invention were prepared using the same method as in EXAMPLE 43. The samples comprised calcium sulfate and 1 wt % glass starting materials (SP, SPN, SPC and SPCN), wherein SP is the combination of $SiO_2$ and $P_2O_5$; SPN is the combination of $SiO_2$, $P_2O_5$ and $NaHCO_3$; SPC is the combination of $SiO_2$, $P_2O_5$ and CaO; and SPCN is the combination of $SiO_2$, $P_2O_5$, CaO and $NaHCO_3$. The samples were fired at 1100° C. for 1 hour. After firing, the samples were placed into the test tube with normal saline solution, and then, the test tubes were put into the water bath at a temperature of 37.5° C. The ratio of sample to normal saline solution was 1 to 10. The pH value of samples was recorded for 7 days, as shown in the Table 19. The pH value of normal saline solution was recorded for the purpose of comparison.

TABLE 19

|  |  | Normal saline solution | $CaSO_4$ + 1 wt % glass starting materials (SP) | $CaSO_4$ + 1 wt % glass starting materials (SPN) | $CaSO_4$ + 1 wt % glass starting materials (SPC) | $CaSO_4$ + 1 wt % glass starting materials (SPCN) |
|---|---|---|---|---|---|---|
| EXAMPLE 72 | $1^{st}$ day's pH | 5.3 | 6.1 | 6.2 | 6.2 | 6.2 |
| EXAMPLE 73 | $2^{nd}$ day's pH | 5.4 | 6.3 | 6.3 | 6.5 | 6.5 |
| EXAMPLE 74 | $3^{rd}$ day's pH | 5.3 | 6.5 | 6.4 | 6.6 | 6.6 |
| EXAMPLE 75 | $4^{th}$ day's pH | 5.3 | 6.4 | 6.3 | 6.6 | 6.5 |
| EXAMPLE 76 | $5^{th}$ day's pH | 5.4 | 6.6 | 6.5 | 6.7 | 6.6 |
| EXAMPLE 77 | $6^{th}$ day's pH | 4.7 | 6.4 | 6.3 | 6.6 | 6.5 |
| EXAMPLE 78 | $7^{th}$ day's pH | 4.8 | 6.4 | 6.2 | 6.5 | 6.4 |

Hereinbefore, the EXAMPLES reveal that after firing, the pH value of calcium sulfate added with two or more than two kinds of sintering additives (glass starting materials) is around 6.1 to 6.7, which is located in the range of human body's pH (6 to 8). It indicates that after firing, the pH value of calcium sulfate added with sintering additives is located in the range of human body's pH. The sintering additives used for the present invention are selected from +1 and/or +2 and/or +3 and/or +4 and/or +5 valence compounds, such as $SiO_2$ and/or $P_2O_5$ and/or CaO and/or $NaHCO_3$. These sintering additives can form glass or glass ceramic during sintering. The glass or glass ceramic assists the densification of calcium sulfate. The presence of the glass or glass-ceramic is stable in body fluid.

EXAMPLE 79

The samples for the EXAMPLE of the present invention were prepared using the same method as in EXAMPLE 43. The samples comprised of calcium sulfate and 1 wt % glass starting materials (SP, SPN, SPC and SPCN). The samples were fired at 1100° C. for 1 hour. After firing, the cytotoxicity of samples was determined by MTT (microculture tetrazolium, 3-(4,5-Dimethylthiazol-2-yl)-2,5-diphenyltetrazolium bromide) assay. First, the powder of samples was immersed in the medium for extraction. They were placed in the incubator for 24 hours. The test tubes were then centrifuged, and the supernatant aqueous solution was collected. The solution was then filtered by 0.22 μm aseptic filtering membrane. In addition, the cultured L929 cells were seeded into 96-well culture dish. The cell density of each well was $10^4$ cells/mL. The cells were then incubated for 24 hours. After the treatment, the extracted solution was dropped into each well, and then, the further 24-hour incubation was carried out. After that, the extracted solution was removed, and new medium and MTT working solution were dropped into each well. After incubating for 4 hours, the dimethyl sulfoxide (DMSO) solution was dropped. The absorption of light with 540 nm wavelength in each well was measured by an optical spectroscopy (ELISA Co.) reader. The viability of cells is shown in the Table 20.

TABLE 20

|  | $CaSO_4$ + 1 wt % glass starting materials (SP) | $CaSO_4$ + 1 wt % glass starting materials (SPN) | $CaSO_4$ + 1 wt% glass starting materials (SPC) | $CaSO_4$ + 1 wt % glass starting materials (SPCN) | DMSO (dimethyl sulfoxide) |
|---|---|---|---|---|---|
| viability (%) | 80 ± 6 | 88 ± 7 | 101 ± 14 | 102 ± 12 | 4 ± 2 |

The DMSO (dimethl sulfoxide) is the positive control. It is toxic and harmful to cells.

Hereinbefore, the EXAMPLES reveal that after firing, viability of calcium sulfate added two or more than two kinds of sintering additives (glass starting materials) is higher than 80%. It indicates that after firing, calcium sulfate added with sintering additives shows good results of viability. The sintering additives used for the present invention are selected from +1 and/or +2 and/or +3 and/or +4 and/or +5 valence compounds, such as $SiO_2$ and/or $P_2O_5$ and/or CaO and/or $NaHCO_3$. These sintering additives can form glass or glass ceramic during sintering. The glass or glass ceramic assists the densification of calcium sulfate. The glass or glass ceramic is not toxic to cells.

Sintering Behavior of CS by Addition of $SiO_2$

In the present invention, the sintering behavior of calcium sulfate with addition of silica was investigated. "Effects of additives on the sintering and biodegradation behavior of calcium sulfate" has been discussed in Master Thesis of Department of Materials Science and Engineering, College of Engineering, National Taiwan University, to Hao-Wei Wu, published on Jun. 27, 2011, the entirety of which is herein incorporated by reference.

Figure 26A:
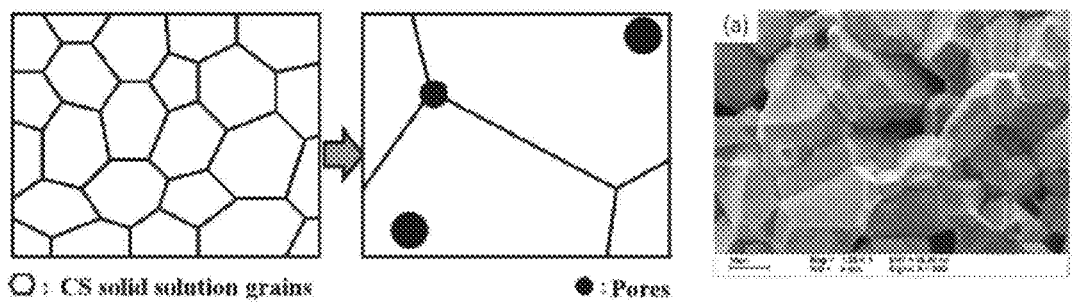
FIGS. 26(a) to 26(c) show the coarsening processes for the calcium sulfate (CS) solid solution grains during sintering, wherein the SEM results are also provided for comparison.
Figure 26B:
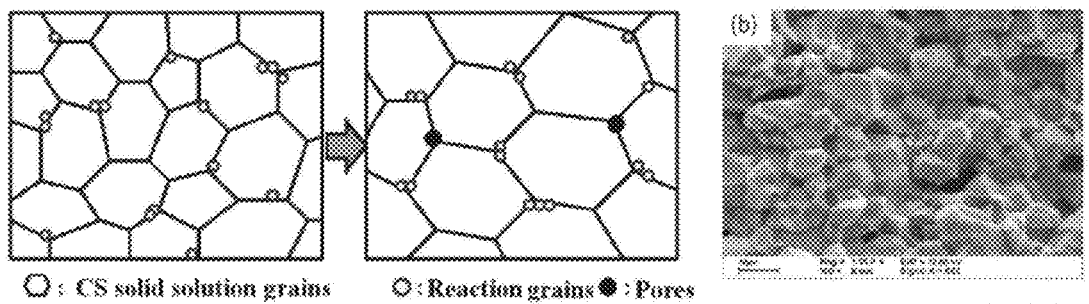
Figure 26C:
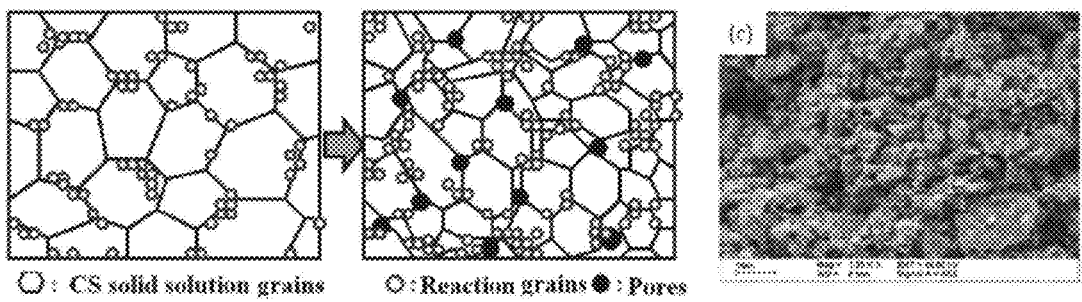

FIGS. 26(a) to 26(c) show the coarsening processes for the calcium sulfate (CS) solid solution grains during sintering, wherein the SEM results are also provided for comparison, wherein FIG. 26(a) corresponds to the pure CS, FIG. 26(b) corresponds to the CS with 1 wt % of $SiO_2$, and FIG. 26(c) corresponds to the CS with 10 wt % of $SiO_2$. As shown in FIGS. 26(a) to 26(c), the solid bonds between particles are formed during sintering. The bonds reduce the surface energy by removing free surfaces, with the elimination of grain boundary area via grain growth. With extended heating, it is possible to reduce the pore volume, leading to shrinkage of volume. By using a higher temperature, longer times, or smaller particles, the bond grows rapidly and the densification is taken place. The neck formation between contacting particles is an evidence of sintering. Grain growth is controlled by the movement of the grain boundary. As a pore and the grain boundary are separated from each other, the pore would be trapped into the grain to generate the closed pore. As shown in FIG. 26(b), the reaction grain is formed at the grain boundary as the $SiO_2$ content is higher than 1 wt %. The fine particles located at the boundary would induce the drag force and reduce the moving rate of the grain boundary. As the ions have more chances to diffuse along the grain boundary and the pores may shrink. As many fine particles are formed while the amount of $SiO_2$ is high; they would prohibit the movement of the grain boundary and thus inhibit the growth of the CS solid solution grains. As a result, the microstructure of the specimens with higher amounts of $SiO_2$ became looser and the fired densities were reduced, as shown in FIG. 26(c).

Thus, this invention further discloses a sintered calcium sulfate ceramic material, which is a bioceramic material and comprises a plurality of major (first) grains of calcium sulfate solid solutions and a plurality of reaction (second) grains located at boundaries of the major grains. The second grain cannot be formed until the sinterable specimen is sintered at the temperature ranging from temperature ranging from 900° C. to 1400° C. The sintered calcium sulfate ceramic material may also comprise a plurality of pores formed between the major grains.

In the following advanced examples, the following features can be obtained. The reaction grains may be, for example, selected from the group consisting of calcium silicate and calcium phosphate. In addition, the calcium sulfate solid solutions comprises calcium sulfate and silicon when silicon ions are dissolved into the calcium sulfate due to the change of the unit cell volume. Alternatively, the calcium sulfate solid solutions comprises calcium sulfate, silicon and calcium, when both silicon and phosphorus (P) ions are dissolved into the calcium sulfate due to the change of the unit cell volume. On the other hand, the degradation behavior of the sintered calcium sulfate ceramic material is improved, so that the sintered calcium sulfate ceramic material may have a degradation time longer than 10 days, 30 days or even 50 days. Also, the compressive strength of the sintered calcium sulfate ceramic material is improved, and may be higher than 67 MPa, 100 MPa or even 150 MPa. The second grain occupies 0.1 to 10 wt % of the mixture.

ADVANCED EXAMPLE 1

Figure 27:
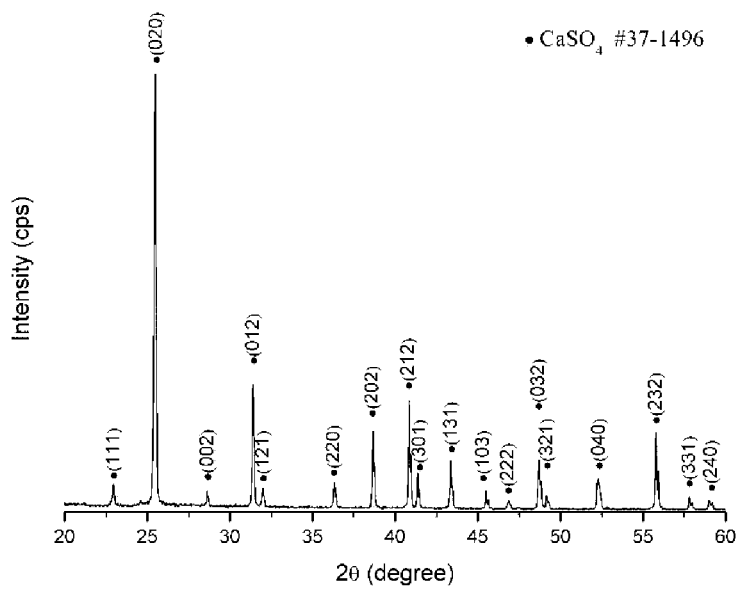
FIG. 27 is an XRD pattern of Advanced Example 1.

In this advanced example, the calcium sulfate powder is provided and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using X-ray diffractometry (XRD) to obtain the XRD pattern, as shown in FIG. 27.

According to the Advanced Example 1, the pure calcium sulfate powder sintered at 1100° C. into the calcium sulfate ($CaSO_4$) material with the unit cell volume equal to 304.4 Å$^3$.

ADVANCED EXAMPLE 2

The disc specimen of pure calcium sulfate is prepared in a manner similar to that of the Advanced Example 1 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 mm/min. The ratio of diameter to thickness of the sintered disc specimen is 1:1, and the compressive strength of the sintered specimen is equal to 67 MPa. It is to be noted that in the previous EXAMPLE 7 of this invention, the sintered specimen collapses and the compressive strength cannot be measured. This is because that the strength measurement technique has been modified with the restriction of measuring the strength within three days. Since the pure calcium sulfate only absorbs an extremely small amount of moisture from the air within a relatively short time, the strength can be successfully measured.

ADVANCED EXAMPLES 3 AND 4

Figure 28:
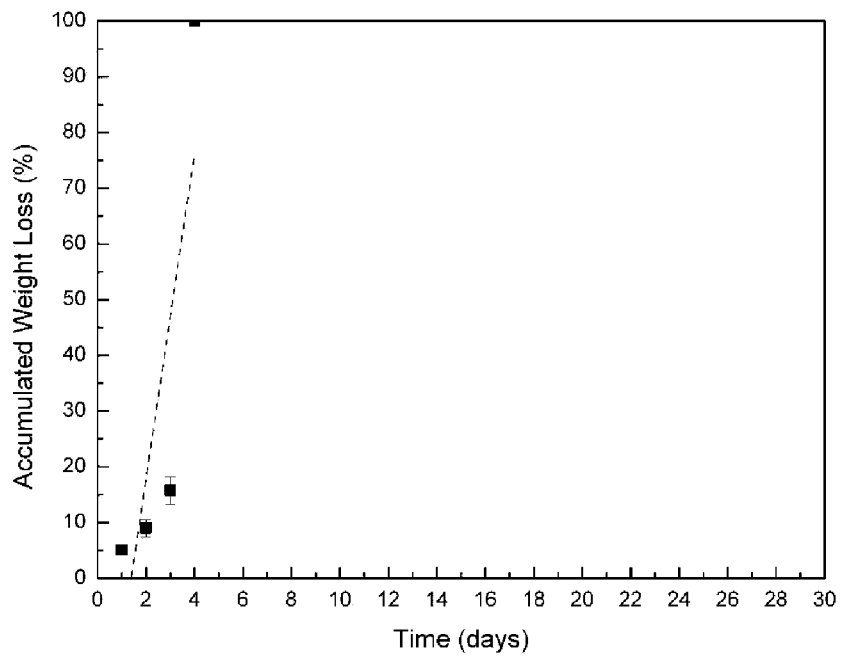
FIG. 28 is a plot showing the relationship between the accumulated weight loss and the time when the sintered specimens in Advanced Examples 3 and 4 are immersed in the saline solution.

Each of the sintered disc specimens of pure calcium sulfate is prepared in a manner similar to that of the Advanced Example 1. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 28. When the accumulated weight of the specimen reaches 100%, the required time is referred to as a degradation time, and the rate is referred to as a degradation rate. In Advanced Example 3, the degradation time is equal to 4 days. In Advanced Example 4, the degradation rate is equal to 25 (%/day).

ADVANCED EXAMPLE 5

Figure 29:
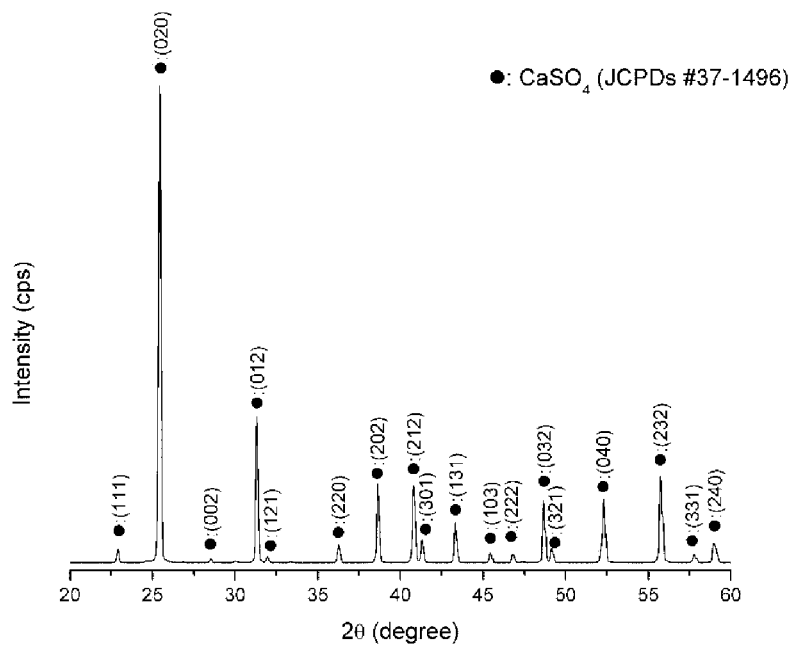
FIG. 29 is an XRD pattern of Advanced Example 5.

In this advanced example, the calcium sulfate powder and 1 wt % of oxide powder ($SiO_2$ (silica) powder) are provided, mixed uniformly and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using XRD to obtain the XRD pattern, as shown in FIG. 29. In this example, the unit cell volume is equal to 305.8 Å$^3$.

In this advanced example, the unit cell volume of the sintered specimen has been increased. The silicon ions have been dissolved into the calcium sulfate crystal and the CaSO$_4$ solid solution is obtained after sintering at 1100° C. for one hour.

ADVANCED EXAMPLE 6

The disc specimen is prepared in a manner similar to that of the Advanced Example 5 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 mm/min. The ratio of diameter to thickness of the sintered disc specimen is 1:1, and the compressive strength of the sintered specimen is equal to 116 MPa. In this advanced example, the compressive strength of the sintered specimen is increased.

ADVANCED EXAMPLES 7 AND 8

Figure 30:
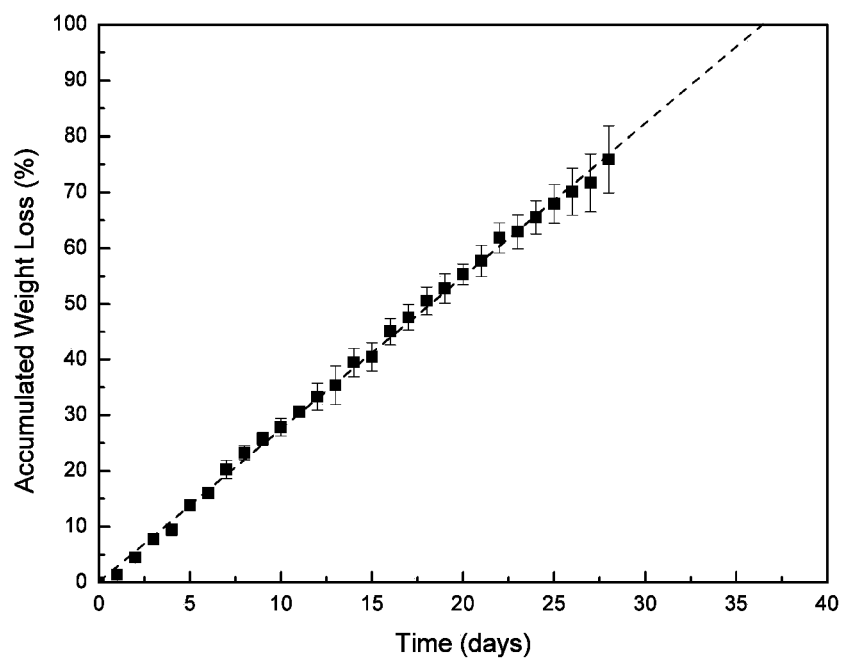
FIG. 30 is a plot showing the relationship between the accumulated weight loss and the time when the sintered specimens in Advanced Examples 7 and 8 are immersed in the saline solution.

Each of the sintered disc specimens is prepared in a manner similar to that of the Advanced Example 5. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 30. When the accumulated weight of the specimen reaches 100%, the required time is referred to as a degradation time, and the rate is referred to as a degradation rate. In Advanced Example 7, the degradation time is equal to 37 days (note: the sintered specimen cannot be completely degraded in the one-month degradation test, and the degradation is obtained by way of extrapolation). In Advanced Example 8, the degradation rate is equal to 2.7 (%/day), which is calculated according to the slope of FIG. 30.

In this advanced example, the degradation time and the degradation rate of the sintered specimen are improved. This represents that the degradation behavior of the calcium sulfate can be improved by adding the additive. By sintering the calcium sulfate with the additive, the calcium sulfate solid solution is obtained.

ADVANCED EXAMPLE 9

Figure 31:
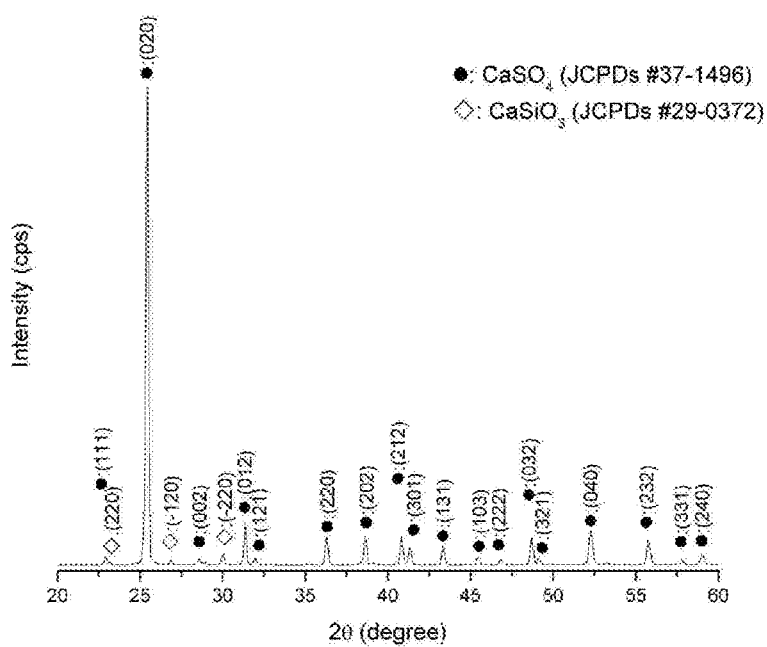
FIG. 31 is an XRD pattern of Advanced Example 9.

In this advanced example, the calcium sulfate powder and 5 wt % of oxide powder (SiO$_2$ (silica) powder) are provided, mixed uniformly and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using XRD to obtain the XRD pattern, as shown in FIG. 31. In this example, the unit cell volume is equal to 305.6 Å$^3$.

In this advanced example, the CaSO$_4$ solid solution phase and the CaSiO$_3$ phase of the sintered specimen are obtained, and the unit cell volume of the sintered specimen is increased.

ADVANCED EXAMPLE 10

Figure 32A:
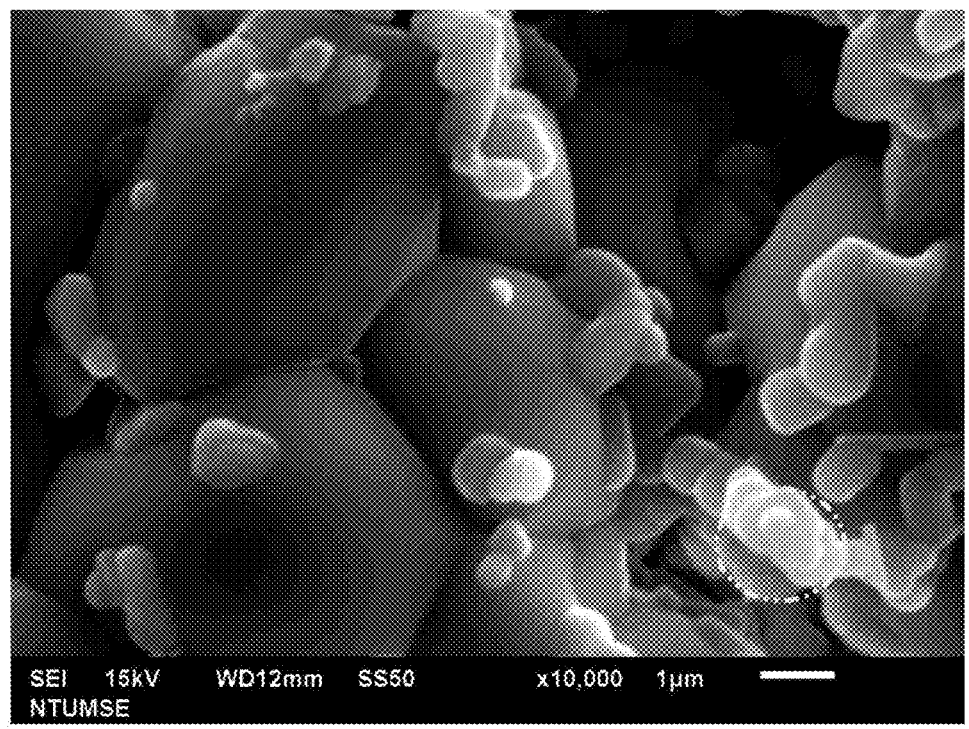
FIGS. 32(a) and 32(b) are the SEM micrograph and the EDS result of Advanced Example 10.
Figure 32B:
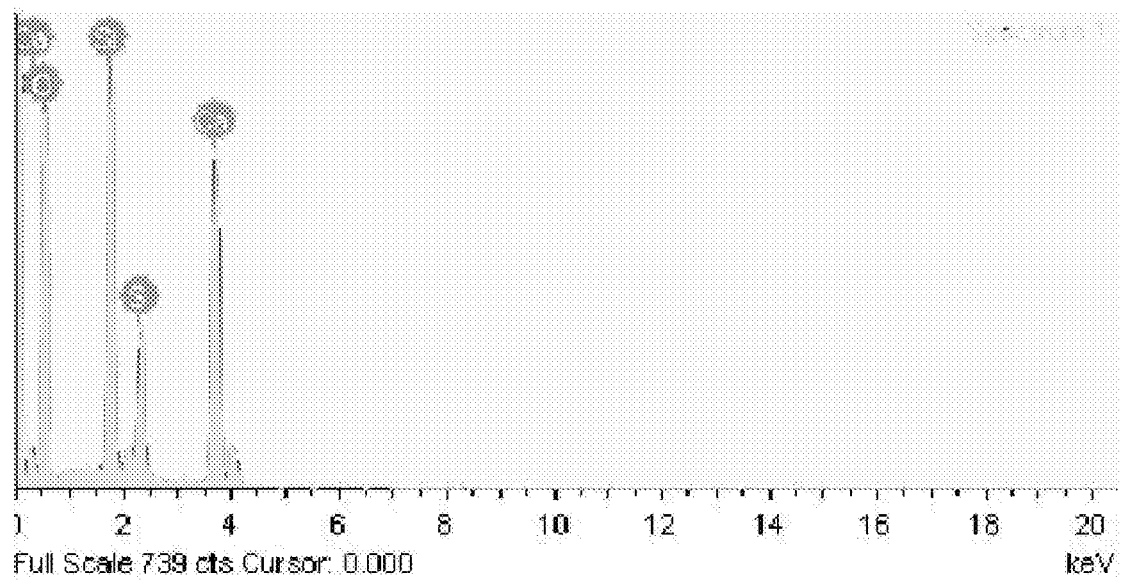

The sintered specimen is prepared in the manner similar to that of Advanced Example 9, and the micrograph of the sintered specimen is shown in FIG. 32(*a*), in which small particles are observed. After the electron dispersive spectroscopy (EDS) semi-quantitative composition analysis (see FIG. 32(*b*)), the small particles are calcium silicate (e.g., CaSiO$_3$). These compounds may also be observed in the XRD pattern (see FIG. 31).

ADVANCED EXAMPLE 11

The disc specimen is prepared in a manner similar to that of the Advanced Example 9 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 mm/min. The ratio of diameter to thickness of the sintered disc specimen is 1:1, and the compressive strength of the sintered specimen is equal to 35 MPa.

ADVANCED EXAMPLE 12 AND 13

Figure 33:
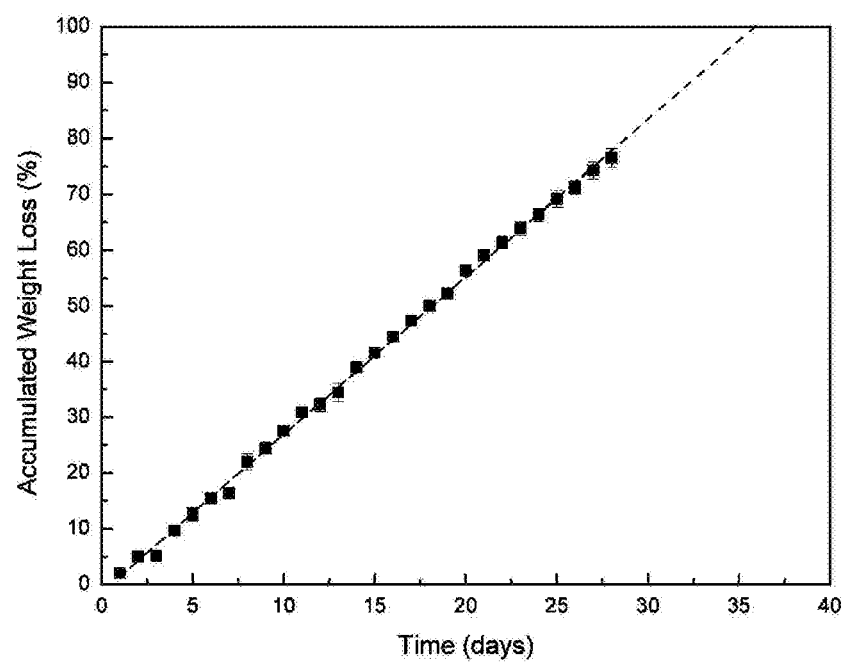
FIG. 33 is a plot showing the relationship between the accumulated weight loss and the time when the sintered specimens in Advanced Examples 12 and 13 are immersed in the saline solution.

Each of the sintered disc specimens is prepared in a manner similar to that of the Advanced Example 9. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 33. When the accumulated weight of the specimen reaches 100%, the required time is referred to as a degradation time, and the rate is referred to as a degradation rate. In Advanced Example 12, the degradation time is equal to 36 days (note: the sintered specimen cannot be completely degraded in the one-month degradation test, and the degradation is obtained by way of extrapolation). In Advanced Example 13, the degradation rate is equal to 2.8 (%/day), which is calculated according to the slope of FIG. 33.

In this advanced example, the degradation time and the degradation rate of the sintered specimen are improved. This represents that the degradation behavior of the calcium sulfate can be improved by adding the additive. By sintering the calcium sulfate with the additive, the calcium sulfate solid solution and the second phase (calcium silictae, e.g., CaSiO$_3$) are obtained.

ADVANCED EXAMPLE 14

Figure 34:
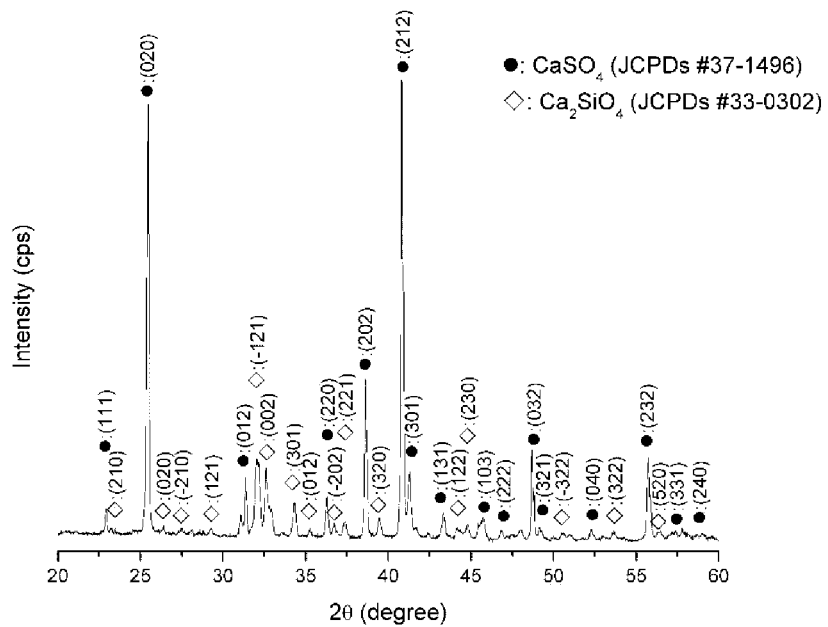
FIG. 34 is an XRD pattern of Advanced Example 14.

In this advanced example, the calcium sulfate powder and 10 wt % of oxide powder (SiO$_2$ (silica) powder) are provided, mixed uniformly and shaped into a disc specimen with a diameter of about 10 mm and a height of about 3 mm by way of dry pressing and shaping. Thereafter, the specimen is placed in the oven and sintered at the temperature of 1200° C. for one hour, and a sintered specimen is produced. Then, the surface of the sintered specimen is polished and the phase of the sintered specimen was investigated by using XRD to obtain the XRD pattern, as shown in FIG. 34.

In this advanced example, the CaSO$_4$ solid solution phase and the Ca$_2$SiO$_4$ phase of the sintered specimen are obtained.

ADVANCED EXAMPLE 15

Figure 35:
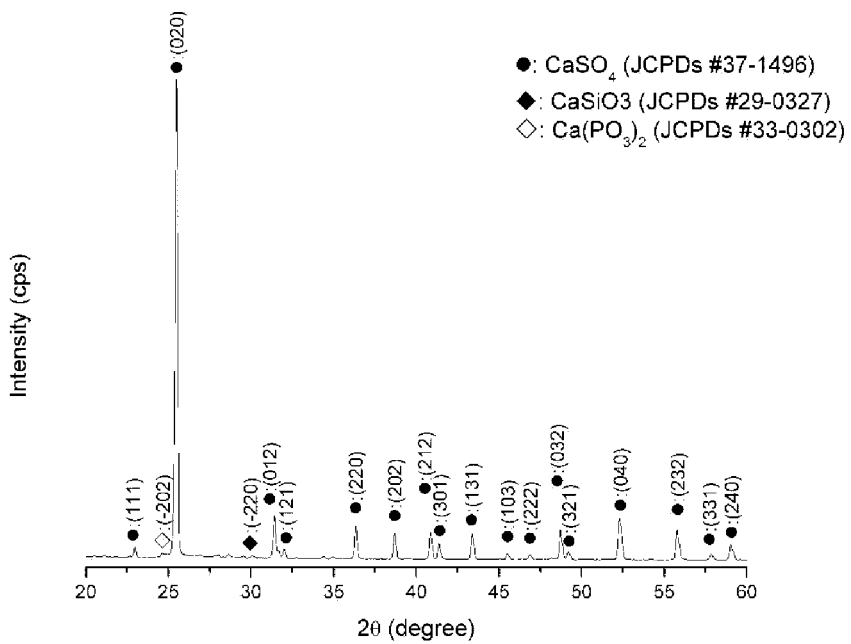
FIG. 35 is an XRD pattern of Advanced Example 15.

In this advanced example, the calcium sulfate powder and 2 wt % of SPC powder, which contains 1.18 wt % of SiO$_2$, 0.3 wt % of $P_2O_5$ and 0.52 wt % of CaO, are provided, mixed uniformly and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using XRD to obtain the XRD pattern, as shown in FIG. 35. In this example, the unit cell volume is equal to 304.0 Å$^3$.

In this advanced example, the first phase of $CaSO_4$ and the second phase of $CaSiO_3$ and $Ca(PO_3)_2$ are obtained, wherein the unit cell of the $CaSO_4$ solid solution phase is smaller than the unit cell of the pure calcium sulfate, which represents that a portion of ions in the calcium sulfate has been replaced with the smaller ions. This represents that the sintered specimen is composed of the calcium sulfate solid solution and the second phase of $CaSiO_3$ and $Ca(PO_3)_2$.

ADVANCED EXAMPLE 16

The disc specimen is prepared in a manner similar to that of the Advanced Example 15 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 min/min. The ratio of diameter to thickness of the sintered disc specimen is 1:1, and the compressive strength of the sintered specimen is equal to 155 MPa.

In this advanced example, the calcium sulfate solid solution and the second phase of $CaSiO_3$ (calcium silicate) and $Ca(PO_3)_2$ (calcium phosphate) can be obtained to improve the strength of calcium sulfate.

ADVANCED EXAMPLE 17 AND 18

Figure 36:
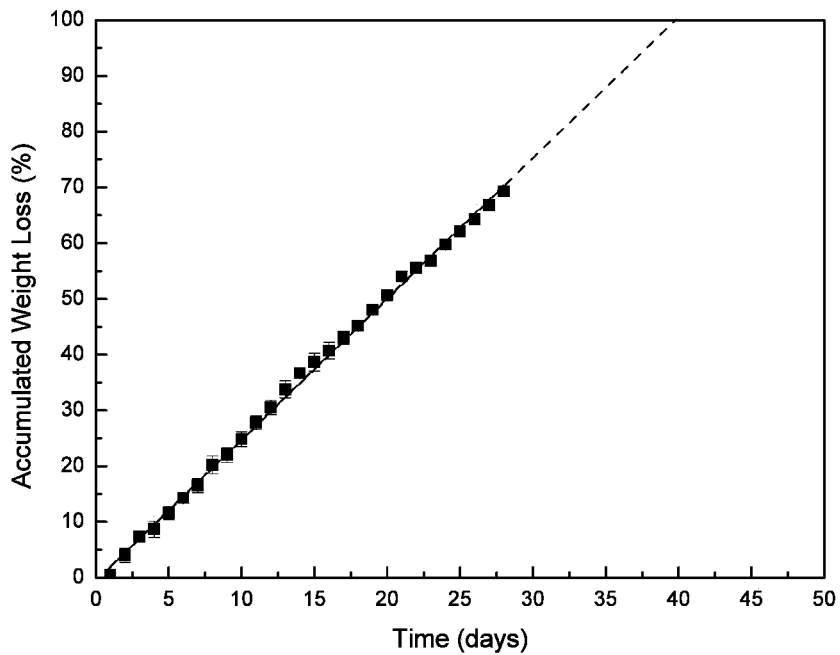
FIG. 36 is a plot showing the relationship between the accumulated weight loss and the time when the sintered specimens in Advanced Examples 17 and 18 are immersed in the saline solution.

Each of the sintered disc specimens is prepared in a manner similar to that of the Advanced Example 15. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 36. When the accumulated weight of the specimen reaches 100%, the required time is referred to as a degradation time, and the rate is referred to as a degradation rate. In Advanced Example 17, the degradation time is equal to 40 days (note: the sintered specimen cannot be completely degraded in the one-month degradation test, and the degradation is obtained by way of extrapolation). In Advanced Example 18, the degradation rate is equal to 2.5 (%/day), which is calculated according to the slope of FIG. 36.

In this advanced example, the degradation time and the degradation rate of the sintered specimen are improved. This represents that the degradation behavior of the calcium sulfate can be improved by adding the additive. By sintering the calcium sulfate with the additive, the calcium sulfate solid solution and the second phase (calcium silicate, e.g., $CaSiO_3$ and calcium phosphate, e.g., $Ca(PO_3)_2$) are obtained.

ADVANCED EXAMPLE 19

Figure 37:
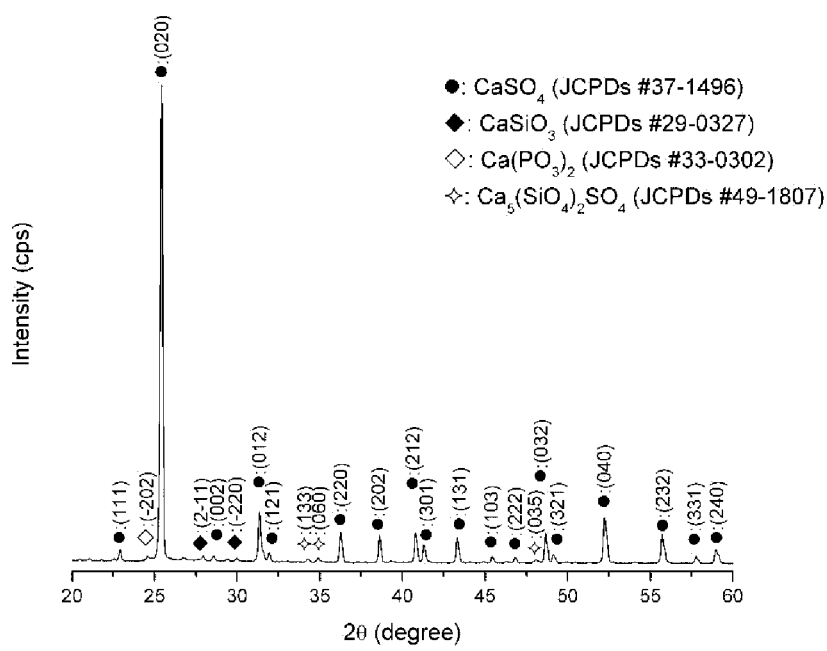
FIG. 37 is an XRD pattern of Advanced Example 19.

In this advanced example, the calcium sulfate powder and 5 wt % of SPC powder, which contains 2.95 wt % of $SiO_2$, 0.75 wt % of $P_2O_5$ and 1.3 wt % of CaO, are provided, mixed uniformly and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using XRD to obtain the XRD pattern, as shown in FIG. 37. In this example, the unit cell volume is equal to 305.9 Å$^3$.

In this advanced example, the first phase of $CaSO_4$ and the second phases of $CaSiO_3$, $Ca(PO_3)_2$ and $Ca_5(SiO_4)_2SO_4$ are obtained, wherein the unit cell of the $CaSO_4$ solid solution phase is larger than the unit cell of the pure calcium sulfate, which represents that other ions (e.g., silicon, phosphorus ions) have been dissolved in the calcium sulfate lattice. This represents that the sintered specimen has the calcium sulfate solid solution ($CaSO_4$ solid solution phase) and the second phases of $CaSiO_3$, $Ca(PO_3)_2$ and $Ca_5(SiO_4)_2SO_4$.

ADVANCED EXAMPLE 20

Figure 38A:
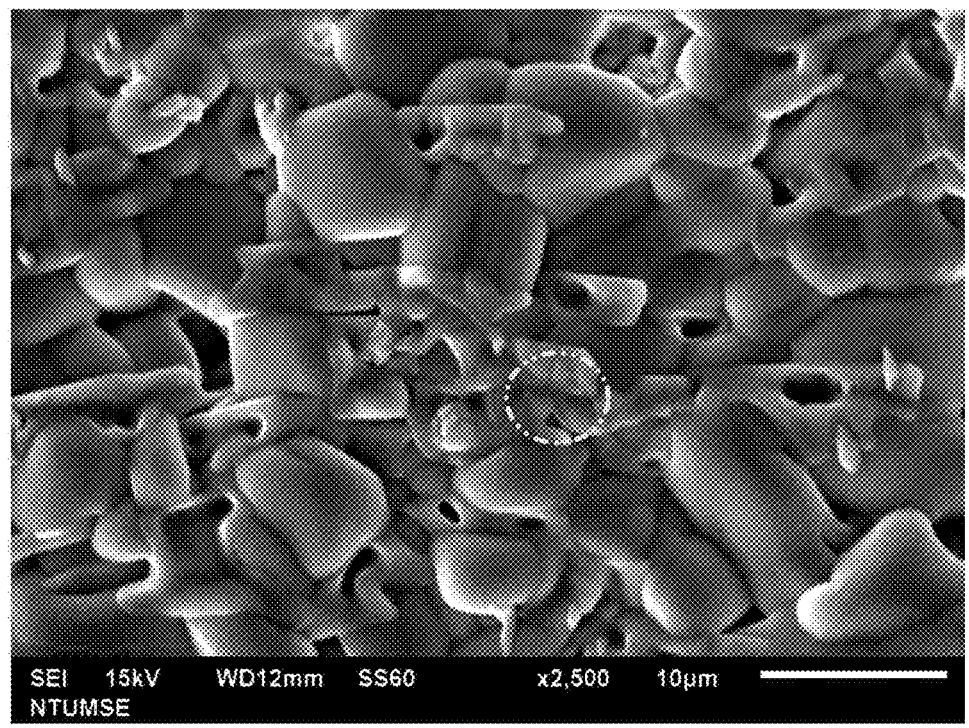
FIGS. 38(a) and 38(b) are the SEM micrograph and the EDS result of Advanced Example 20.
Figure 38B:
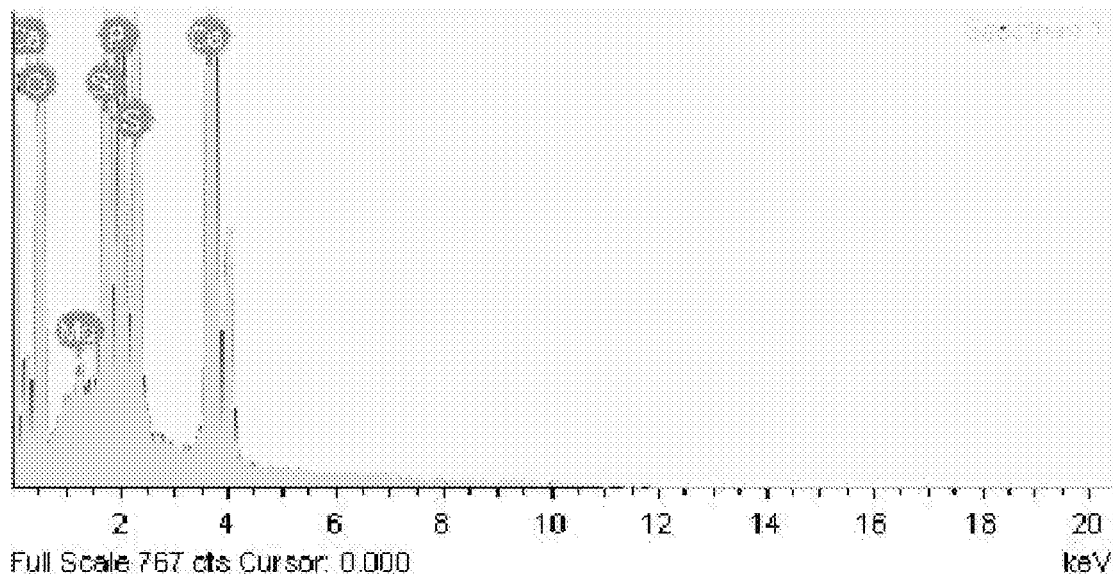

The sintered specimen is prepared in the manner similar to that of Advanced Example 19, and the micrograph of the sintered specimen is shown in FIG. 38(*a*), in which small particles are observed. After the EDS semi-quantitative composition analysis (see FIG. 38(*b*)), the small particles may be calcium silicate (e.g., $CaSiO_3$), calcium phosphate (e.g., $Ca(PO_3)_2$) and calcium silicate sulfate (e.g., $Ca_5(SiO_4)_2SO_4$). This compound may also be observed in the XRD pattern (see FIG. 37). It is to be noted that the component Mg in FIG. 38(*b*) is the misjudged result caused by to the noise.

ADVANCED EXAMPLE 21

The disc specimen is prepared in a manner similar to that of the Advanced Example 19 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 mm/min. The ratio of diameter to thickness of the sintered disc specimen is 1:1, and the compressive strength of the sintered specimen is equal to 125 MPa.

In this advanced example, the calcium sulfate solid solution and the second phase of $CaSiO_3$ (calcium silicate), $Ca(PO_3)_2$ (calcium phosphate) and $Ca_5(SiO_4)_2SO_4$ (calcium silicate sulfate) can be obtained to improve the strength of calcium sulfate.

ADVANCED EXAMPLES 22 AND 23

Figure 39:
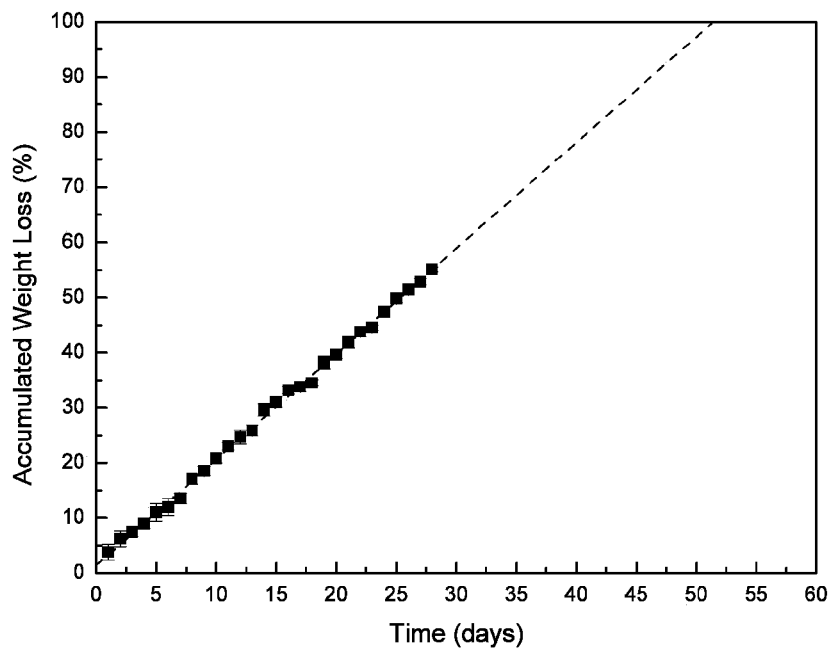
FIG. 39 is a plot showing the relationship between the accumulated weight loss and the time when the sintered specimens in Advanced Examples 22 and 23 are immersed in the saline solution.

Each of the sintered disc specimens is prepared in a manner similar to that of the Advanced Example 19. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 39. When the accumulated weight of the specimen reaches 100%, the required time is referred to as a degradation time, and the rate is referred to as a degradation rate. In Advanced Example 22, the degradation time is equal to 52 days (note: the sintered specimen cannot be completely degraded in the one-month degradation test, and the degradation is obtained by way of extrapolation). In Advanced Example 23, the degradation rate is equal to 1.9 (%/day), which is calculated according to the slope of FIG. 39.

In this advanced example, the degradation time and the degradation rate of the sintered specimen are improved. This represents that the degradation behavior of the calcium sulfate can be improved by adding the additive. By sintering the calcium sulfate with the additive, the calcium sulfate solid solution and the second phase (calcium silicate, e.g., $CaSiO_3$; calcium phosphate, e.g., $Ca(PO_3)_2$; and calcium silicate sulfate, e.g., $Ca_5(SiO_4)_2SO_4$) are obtained.

ADVANCED EXAMPLE 24

Figure 40:
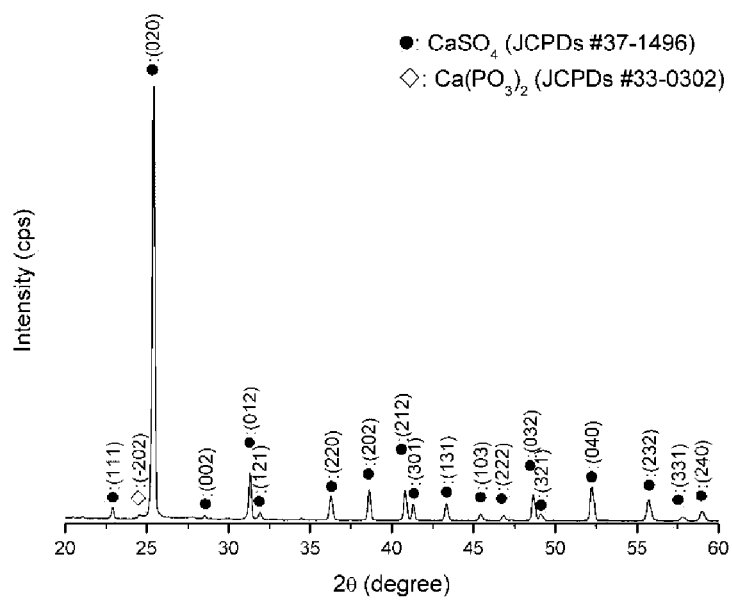
FIG. 40 is an XRD pattern of Advanced Example 24.

In this advanced example, the calcium sulfate powder and 10 wt % of SPC powder, which contains 5.9 wt % of $SiO_2$, 1.5 wt % of $P_2O_5$ and 2.6 wt % of CaO, are provided, mixed uniformly and shaped into a disc specimen with a diameter of about 10 mm and a height of about 3 mm by way of dry pressing and shaping. Thereafter, the specimen is placed in the oven and sintered at the temperature of 900° C. for one hour, and a sintered specimen is produced. Then, the surface of the sintered specimen is polished and the phase of the sintered specimen was investigated by using XRD to obtain the XRD pattern, as shown in FIG. 40.

In this advanced example, the first phase of $CaSO_4$ solid solution and the second phase of $Ca(PO_3)_2$ are obtained.

ADVANCED EXAMPLE 25

Figure 41:
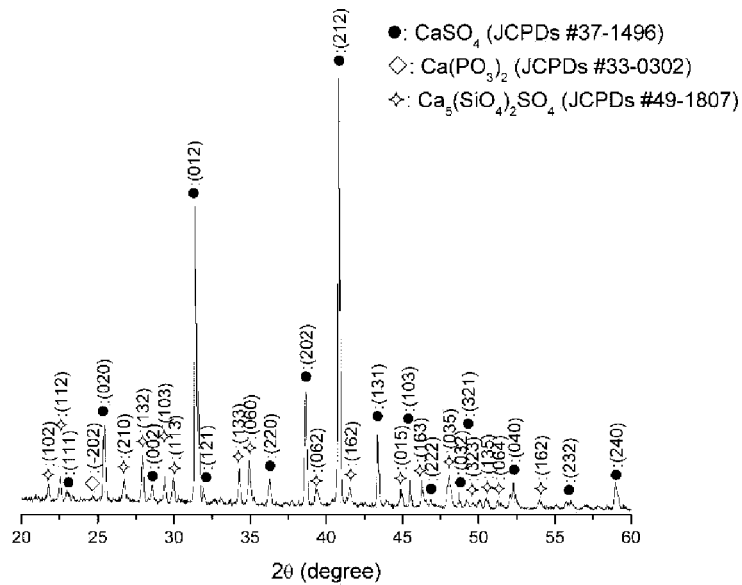
FIG. 41 is an XRD pattern of Advanced Example 25.

In this advanced example, the calcium sulfate powder and 10 wt % of SPC powder, which contains 5.9 wt % of $SiO_2$, 1.5 wt % of $P_2O_5$ and 2.6 wt % of CaO, are provided, mixed uniformly and shaped into a disc specimen with a diameter of about 10 mm and a height of about 3 mm by way of dry pressing and shaping. Thereafter, the specimen is placed in the oven and sintered at the temperature of 1200° C. for one hour, and a sintered specimen is produced. Then, the surface of the sintered specimen is polished and the phase of the sintered specimen was investigated by using XRD to obtain the XRD pattern, as shown in FIG. 41.

In this advanced example, the first phase of $CaSO_4$ solid solution and the second phase of $Ca(PO_3)_2$ and $Ca_5(SiO_4)_2SO_4$ are obtained.

ADVANCED EXAMPLE 26

Figure 42:
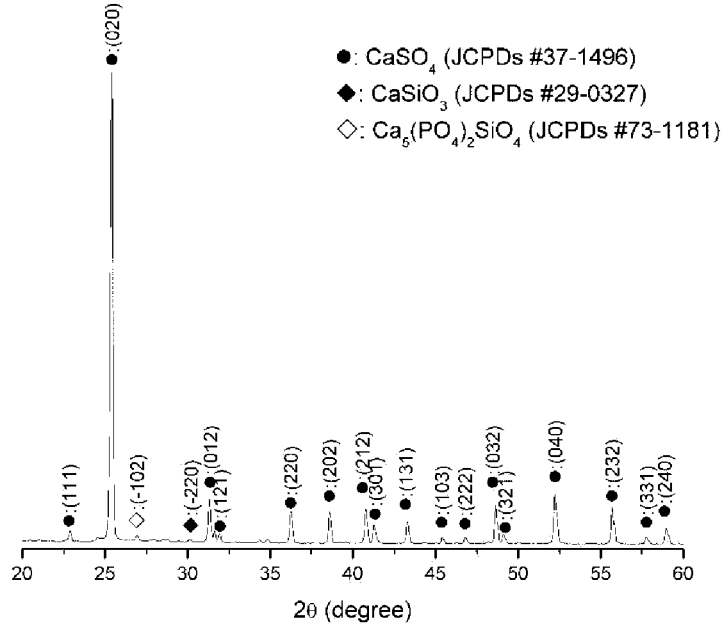
FIG. 42 is an XRD pattern of Advanced Example 26.

In this advanced example, the calcium sulfate powder and 2 wt % of SPCN powder, which contains 1.12 wt % of $SiO_2$, 0.22 wt % of $P_2O_5$, 0.42 wt % of CaO and 0.24 $NaHCO_3$ (sodium bicarbonate), are provided, mixed uniformly and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using XRD to obtain the XRD pattern, as shown in FIG. 42. The unit cell volume of the sintered specimen is equal to 306.3 $Å^3$.

In this advanced example, the first phase of $CaSO_4$ solid solution and the second phase of $CaSiO_3$ and $Ca_5(PO_4)_2SiO_4$ are obtained. The unit cell volume is increased. The unit cell of the $CaSO_4$ solid solution phase is larger than the unit cell of the pure calcium sulfate, which represents that other ions (e.g., silicon, phosphorus ions) have been dissolved in the calcium sulfate lattice. This represents that the sintered specimen has the calcium sulfate solid solution ($CaSO_4$ solid solution phase) and the second phase of $CaSiO_3$ (calcium silicate) and $Ca_5(PO_4)_2SiO_4$ (calcium phosphate silicate).

ADVANCED EXAMPLE 27

The disc specimen is prepared in a manner similar to that of the Advanced Example 26 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 mm/min. The ratio of diameter to thickness of the sintered disc specimen is 1:1, and the compressive strength of the sintered specimen is equal to 118 MPa.

In this advanced example, the calcium sulfate solid solution and the second phase of $CaSiO_3$ (calcium silicate) and $Ca_5(SiO_4)_2SO_4$ (calcium silicate sulfate) can be obtained to improve the strength of calcium sulfate.

ADVANCED EXAMPLES 28 AND 29

Figure 43:
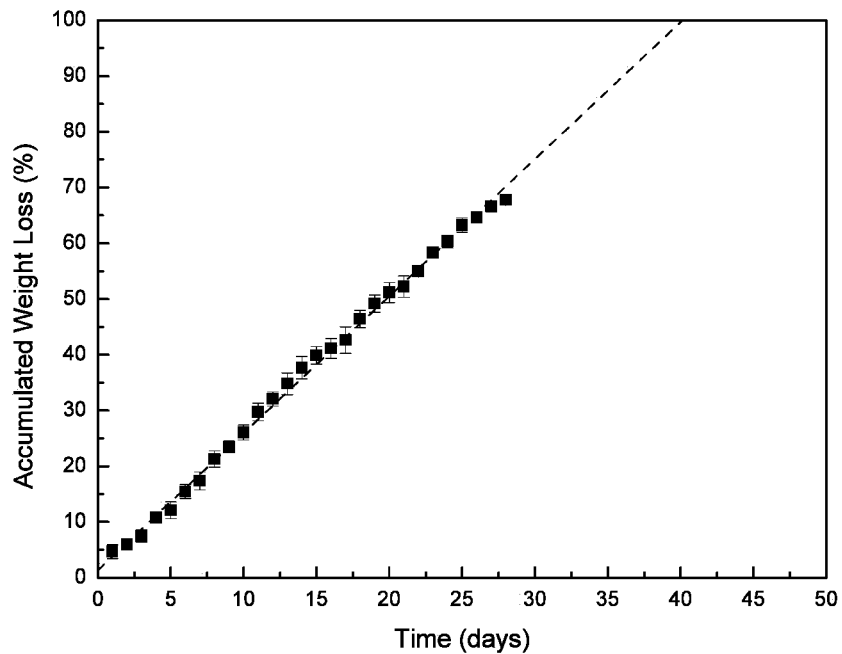
FIG. 43 is a plot showing the relationship between the accumulated weight loss and the time when the sintered specimens in Advanced Examples 28 and 29 are immersed in the saline solution.

Each of the sintered disc specimens is prepared in a manner similar to that of the Advanced Example 26. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 43. When the accumulated weight of the specimen reaches 100%, the required time is referred to as a degradation time, and the rate is referred to as a degradation rate. In Advanced Example 28, the degradation time is equal to 41 days (note: the sintered specimen cannot be completely degraded in the one-month degradation test, and the degradation is obtained by way of extrapolation). In Advanced Example 29, the degradation rate is equal to 2.4 (%/day), which is calculated according to the slope of FIG. 43.

In this advanced example, the degradation time and the degradation rate of the sintered specimen are improved. This represents that the degradation behavior of the calcium sulfate can be improved by adding the additive (SPCN). By sintering the calcium sulfate and the additive, the calcium sulfate solid solution and the second phase (calcium silicate, e.g., $CaSiO_3$; and calcium silicate sulfate, e.g., $Ca_5(SiO_4)_2SO_4$) are obtained.

ADVANCED EXAMPLE 30

Figure 44:
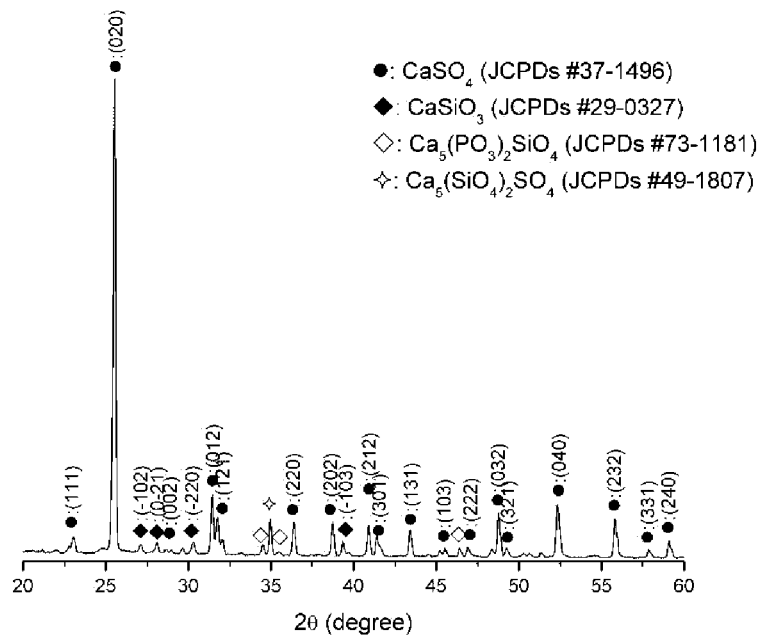
FIG. 44 is an XRD pattern of Advanced Example 30.

In this advanced example, the calcium sulfate powder and 10 wt % of SPCN powder, which contains 5.6 wt % of $SiO_2$, 1.1 wt % of $P_2O_5$, 2.1 wt % of CaO and 1.2 wt % $NaHCO_3$ (sodium bicarbonate), are provided, mixed uniformly and shaped into a disc specimen with a diameter of about 10 mm and a height of about 3 mm by way of dry pressing and shaping. Thereafter, the specimen is placed in the oven and sintered at the temperature of 1100° C. for one hour, and a sintered specimen is produced. Then, the surface of the sintered specimen is polished and the phase of the sintered specimen was investigated by using XRD to obtain the XRD pattern, as shown in FIG. 44. The unit cell volume of the sintered specimen is equal to 303.3 Å$^3$.

In this advanced example, the first phase of $CaSO_4$ and the second phases of $CaSiO_3$, $Ca_5(SiO_4)_2SO_4$ and $Ca_5(PO_4)_2SiO_4$ are obtained, wherein the unit cell of the $CaSO_4$ solid solution phase is smaller than the unit cell of the pure calcium sulfate, which represents that a portion of ions in the calcium sulfate has been replaced with the smaller ions. This represents that the sintered specimen has the calcium sulfate solid solution and the second phases of $CaSiO_3$, $Ca_5(PO_4)_2SiO_4$ and $Ca_5(SiO_4)_2SO_4$.

ADVANCED EXAMPLE 31

Figure 45A:
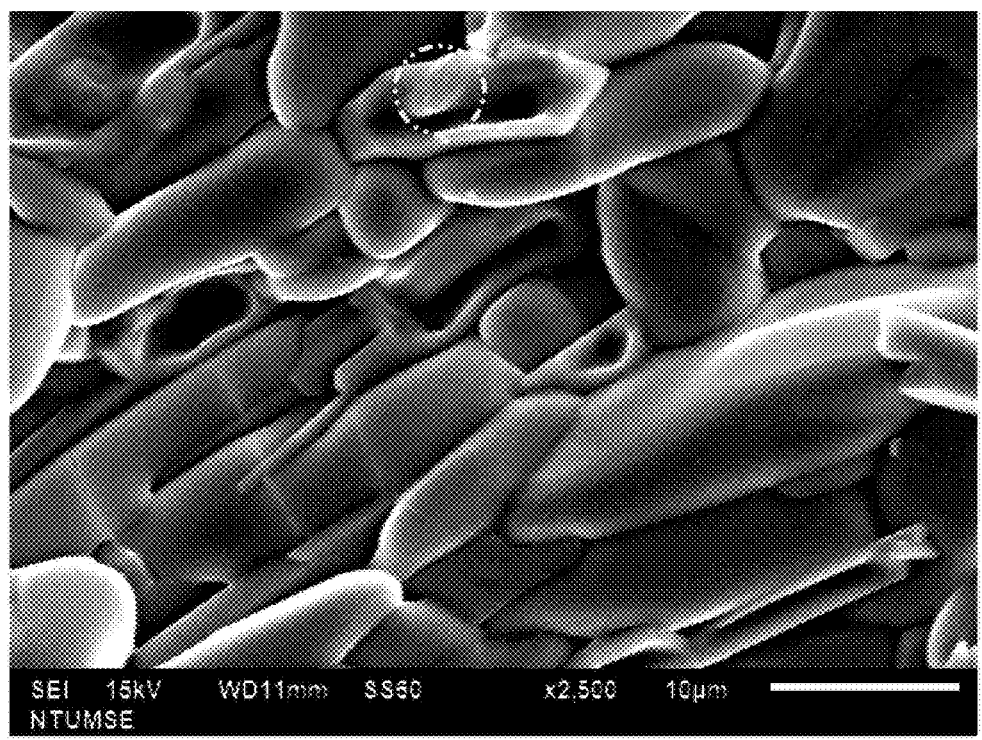
FIGS. 45(a) and 45(b) are the SEM micrograph and the EDS result of Advanced Example 31.
Figure 45B:
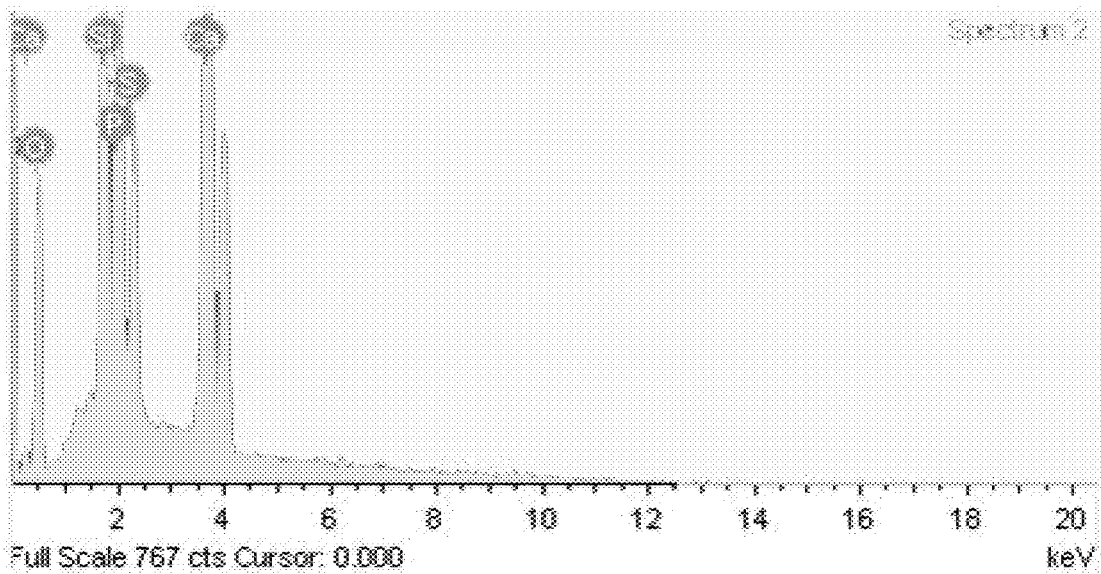

The sintered specimen is prepared in the manner similar to that of Advanced Example 30, and the micrograph of the sintered specimen is shown in FIG. 45(*a*), in which small particles are observed. After the EDS semi-quantitative composition analysis (see FIG. 45(*b*)), the small particles may be calcium silicate (e.g., $CaSiO_3$), calcium phosphate silicate (e.g., $Ca_5(PO_4)_2SiO_4$) and calcium silicate sulfate (e.g., $Ca_5(SiO_4)_2SO_4$). This compound may also be observed in the XRD pattern (see FIG. 44).

ADVANCED EXAMPLE 32

The disc specimen is prepared in a manner similar to that of the Advanced Example 30 and has the diameter of about 10 mm and the height of about 10 mm. The disc specimen is placed in the oven and sintered at 1100° C. for one hour to obtain the sintered specimen. Then, the bottom surface of the specimen is polished, and the compressive strength of the sintered specimen is measured in a biaxial compression manner using the universal testing instrument (MTS810, MTS, USA) at the room temperature and a displacement rate of mechanical compression of 0.96 mm/min. The ratio of diameter to thickness of the sintered disc specimen is 1:1, and the compressive strength of the sintered specimen is equal to 147 MPa.

In this advanced example, the strength of the sintered calcium sulfate specimen composed of calcium sulfate solid solution and the second phase of $CaSiO_3$ (calcium silicate), $Ca_5(SiO_4)_2SO_4$ (calcium silicate sulfate) and $Ca_5(PO_4)_2SiO_4$ (calcium phosphate silicate) is improved.

ADVANCED EXAMPLES 33 AND 34

Figure 46:
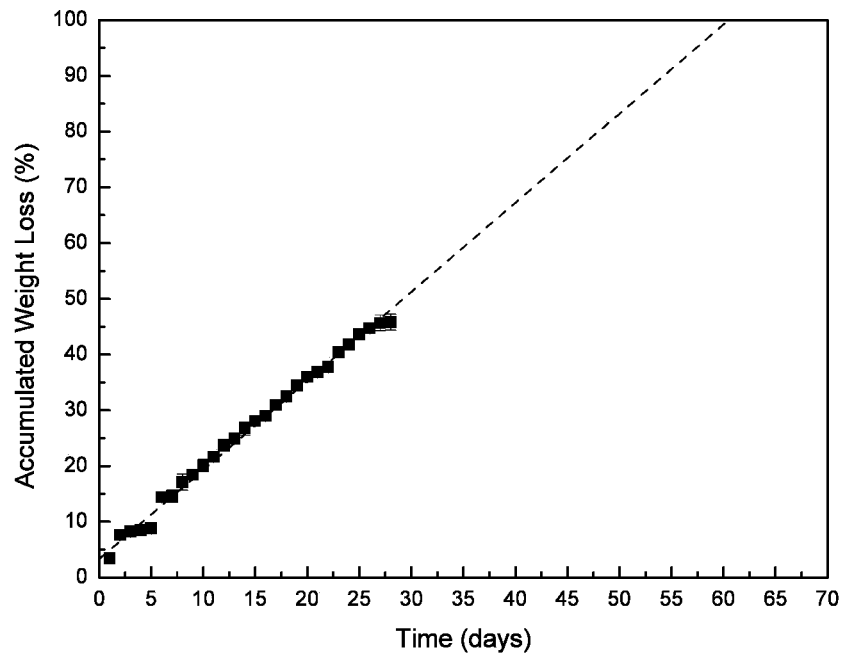
FIG. 46 is a plot showing the relationship between the accumulated weight loss and the time when the sintered specimens in Advanced Examples 33 and 34 are immersed in the saline solution.

Each of the sintered disc specimens is prepared in a manner similar to that of the Advanced Example 30. The sintered specimen is immersed in the saline solution to perform the biodegradation test for one month. The ratio of the sintered specimen to the saline solution is 1 g:10 mL. The weight loss of the sintered specimen is measured every day, and the relationship between the weight loss of the specimen and the immersion time is recorded, as shown in FIG. 46. When the accumulated weight of the specimen reaches 100%, the required time is referred to as a degradation time, and the rate is referred to as a degradation rate. In Advanced Example 33, the degradation time is equal to 61 days (note: the sintered specimen cannot be completely degraded in the one-month degradation test, and the degradation is obtained by way of extrapolation). In Advanced Example 34, the degradation rate is equal to 1.6 (%/day), which is calculated according to the slope of FIG. 46.

In this advanced example, the degradation time and the degradation rate of the sintered specimen are improved. This represents that the degradation behavior of the calcium sulfate can be improved by adding the additive (SPCN). By sintering the calcium sulfate with the additive, the calcium sulfate solid solution and the second phases ($CaSiO_3$ (calcium silicate), $Ca_5(SiO_4)_2SO_4$ (calcium silicate sulfate) and $Ca_5(PO_4)_2SiO_4$ (calcium phosphate silicate) are obtained.

ADVANCED EXAMPLE 35

Figure 47:
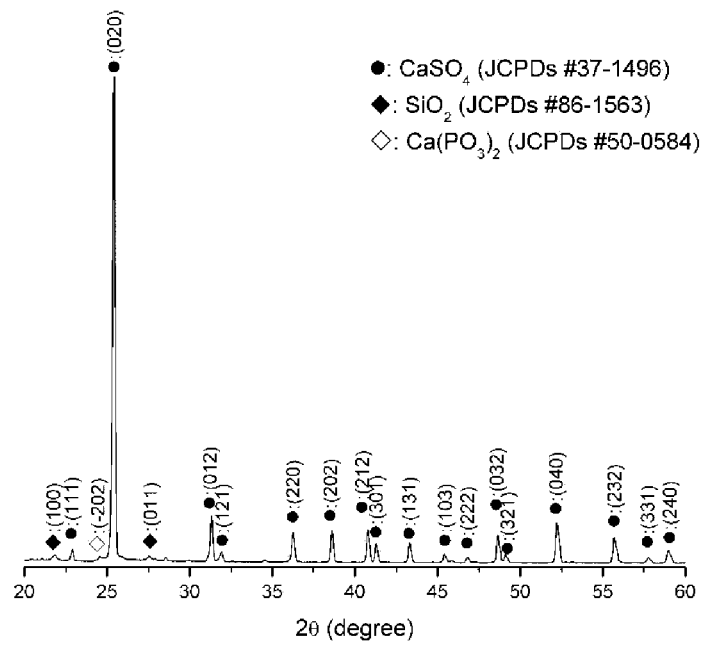
FIG. 47 is an XRD pattern of Advanced Example 35.

In this advanced example, the calcium sulfate powder and 10 wt % of SPCN powder, which contains 5.6 wt % of $SiO_2$, 1.1 wt % of $P_2O_5$, 2.1 wt % of CaO and 1.2 wt % of $NaHCO_3$ (sodium bicarbonate), are provided, mixed uniformly and shaped into a disc specimen with a diameter of about 10 mm and a height of about 3 mm by way of dry pressing and shaping. Thereafter, the specimen is placed in the oven and sintered at the temperature of 900° C. for one hour, and a sintered specimen is produced. Then, the surface of the sintered specimen is polished and the phase of the sintered specimen was investigated by using XRD to obtain the XRD pattern, as shown in FIG. 47.

In this advanced example, the first phase of $CaSO_4$ solid solution and the second phase of $SiO_2$ and $Ca(PO_3)_2$ (calcium phosphate) are obtained.

To sum up, the sintered specimen has the following second phase:

(a) calcium silicate ($CaSiO_3$);
(b) calcium silicate ($Ca_2SiO_4$);
(c) calcium silicate ($CaSiO_3$)+calcium phosphate ($Ca(PO_3)_2$);
(d) calcium silicate ($CaSiO_3$)+calcium phosphate silicate ($Ca_5(PO_4)_2SiO_4$);
(e) calcium silicate ($CaSiO_3$)+calcium phosphate ($Ca(PO_3)_2$)+calcium silicate sulfate ($Ca_5(SiO_4)_2SO_4$);
(f) calcium silicate ($CaSiO_3$)+calcium phosphate silicate ($Ca_5(PO_4)_2SiO_4$)+calcium silicate sulfate ($Ca_5(SiO_4)_2SO_4$);
(g) calcium phosphate ($Ca(PO_3)_2$);
(h) calcium phosphate ($Ca(PO_3)_2$) and silica ($SiO_2$); or
(i) calcium phosphate ($Ca(PO_3)_2$)+calcium silicate sulfate ($Ca_5(SiO_4)_2SO_4$).

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A sintered calcium sulfate ceramic material, comprising:
    a plurality of major grains of calcium sulfate solid solutions; and
    a plurality of reaction grains located at boundaries of the major grains, wherein each of the calcium sulfate solid solutions comprises calcium sulfate and silicon ions.

2. The sintered calcium sulfate ceramic material according to claim 1, further comprising:
    a plurality of pores formed between the major grains.

3. The sintered calcium sulfate ceramic material according to claim 1, wherein each of the calcium sulfate solid solutions further comprises phosphorus ions.

4. A sintered calcium sulfate ceramic material, comprising:
    a plurality of major grains of calcium sulfate solid solutions; and
    a plurality of reaction grains located at boundaries of the major grains, wherein each of the reaction grains comprises calcium silicate.

5. The sintered calcium sulfate ceramic material according to claim 4, wherein each of the reaction grains further comprises calcium phosphate.

6. The sintered calcium sulfate ceramic material according to claim 4, wherein each of the reaction grains further comprises calcium phosphate silicate.

7. The sintered calcium sulfate ceramic material according to claim 4, wherein each of the reaction grains further comprises calcium phosphate and calcium silicate sulfate.

8. The sintered calcium sulfate ceramic material according to claim 4, wherein each of the reaction grains further comprises calcium phosphate silicate and calcium silicate sulfate.

9. A sintered calcium ceramic material, comprising:
a plurality of major grains of calcium sulfate soild solutions; and
a plurality of reaction grains located at boundaries of the major grains, wherein each of the reaction grains comprises calcium phosphate.

10. The sintered calcium sulfate ceramic material according to claim 9, wherein each of the reaction grains further comprises silica.

11. The sintered calcium sulfate ceramic material according to claim 9, wherein each of the reaction grains further comprises calcium silicate sulfate.

12. The sintered calcium sulfate ceramic material according to claim 1 having a degradation time longer than 10 days.

13. The sintered calcium sulfate ceramic material according to claim 1 having a degradation time longer than 30 days.

14. The sintered calcium sulfate ceramic material according to claim 1 being a bioceramic material.

15. A sinterable calcium sulfate ceramic material consisting of calcium sulfate and a sintering additive, wherein the sintering additive is silica ($SiO_2$).

16. A sinterable calcium sulfate ceramic material consisting of calcium sulfate and a sintering additive, wherein the sintering additive consists of silica ($SiO_2$), $P_2O_5$ and CaO.

17. A sinterable calcium sulfate ceramic material consisting of calcium sulfate and a sintering additive, wherein the sintering additive comprises silica ($SiO_2$) and $NaHCO_3$.

18. The sinterable calcium sulfate ceramic material according to claim 15 being a bioceramic material.

19. The sinterable calcium sulfate ceramic material according to claim 17, wherein the sintering additive further comprises $P_2O_5$ and CaO.

* * * * *